United States Patent [19]
Aoshima

[11] Patent Number: 5,970,268
[45] Date of Patent: Oct. 19, 1999

[54] SHUTTER DEVICE OF CAMERA HAVING A LIGHT BLOCKING MEMBER WITH A VARIABLE STARTING POSITION

[75] Inventor: Chikara Aoshima, Kanagawa-ken, Japan

[73] Assignee: Canon Kabushiki Kaisha, Tokyo, Japan

[21] Appl. No.: 08/672,600

[22] Filed: Jun. 28, 1996

[30] Foreign Application Priority Data

| Jul. 3, 1995 | [JP] | Japan | 7-167507 |
| Jul. 4, 1995 | [JP] | Japan | 7-168947 |
| Jul. 3, 1997 | [JP] | Japan | 7-167509 |

[51] Int. Cl.⁶ .................................................. G03B 9/08
[52] U.S. Cl. .......................................... 396/469; 396/501
[58] Field of Search ................................... 396/469, 501, 396/508, 477

[56] References Cited

U.S. PATENT DOCUMENTS

| 4,893,142 | 1/1990 | Ishida et al. | 354/234.1 |
| 4,897,681 | 1/1990 | Yamamoto et al. | 354/271.1 |
| 5,202,721 | 4/1993 | Kobayashi et al. | 354/441 |
| 5,559,569 | 9/1996 | Akimoto et al. | 354/195.11 |
| 5,634,163 | 5/1997 | Kamata | 396/458 |

FOREIGN PATENT DOCUMENTS

| 7-56211 | 3/1995 | Japan | G03B 9/10 |
| 8-43883 | 2/1996 | Japan | G03B 9/14 |

Primary Examiner—Safet Metjahic
Assistant Examiner—Christopher Mahoney
Attorney, Agent, or Firm—Robin, Blecker & Daley

[57] ABSTRACT

A shutter device having a first light blocking member which travels from a closed state to a fully open state for making exposure, and which is driven by a first motor. A second light blocking member travels from a predetermined position to a closed state for making exposure, and is driven by a second motor. A control circuit controls the driving actions of the first and second motors, and a varying mechanism varies, according to a set condition, the predetermined position at which the second light blocking member starts travelling for making exposure.

12 Claims, 61 Drawing Sheets

SHUTTER DEVICE OF CAMERA HAVING A LIGHT BLOCKING MEMBER WITH A VARIABLE STARTING POSITION

BACKGROUND OF THE INVENTION

1. Field of the Invention

This invention relates to a shutter device and more particularly to a shutter device of the kind arranged to perform opening and closing actions respectively with different shutter blades.

2. Description of the Related Art

The shutter devices of cameras include a kind having two light blocking members which are arranged to open and close an aperture of a lens respectively with a plurality of shutter blades, for example, as disclosed in U.S. patent application Ser. No. 08/287,846, filed Aug. 9, 1994. The shutter device of this kind is arranged as follows. In response to a shutter release operation on a camera, the shutter blades of one (first) light blocking member are moved from their closed positions at which a lens aperture is closed to their fully open positions at which the lens aperture is fully opened, and the shutter/diaphragm blades of the other (second) light blocking member are moved from their fully open positions to their closed positions. Compared with a case where a single light blocking member is to be moved in such a way as "the closed position→the fully open position→the closed position" and particularly where the light blocking member is to be moved by causing a stepping motor to make normal rotation→to stop rotating→to make reverse rotation, this arrangement permits an increase in shutter speed. The increased shutter speed makes it possible, for example, to sufficiently blur a background in contrast with a main object of shooting or to bring the exposure interlocking range of daylight synchronized flashing closer to that of flash photography for a dark place.

In the case of the above-stated shutter device, the opening action of the first light blocking member and the closing action of the second light blocking member are arranged to be almost simultaneously carried out. The acting positions of the two light blocking members are controlled in such a way as to have their positions come to coincide with each other at a point where the aperture area of the lens corresponds to an aperture value set beforehand. In addition to that, exposure time is controlled by varying the acting speeds of the two light blocking members. The so-called aperture priority exposure control is thus carried out.

SUMMARY OF THE INVENTION

It is an object of this invention to provide a shutter device which is capable of giving a depth of field more accurately than the conventional device. To attain this object, the shutter device according to this invention comprises a first light blocking member arranged to travel from a closed state to a fully open state for making exposure, a first motor arranged to drive the first light blocking member, a second light blocking member arranged to travel from a predetermined position to a closed state for making exposure, a second motor arranged to drive the second light blocking member, control means for controlling driving actions of the first and second motors, and varying means for varying, according to a set condition, the predetermined position at which the second light blocking member starts travelling for making exposure. The shutter device according to this invention is thus arranged to be capable of giving a more accurate depth of field than the conventional device by varying the above-stated predetermined travel start position of the second light blocking member.

The above and other object and features of this invention will become apparent from the following detailed description of preferred embodiments thereof taken in connection with the accompanying drawings.

DETAILED DESCRIPTION OF THE PREFERRED EMBODIMENTS

First Embodiment

Figure 1:
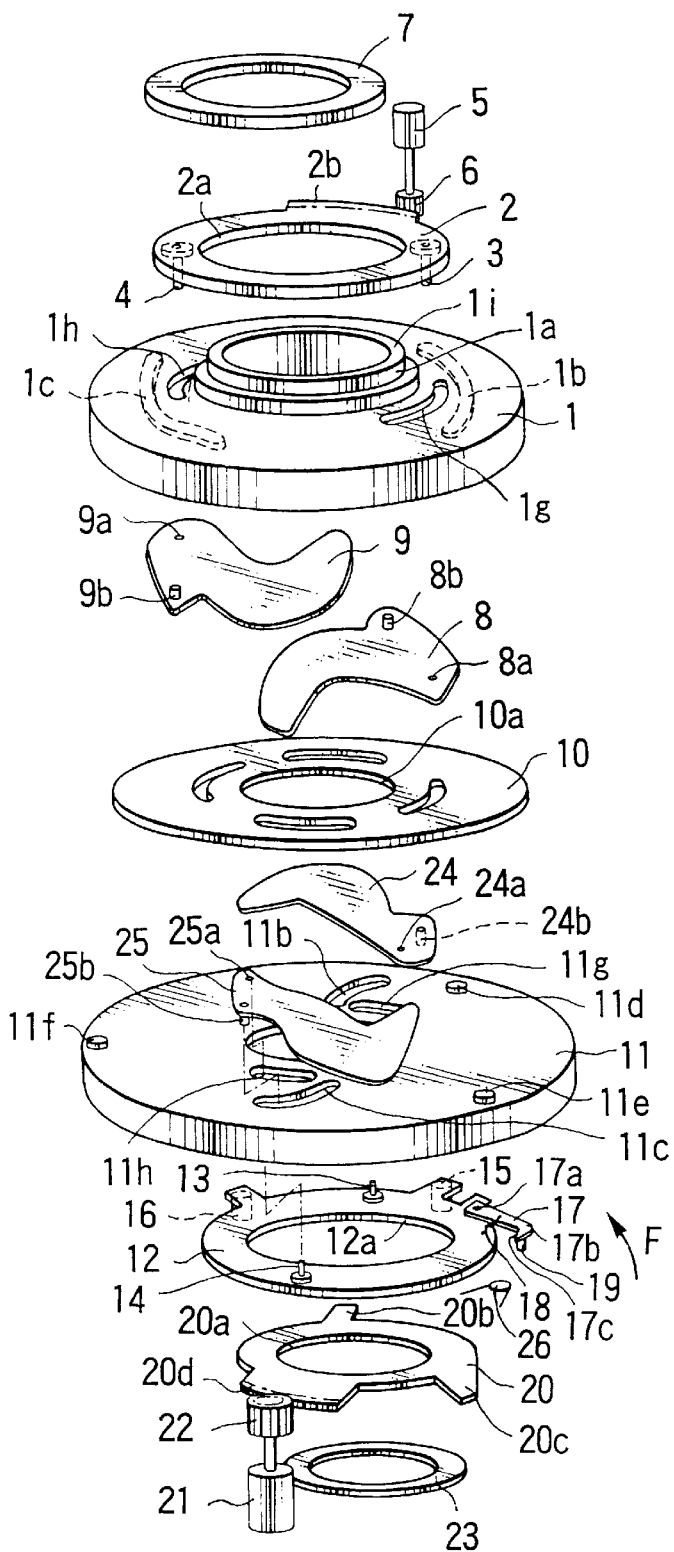
FIG. 1 is an oblique view showing essential component parts of a first embodiment of this invention.
Figure 2:
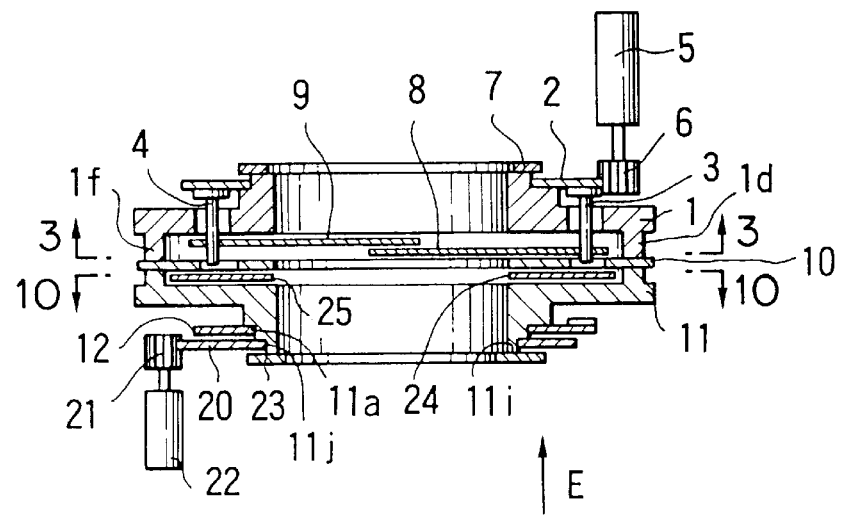
FIG. 2 is a sectional view showing the shutter device of the first embodiment.

FIGS. 1 to 22 show a shutter device which is arranged as a first embodiment of this invention. Of these drawings, FIG. 1 is an oblique view showing the relationship between essential component parts of the shutter device. FIG. 2 is a sectional view of the same shutter device. Referring to FIGS. 1 and 2, the shutter device includes an upper base plate 1 and a first driving ring 2. An inner diametral part 2a of the first driving ring 2 is rotatably fitted on a cylindrical part 1a formed in the middle of the upper base plate 1.

Driving pins 3 and 4 are secured to the lower side of the first driving ring 2. A first stepping motor 5 is capable of making stepwise indexing rotation in a known manner at predetermined unit rotation angles.

A first pinion 6 is secured to the output shaft of the first stepping motor 5. The first pinion 6 is in mesh with a gear part 2b of the first driving ring 2 and is arranged to transmit the rotative driving force of the first stepping motor 5 to the first driving ring 2. A first retaining plate 7 is secured to the top face 1i of the cylindrical part 1a to prevent the first driving ring 2 from coming off after the first ring 2 is fitted on the cylindrical part 1a as shown in FIG. 2.

A first shutter blade 8 has a hole 8a. The above-stated driving pin 3 is revolvably fitted in the hole 8a through a slot 1g formed in the upper base plate 1. A pin 8b is formed on the upper surface of the first shutter blade 8 and is slidably fitted into a cam groove 1b formed in the lower surface of the upper base plate 1.

A second shutter blade 9 has a hole 9a. The above-stated driving pin 4 is revolvably fitted in the hole 9a through a slot 1h formed in the upper base plate 1. A pin 9b is formed on the upper surface of the second shutter blade 9. The pin 9b is slidably fitted into a cam groove 1c which is formed in the lower surface of the upper base plate 1.

A blade retaining plate 10 has an aperture part 10a formed in the middle thereof. The first shutter blade 8 and the second shutter blade 9 are held within a space formed between the upper base plate 1 and the blade retaining plate 10 and are arranged to be movable in the planar direction of the space. To form the space between the upper base plate 1 and the blade retaining plate 10, there are formed projections 1d, 1e and 1f which extend from the lower surface of the upper base plate 1.

The shutter device also has a lower base plate 11 and a closing blade ring 12. The inner diametral part 12a of the closing blade ring 12 is rotatably fitted on a cylindrical part 11a formed in the middle of the lower base plate 11. Driving pins 13 and 14 are secured to the upper surface of the closing blade ring 12. Pins 15 and 16 are secured to arms 12c and 12d which are two of three arms formed on the periphery of the closing blade ring 12.

A lock pawl 17 is mounted on another arm 12b of the closing blade ring 12 and arranged to be swingable on a pin 17a. A claw part 17c which is formed at the fore end of the lock pawl 17 is arranged to be capable of engaging a bent-up part 12e (see FIG. 12, etc.) of the arm 12b of the closing blade ring 12. The engagement of these parts restricts the counterclockwise swinging motion of the lock pawl 17 as viewed on FIG. 12.

A coiled tension spring 18 has its one end secured to the closing blade ring 12 and the other end to the lock pawl 17. The coiled spring 18 is thus arranged to urge the lock pawl 17 to move counterclockwise as viewed on FIG. 12. The coiled spring 18 may be replaced with some other suitable elastic member such as a torsion spring or a compression spring.

Figure 12:
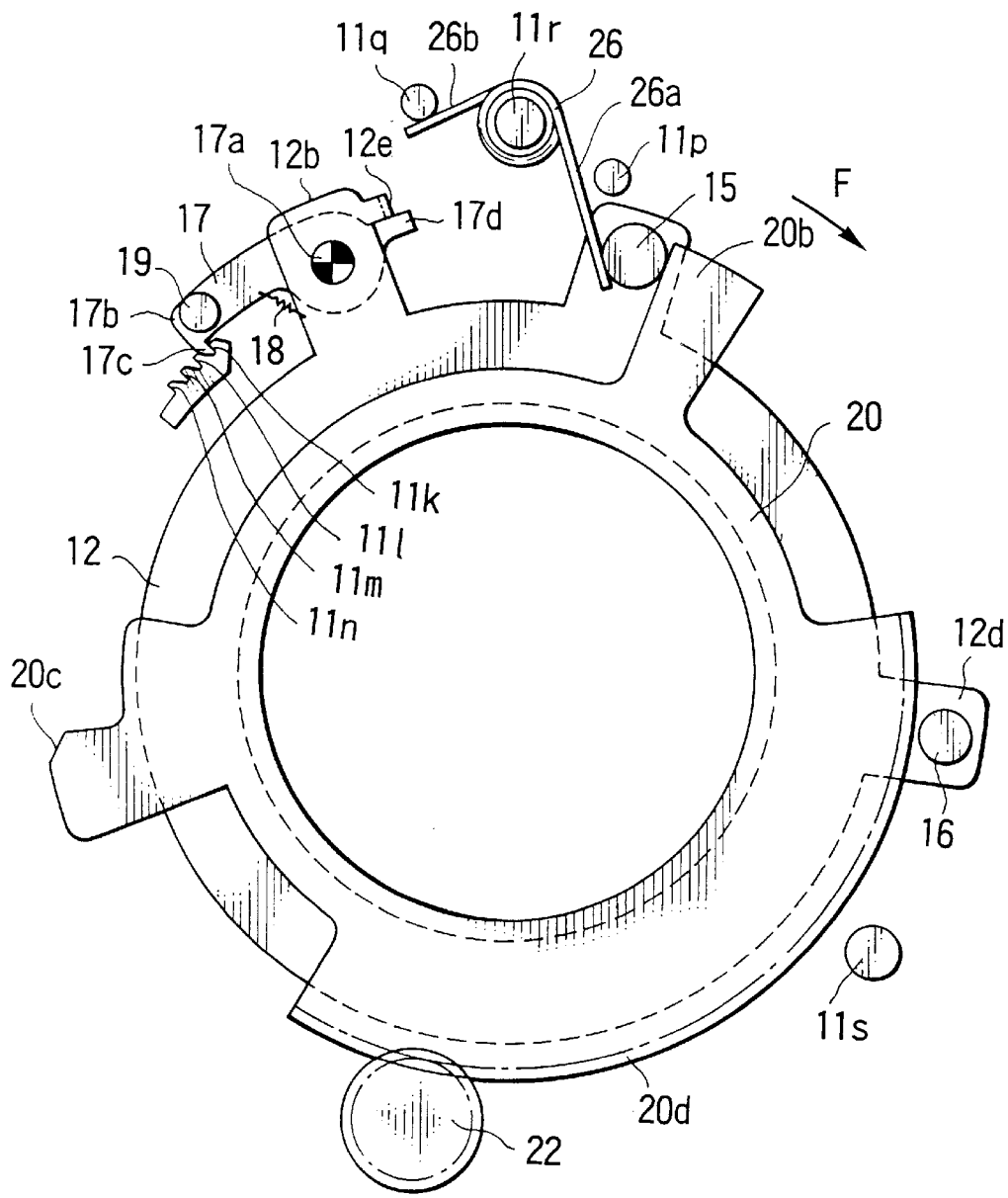
FIG. 12 is a plan view of the shutter device taken from the direction of arrow E of FIG. 2.

The claw part 17c of the lock pawl 17 is capable of engaging each of lock parts 11k, 11l, 11m and 11n which are formed in the lower base plate 11 as shown in FIG. 12. A release pin 19 is secured to an arm part 17b of the lock pawl 17 and is arranged to be capable of abutting on a cam face 20c of a second driving ring 20.

The second driving ring 20 is rotatably fitted at its inner diametral part 20a on a cylindrical part 11j formed in the middle of the lower base plate 11 (around an optical axis). An arm 20b which is formed on the second driving ring 20 is arranged to be capable of abutting on the above-stated pins 15 and 16.

As shown in FIG. 12, etc., a stopper 11s is formed on the lower base plate 11. The rotation of the closing blade ring 12 in the direction of arrow F is restricted with the arm 12d of the closing blade ring 12 coming to abut on the stopper 11s.

A second stepping motor 21 is arranged to be capable of making stepwise indexing rotation in a known manner at predetermined unit rotation angles. A second pinion 22 is secured to the output shaft of the second stepping motor 21. The second pinion 22 is in mesh with a gear part 20d of a second driving ring 20 and is thus arranged to transmit the rotative driving force of the second stepping motor 21 to the second driving ring 20. A second retaining plate 23 is arranged, as shown in FIG. 2, to be fitted on the cylindrical part 11j of the lower base plate 11 and, after that, secured to the top part 11i of the cylindrical part 11j in such a way as to prevent the second driving ring 20 from coming off.

As shown in FIG. 12, a torsion spring 26 has its coiled part mounted on the periphery of a projection 11r formed on the lower surface of the lower base plate 11. One arm 26b of the torsion spring 26 engages a projection 11q of the lower base plate 11 and the other arm 26a engages the pin 15 of the closing blade ring 12. The torsion spring 26 is thus arranged to urge the closing blade ring 12 to move in the direction of arrow F as shown in FIG. 12. By virtue of the urging force of the torsion spring 26, when the lock pawl 17 engages any of the lock parts 11k, 11l, 11m and 11n of the lower base plate 11, the rotating position of the closing blade ring 12 is stably restricted according to the position of the lock part engaging the lock pawl 17. A projection 11p which is formed on the lower side of the lower base plate 11 is located in a position to be capable of engaging the arm 26a of the torsion spring 26. Although the arm 26a is not engaging the projection 11p in the state of FIG. 12, the arm 26a comes to engage the projection 11p, parting from the pin 15, when the closing blade ring 12 rotates in the direction of arrow F from the state of FIG. 12.

A third shutter blade 24 has a hole 24a. The driving pin 13 which comes through a slot 11g formed in the lower base plate 11 is rotatably fitted into the hole 24a. A pin 24b which is secured to the third shutter blade 24 is slidably fitted into a cam groove 11b formed in the upper surface of the lower base plate 11.

A fourth shutter blade 25 has a hole 25a. The driving pin 14 which comes through a slot 11h formed in the lower base plate 11 is rotatably fitted into the hole 25a. A pin 25b which is secured to the fourth shutter blade 25 is slidably fitted into a cam groove 11c formed in the upper surface of the lower base plate 11.

The third and fourth shutter blades 24 and 25 are held to be movable in the planar direction within a space formed between the lower base plate 11 and the blade retaining plate 10. Projections 11d, 11e and 11f are formed on the upper surface of the lower base plate 11 and arranged to secure the space between the blade retaining plate 10 and the lower base plate 11.

Figure 3:
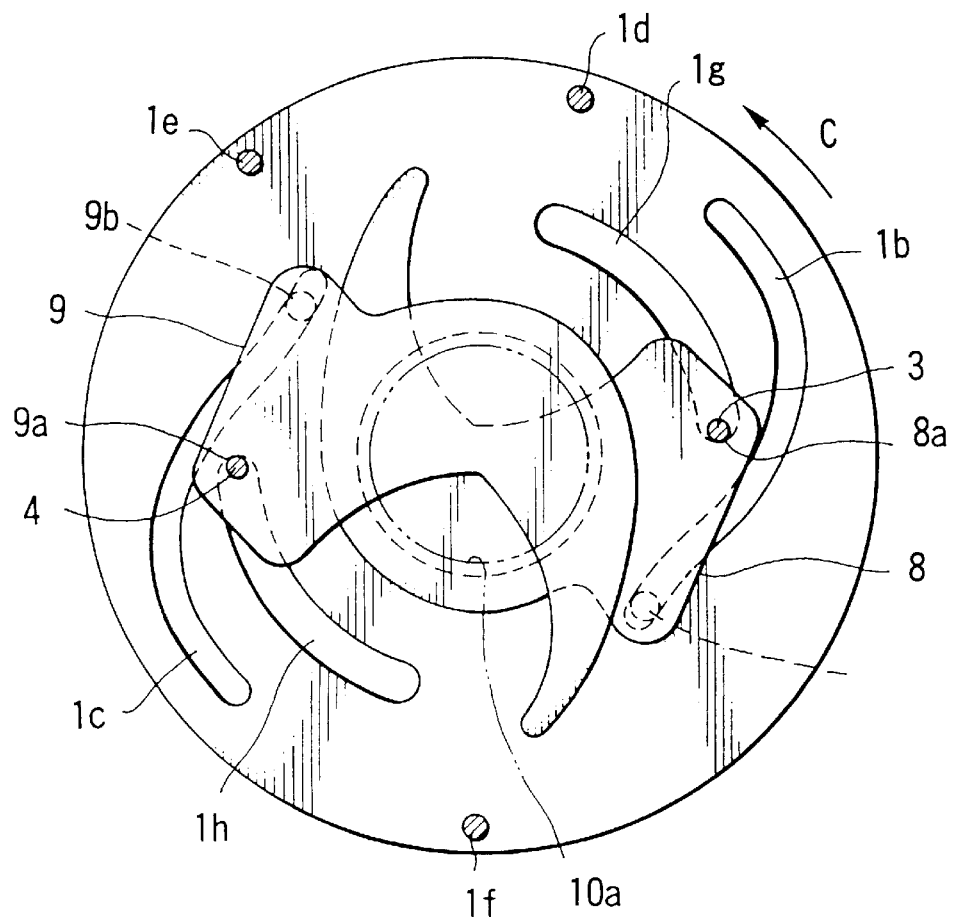
FIG. 3 is a section taken on a line 3—3 of FIG. 2 showing a first light blocking device in a plan view.

FIG. 3 is a sectional view taken on a line 3—3 FIG. 2 showing the embodiment as viewed in the direction of arrows 3—3. In the state shown in FIG. 3, the aperture part 10a is closed by the first and second shutter blades 8 and 9. When the first driving ring 2 carrying the driving pins 3 and 4 is rotated in the direction of arrow C from this state, the driving pins 3 and 4 respectively move within the slots 1g and 1h to allow the first and second shutter blades 8 and 9 to move around the optical axis. At this moment, since the pins 8b and 9b are fitted respectively in the cam grooves 1b and 1c, the first shutter blade 8 swings on the hole 8a and the second shutter blade 9 on the hole 9a. The lens aperture is opened wider accordingly as they swing in this manner.

Figure 4:
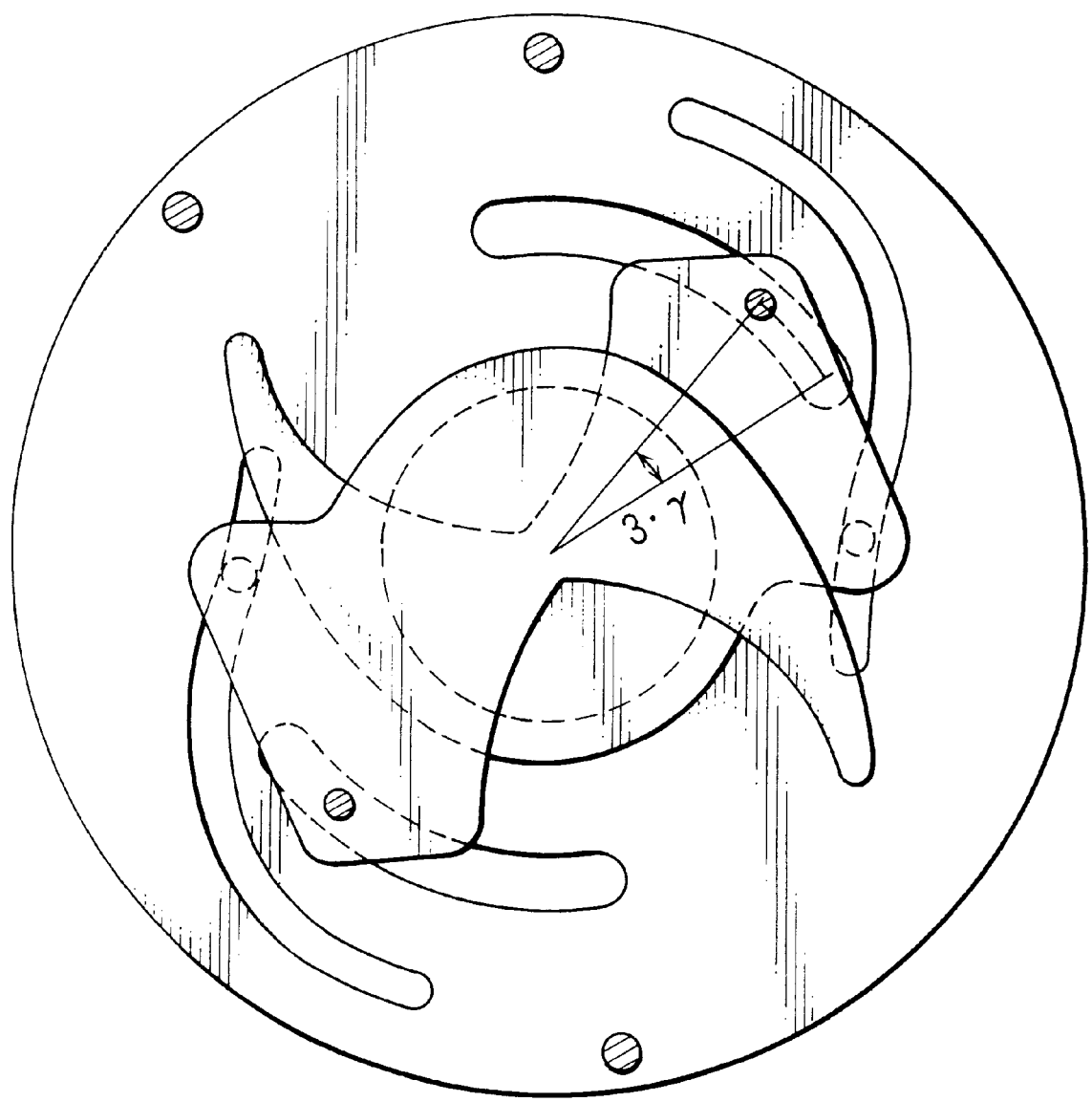
FIG. 4 is a plan view showing the first light blocking device in a state obtained after driving it three steps by a first stepping motor.

Under this condition, when the first stepping motor 5 is driven to rotate by one step, the first driving ring 2 rotates on the optical axis as much as an amount $\gamma$. The cam grooves 1b and 1c are arranged, as shown in FIG. 4, not to allow the first and second shutter blades 8 and 9 to swing on the holes 8a and 9a even if the first driving ring 2 rotates from the state of FIG. 3 as much as $3.\gamma$, i.e., even if the first stepping motor 5 is driven by three steps. The first and second shutter blades 8 and 9 which swing around the optical axis are thus arranged to be swung on the holes 8a and 9a by the subsequent steps of the first stepping motor 5.

Figure 5:
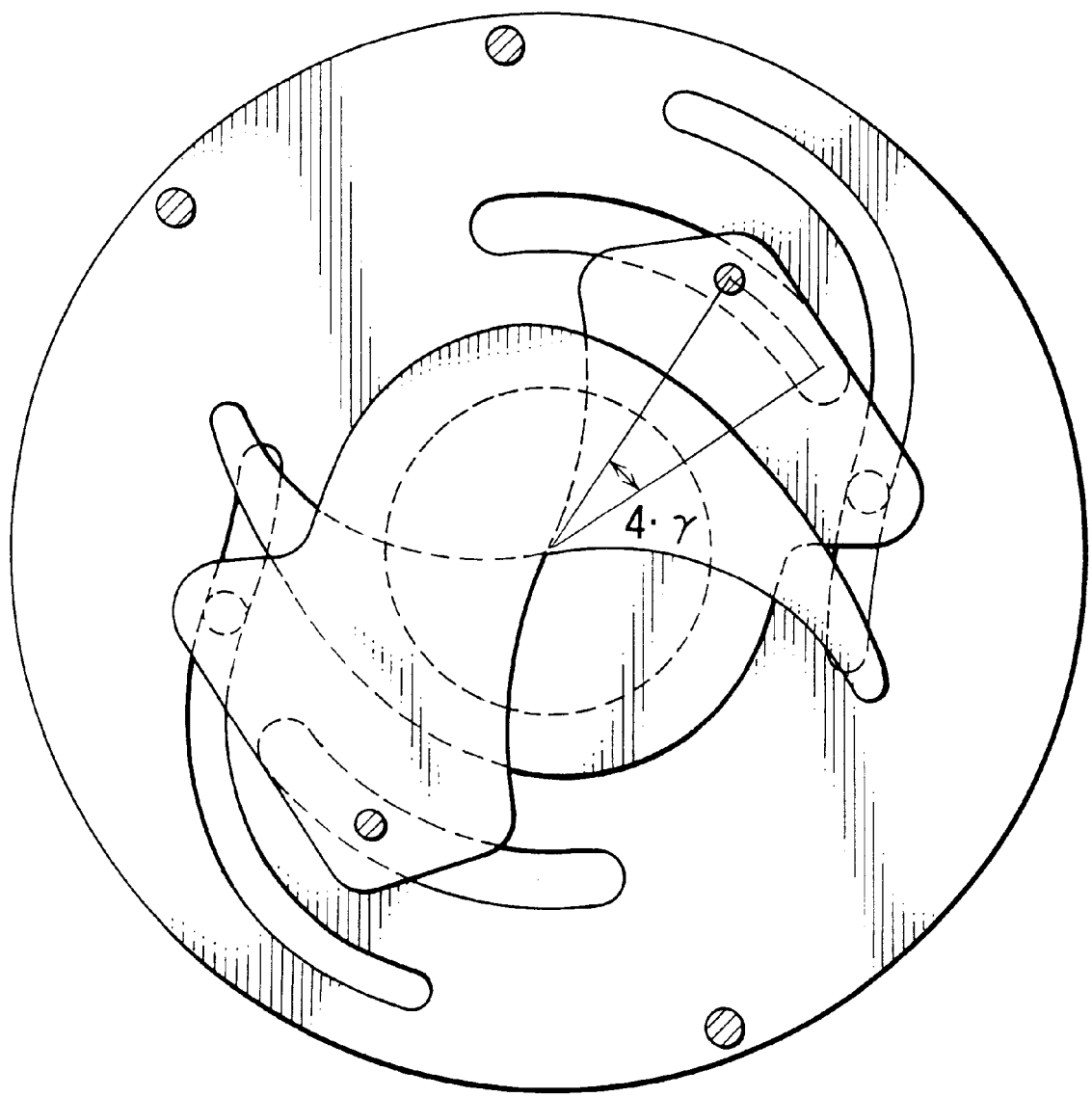
FIG. 5 is a plan view showing the first light blocking device in a state obtained after driving it four steps by the first stepping motor.
Figure 6:
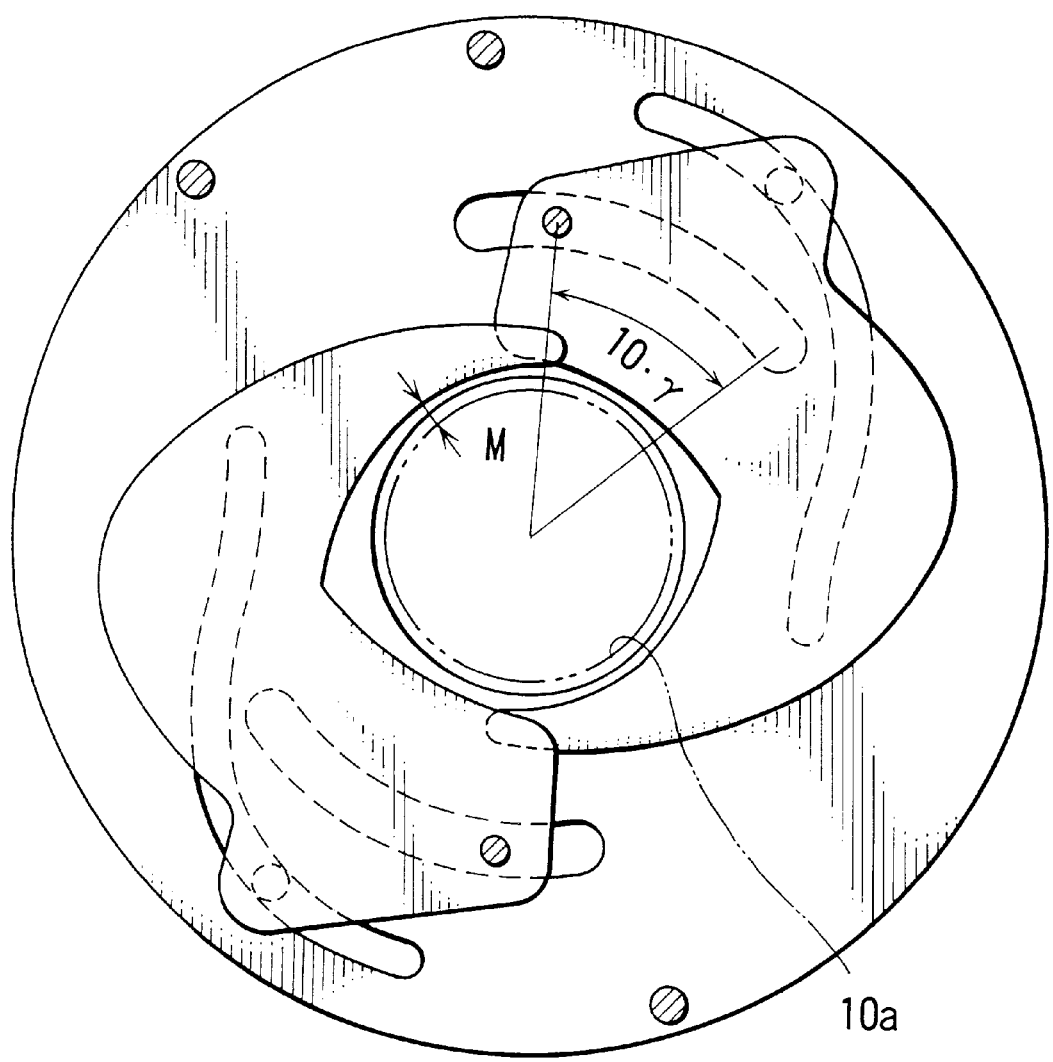
FIG. 6 is a plan view showing the first light blocking device in a state obtained after driving it ten steps by the first stepping motor.

As shown in FIG. 5, at the fourth step of the first stepping motor 5, i.e., at a rotating position $4.\gamma$ from the initial position of the first driving ring 2, the lens aperture defined by the first shutter blade 8 and the second shutter blade 9 comes to assume a pinhole state. Then, as shown in FIG. 6, the lens aperture is caused to assume a fully open state by the tenth step of the first stepping motor 5, i.e., at the rotating position 10.γ from the initial position of the first driving ring 2. At this moment, the shutter blades 8 and 9 are retracted as much as an escaping amount M from the aperture part 10a of the blade retaining plate 10.

Figure 7:
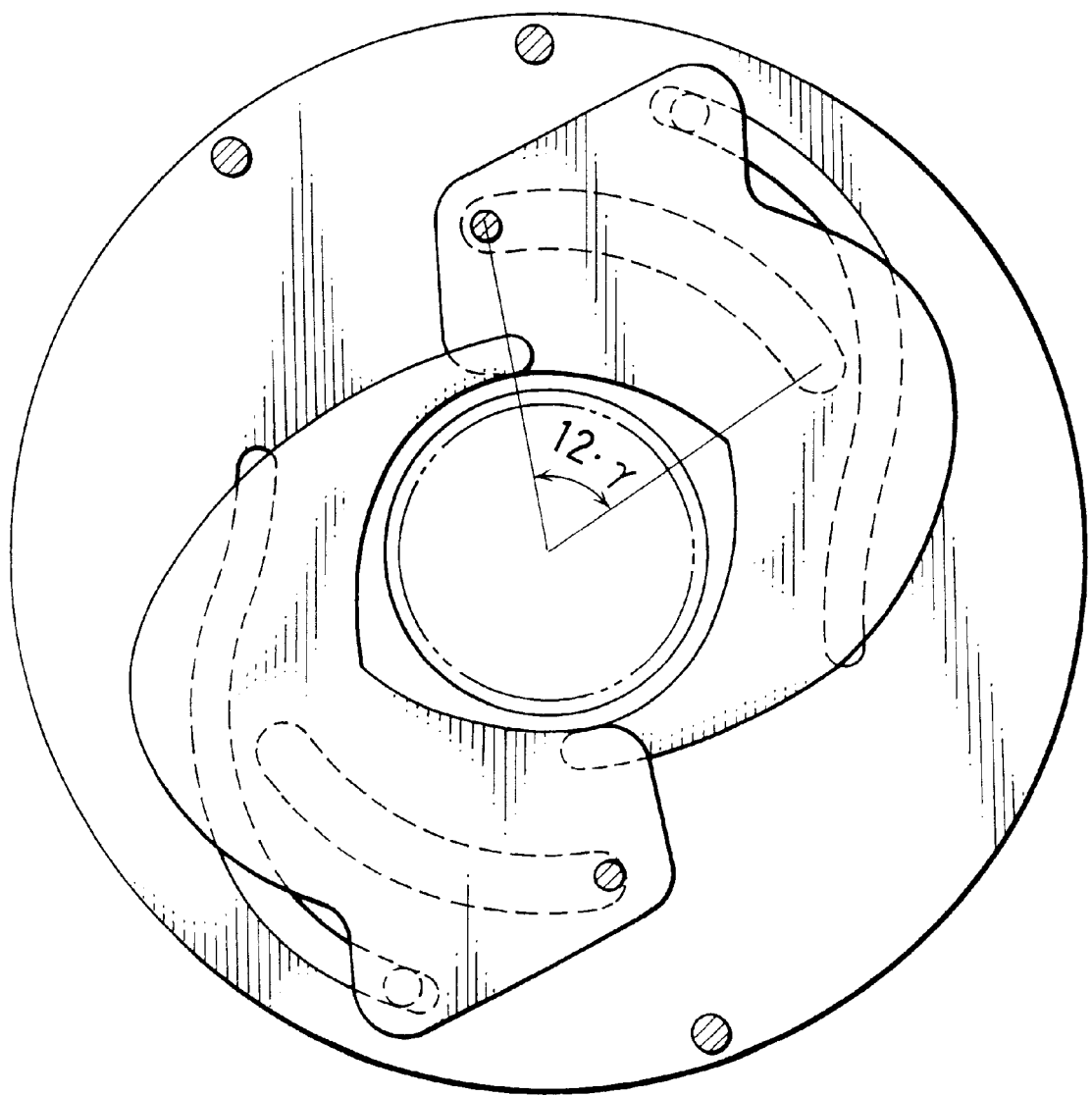
FIG. 7 is a plan view showing the first light blocking device in a state obtained after driving it twelve steps by the first stepping motor.

The cam grooves 1b and 1c are arranged such that, at the subsequent steps after the tenth step of the first stepping motor 5, the first and second shutter blades 8 and 9 are kept in their fully open states and not allowed to swing on the holes 8a and 9a. They are then allowed only to rotate on the optical axis along with the first driving ring 2. A state obtained by the twelfth step which gives the final rotating position of the first driving ring 2 is as shown in FIG. 7.

Figure 8:
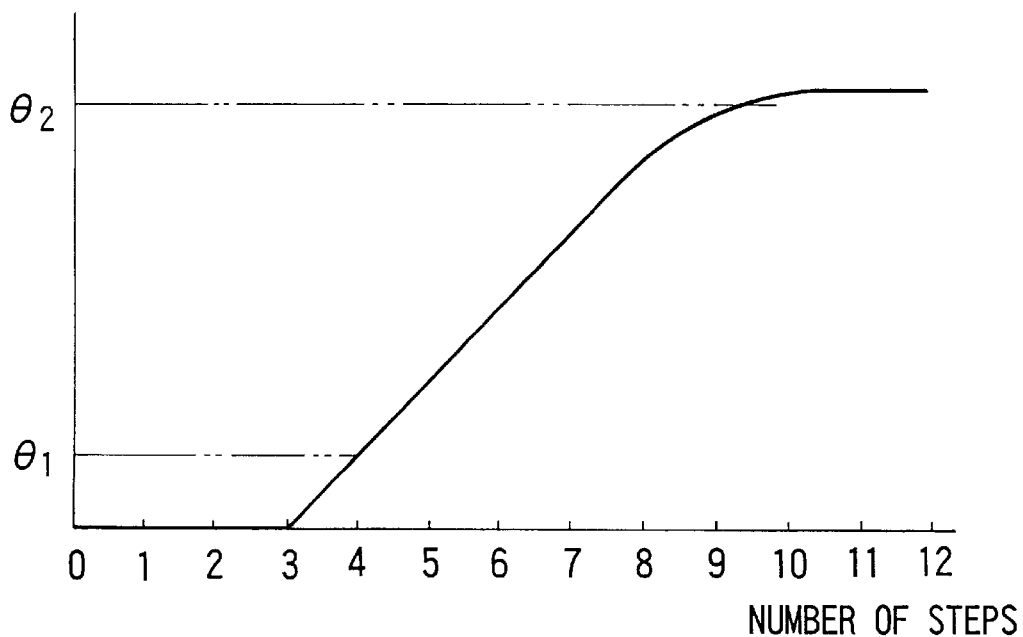
FIG. 8 is a graph showing the blade rotation angle of the first light blocking device in relation to the number of steps of the stepping motor.

FIG. 8 shows in a graph the angle of rotation (swing) of the first and second shutter blades 8 and 9 on the holes 8a and 9a in relation to the number of steps of the first stepping motor 5. The lens aperture is a pinhole when the rotation angle θ is θ1 (at the fourth step) and is fully open when the rotation angle θ is θ2 (at the tenth step).

Figure 9:
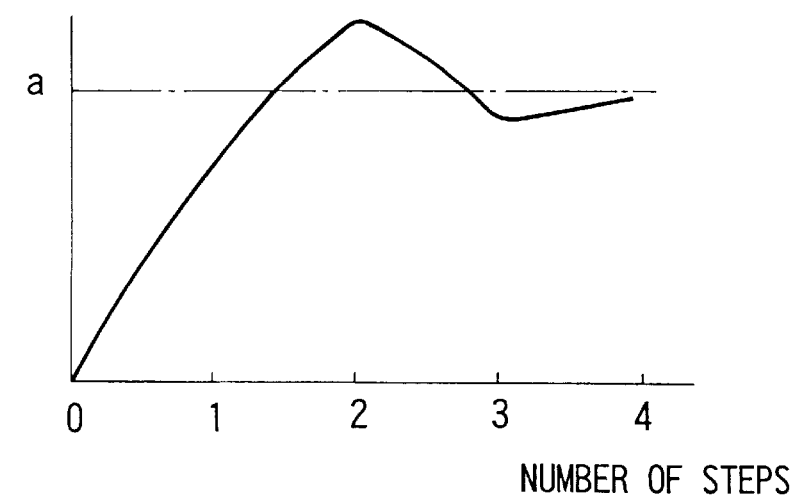
FIG. 9 is a graph showing the characteristic of the stepping motor.

FIG. 9 shows in a graph the characteristic of the stepping motor. As apparent from this graph, when a driving electric signal is inputted to cause the rotation speed of the stepping motor, for example, to be a speed "a", the stepping motor does not instantly respond to the input signal. A certain number of steps (3 or 4 steps in this case) are necessary before the actual rotation speed of the stepping motor reaches the speed "a". Therefore, in the case of this embodiment, the lens aperture is arranged to be opened by steps subsequent to the fourth step of the first stepping motor 5. This arrangement makes the error of a shutter opening speed with respect to the speed set by an electrical signal very small. Further, it is to be understood that this invention is not limited to the numbers of steps mentioned herein, which are set by way of example only.

The escaping amount M of the shutter blades 8 and 9 obtained away from the aperture part 10a in the state of having the lens aperture fully open, as shown in FIG. 6, is small. However, with the actual final stroke arranged to be made at the twelfth step as shown in FIG. 7, the shutter blades 8 and 9 never bounce back into the aperture part 10a in their final stroke positions.

The light blocking device consisting of the first and second shutter blades 8 and 9, the first driving ring 2 and the first stepping motor 5 will be hereinafter called a first light blocking device.

The position of the device at which the lens aperture is closed by the first and second shutter blades 8 and 9 as shown in FIG. 3 will be hereinafter called a closed position. The position at which the lens aperture is fully opened by the first and second shutter blades 8 and 9 as shown in FIGS. 6 and 7 will be hereinafter called a fully open position.

Figure 10:
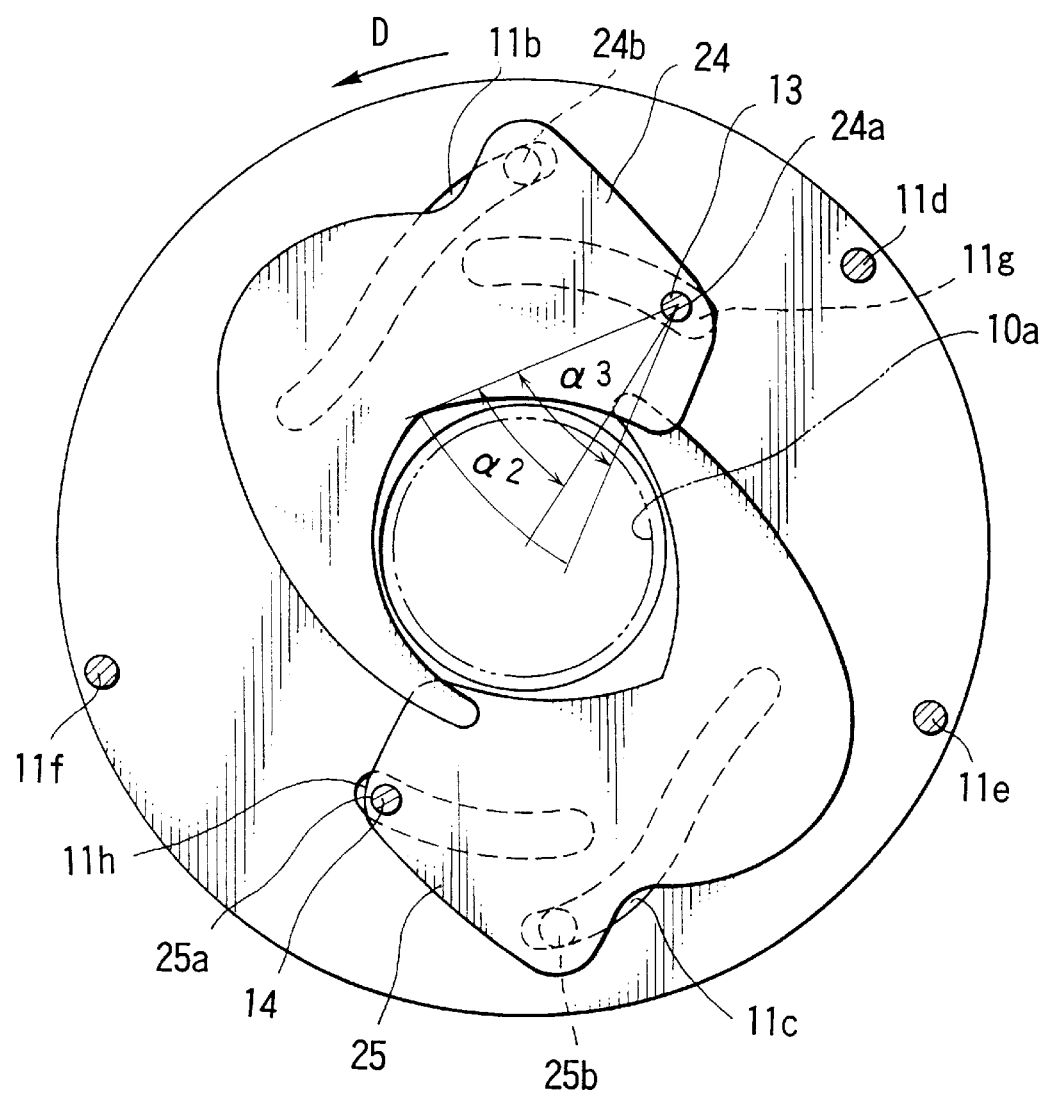
FIG. 10 is a section taken on a line 10—10 of FIG. 2 showing a second light blocking device in a plan view.
Figure 11:
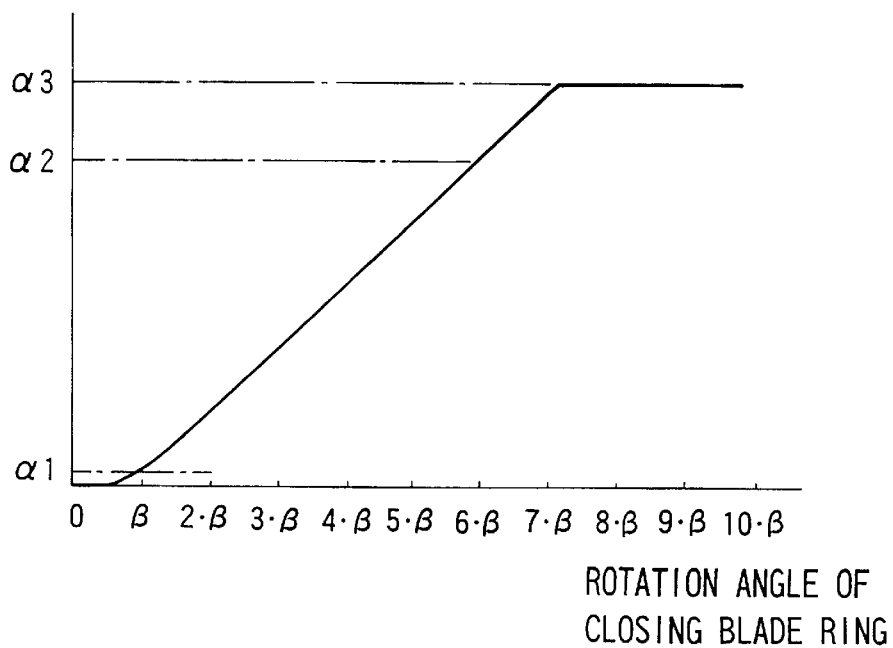
FIG. 11 is a graph showing the blade rotation angle of the second light blocking device in relation to the amount of rotation of a closing blade ring.
Figure 16:
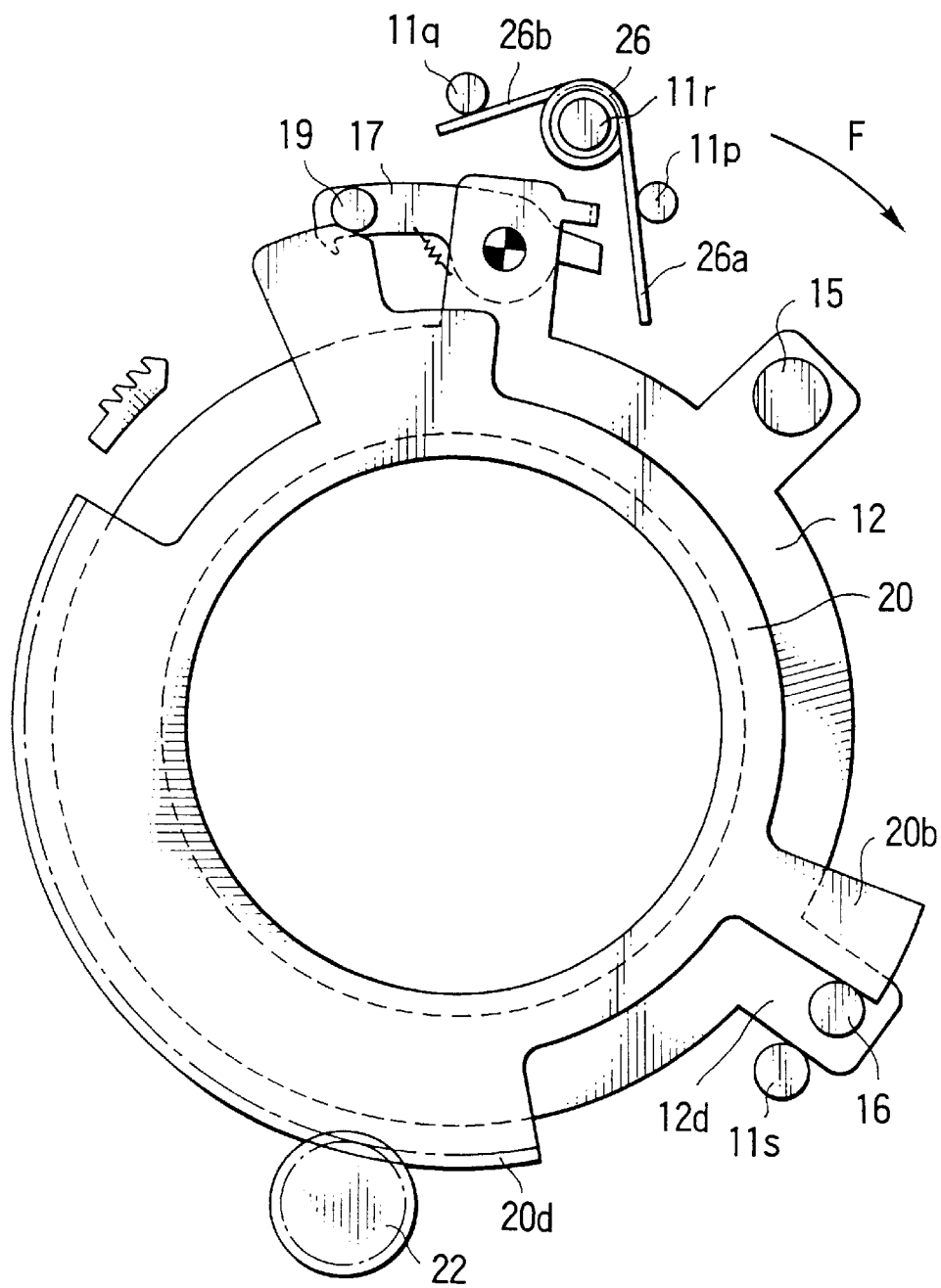
FIG. 16 is a plan view of the shutter device taken in the direction of arrow E of FIG. 2.

FIG. 10 is a sectional view taken on a line 10—10 of FIG. 2 showing the embodiment as viewed in the direction of arrows 10—10. Referring to FIG. 10, when the closing blade ring 12 is driven to move in the direction of arrow D by an arrangement which will be described later herein, the third and fourth shutter blades 24 and 25 move around the optical axis and, at the same time, also swing on the holes 24a and 25a while moving within the cam grooves 11b and 11c. FIG. 11 shows the rotation angle α of the rotation (swing) of the third and fourth shutter blades 24 and 25 on the holes 24a and 25a in relation to the rotation angle of the second driving ring 20. In FIG. 11, the axis of abscissa shows the angle of rotation of the closing blade ring 12 in the direction of arrow D. The position of it shown in FIG. 10 is indicated as 0 degree while its final stroke position is indicated as 10.β degrees. The term "the final stroke position" as used herein means a position where the arm 12d of the closing blade ring 12 abuts on the stopper 11s of the lower base plate 11 as shown in FIG. 16. The axis of ordinate, on the other hand, shows the rotation (swing) angle α of the swing motions of the third and fourth shutter blades 24 and 25 on the holes 24a and 25a.

As apparent from this graph, the cam grooves 11b and 11c of the lower base plate 11 are arranged to allow the rotation angle α of the shutter blades 24 and 25 to be increased by the rotation of the closing blade ring 12 up to its position 7.β and to prevent the rotation angle α of the shutter blades 24 and 25 from being increased any further by the further rotation of the closing blade ring 12. In other words, the third and fourth shutter blades 24 and 25 are allowed only to rotate around the optical axis while the closing blade ring 12 rotates between its positions 7.β and 10.β.

In FIGS. 10 and 11, a reference symbol α1 denotes a rotation angle at which the third and fourth shutter blades 24 and 25 come inside of the aperture part 10a, and another rotation angle α2 is an angle at which the lens aperture is stopped down to a pinhole state.

The light blocking device consisting of the third shutter blade 24, the fourth shutter blade 25 and the closing blade ring 12 will be hereinafter called a second light blocking device.

Further, the position where the third and fourth shutter blades 24 and 25 fully open the lens aperture, as shown in FIG. 10, will be called a fully open position. A position where the lens aperture is closed by the shutter blades 24 and 25 with these blades swinging more than the rotation angle α2 on the holes 24a and 24b will be called a closed position.

FIGS. 12 to 16 are plan views showing the second pinion 22, the second driving ring 20, the closing blade ring 12, etc., as viewed in the direction of arrow E shown in FIG. 2. The direction of arrow D shown in FIG. 10 is the same as the direction of arrow F shown in FIGS. 12 to 16.

A position of the closing blade ring 12 where the lock pawl 17 engages the lock part 11k of the lower base plate 11, as shown in FIG. 12, corresponds to a position 5.β of FIG. 11. When the closing blade ring 12 is in this position, the lens aperture defined by the third and fourth shutter blades 24 and 25 is a little larger than a pinhole. The area of this aperture is a minimum aperture area of the shutter device in this case.

Figure 13:
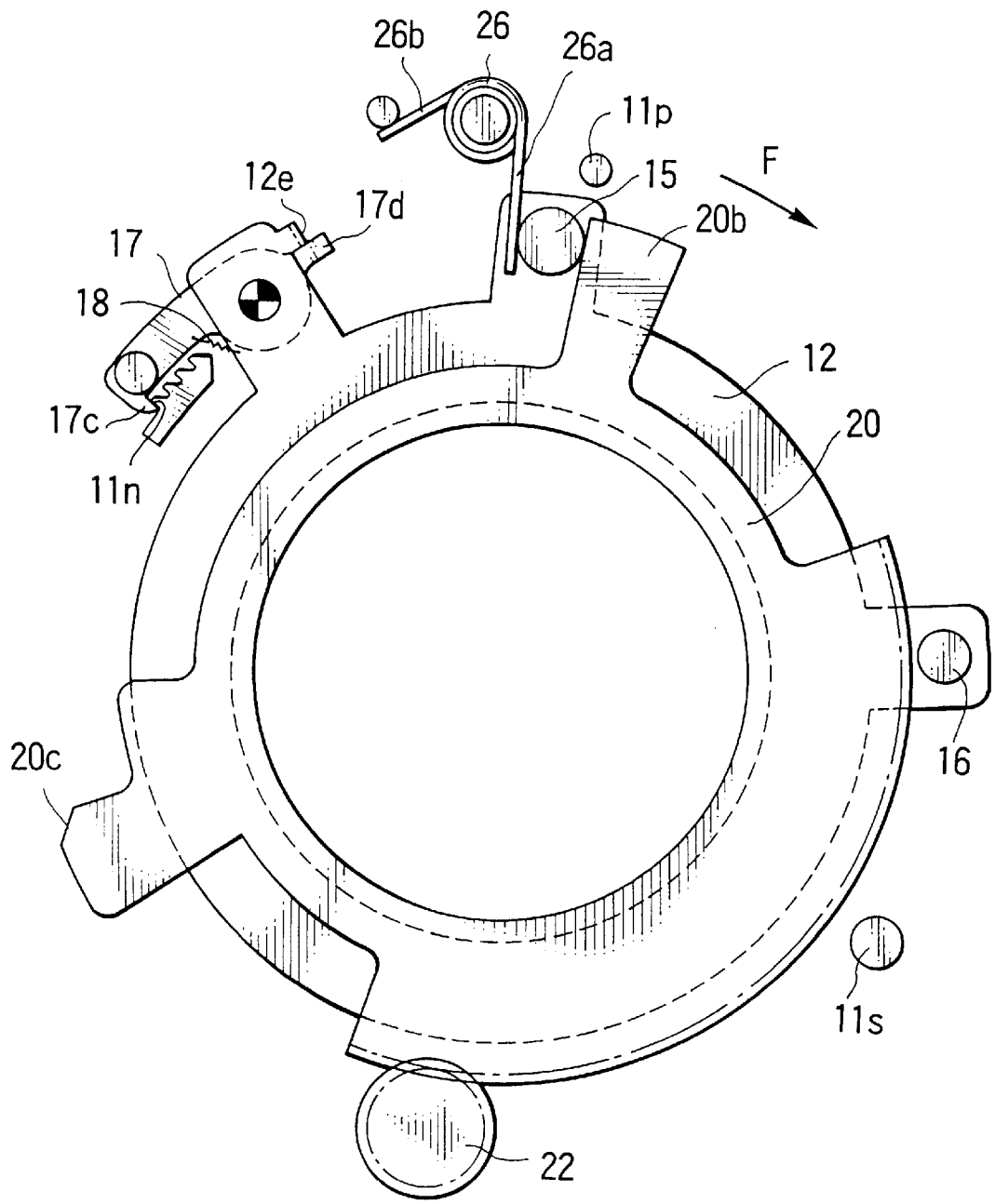
FIG. 13 is a plan view of the shutter device taken in the direction of arrow E of FIG. 2.

Another position of the closing blade ring 12 where the lock pawl 17 engages the lock part 11n of the lower base plate 11, as shown in FIG. 13, corresponds to the rotation angle position 0 degree of FIG. 11. When the closing blade ring 12 is in this position, the area of the aperture defined by the third and fourth shutter blades 24 and 25 is at a maximum area of the shutter device. The state shown in FIG. 13 is the same as the state shown in FIG. 10.

When the closing blade ring 12 is located in a position where the lock pawl 17 engages the lock part 11l or 11m of the lower base plate 11, the area of the lens aperture defined by the second light blocking device becomes an area corresponding to that position.

The operation of the second light blocking device is next described as follows.

FIG. 12 shows the second light blocking device in an initial position prior to a shutter release action. When the second stepping motor 21 is driven in response to a release signal, the driving force of the second stepping motor 21 is transmitted via the second pinion 22 to the second driving ring 20. Then the second driving ring 20 is caused to rotate in a direction reverse to the direction of arrow F. The arm 20b of the second driving ring 20 then pushes the pin 15 to cause the closing blade ring 12 to rotate. The lock pawl 17 can be caused to engage any of the lock parts 11k, 11l, 11m and 11n of the lower base plate 11 according to a desired aperture value by controlling the amount of driving of the second stepping motor 21.

However, in a case where the lock pawl 17 is to be caused to engage the lock part 11k, the second stepping motor 21 is left in its position without driving it. FIG. 13 shows a state in which the lock pawl 17 engages the lock part 11n to have the lens aperture in its fully open state.

Further, the position of the third and fourth shutter blades 24 and 25 set by the engagement of the lock pawl 17 with each of the lock parts 11k, 11l, 11m and 11n of the lower base plate 11 will be hereinafter called a stop position.

Next, the relation of the number of steps of the second stepping motor 21 to the rotation angle of the second driving ring 20 and that of the closing blade ring 12 is described as follows.

When the second driving ring 20 is caused to rotate reversely to the direction of arrow F by driving the second stepping motor 21 from its position shown in FIG. 12, the lock part of the lower base plate 11 which engages the lock pawl 17 shifts from the lock part 11k to other lock parts 11l, 11m and 11n. FIG. 13 shows a state obtained with the second stepping motor 21 driven by three steps. The following description will be given, by way of example, on the assumption that the device is in this state, i.e., the stop position of the third and fourth shutter blades 24 and 25 is at the fully open position.

Figure 14:
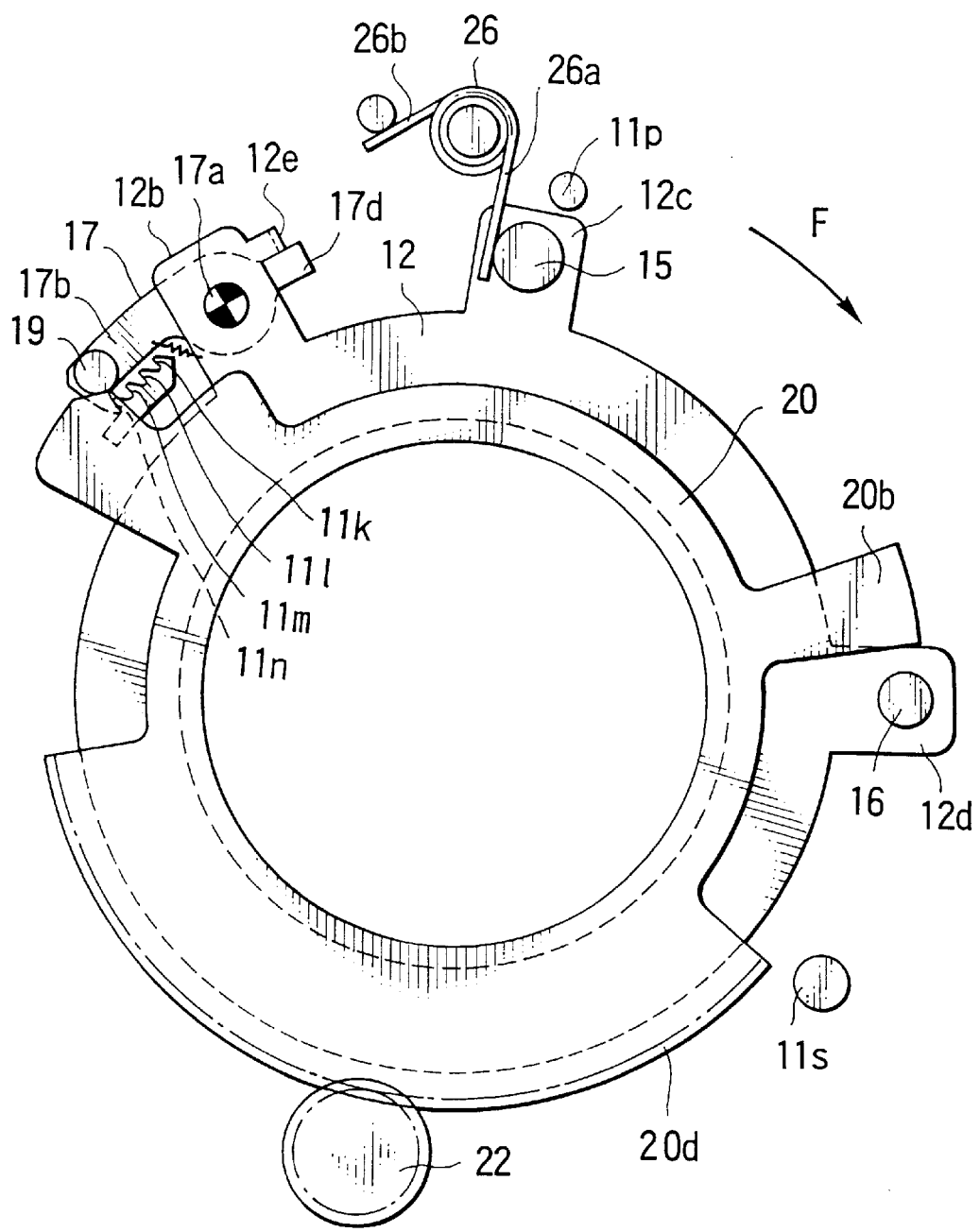
FIG. 14 is a plan view of the shutter device taken in the direction of arrow E of FIG. 2.

Next, when the second driving ring 20 is caused to rotate in the direction of arrow F by driving the second stepping motor 21, the cam face 20c of the second driving ring 20 comes to abut on the release pin 19 of the lock pawl 17 as shown in FIG. 14. The third and fourth shutter blades 24 and 25 still remain at the above-stated stop position even in this state.

When the second driving ring 20 is caused to further rotate in the direction of arrow F from this state, the cam face 20c pushes the lock pawl 17 up against the urging force of the spring 18. The lock pawl 17 is thus disengaged from the lock part 11n of the lower base plate 11.

Figure 15:
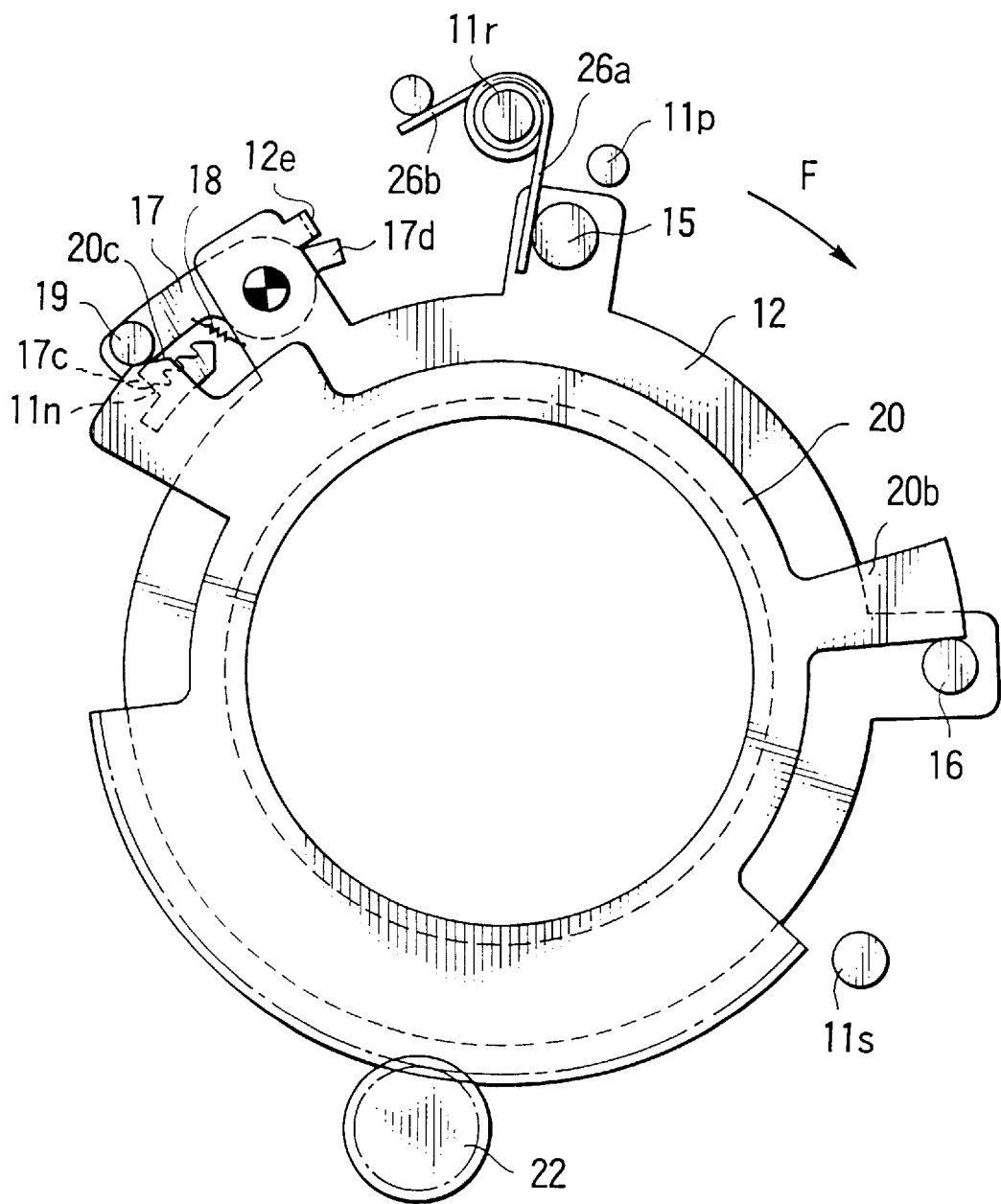
FIG. 15 is a plan view of the shutter device taken in the direction of arrow E of FIG. 2.

The second driving ring 20 has its arm 20b come to abut on the pin 16 immediately after the disengagement or unlocking of the lock pawl 17 and the lock part 11n and thus begins to move the closing blade ring 12 in the direction of arrow F as shown in FIG. 15. The moving action on the second driving ring 20 for moving it from its position shown in FIG. 13 to its position shown in FIG. 15 is carried out by rotating the second stepping motor 21 reversely to the direction of arrow F by 14 steps.

The moment of inertia of the second driving ring 20 is arranged to be sufficiently larger than those of the closing blade ring 12, the third shutter blade 24 and the fourth shutter blade 25. Therefore, the rotation of the second driving ring 20 is stably made thereafter with little deceleration. Further, while the second driving ring 20 is in process of moving from the position of FIG. 13 to the position of FIG. 15, the error of the lens aperture stopping-down speed by the second light blocking device with respect to the electrical signal applied for driving the second stepping motor 21 is very small, so that the aperture stopping-down speed can be sufficiently increased. This relation is equivalent to the relation between the driving signal applied to the first stepping motor 5 and the aperture opening speed of the first light blocking device.

When the closing blade ring 12 rotates to an extent of angle from the position 0 to a position 7.β of FIG. 11 corresponding to 7 steps of rotation of the second stepping motor 21, the third and fourth shutter blades 24 and 25 swing on the holes 24a and 25a up to the rotation (swing) angle α3 to bring the lens aperture from the fully open state to a totally closed state.

Until the rotating position of the closing blade ring 12 is brought from the position 7.β to a position 10.β by driving the second stepping motor 21 to rotate four steps, the third and fourth shutter blades 24 and 25 are kept in the closed state. Therefore, with the final stroke position attained as shown FIG. 16, even if the arm 12d of the closing blade ring 12 bounces by abutting on the stopper 11s of the lower base plate 11, the lens apertures can never be caused to open again by the bouncing.

After arrival of the second driving ring 20 at the position shown in FIG. 16 together with the closing blade ring 12, in bringing the state of FIG. 16 back to the initial state as shown in FIG. 12, the second driving ring 20 is caused to rotate reversely to the direction of arrow F by reversely rotating the second stepping motor 21. During this returning process, the arm 20b of the second driving ring 20 abuts on the pin 15 secured to the closing blade ring 12 to cause the closing blade ring 12 to rotate also reversely to the direction of arrow F. The state of FIG. 12 is resumed when the second stepping motor 21 is driven by a predetermined number of steps.

Figure 17:
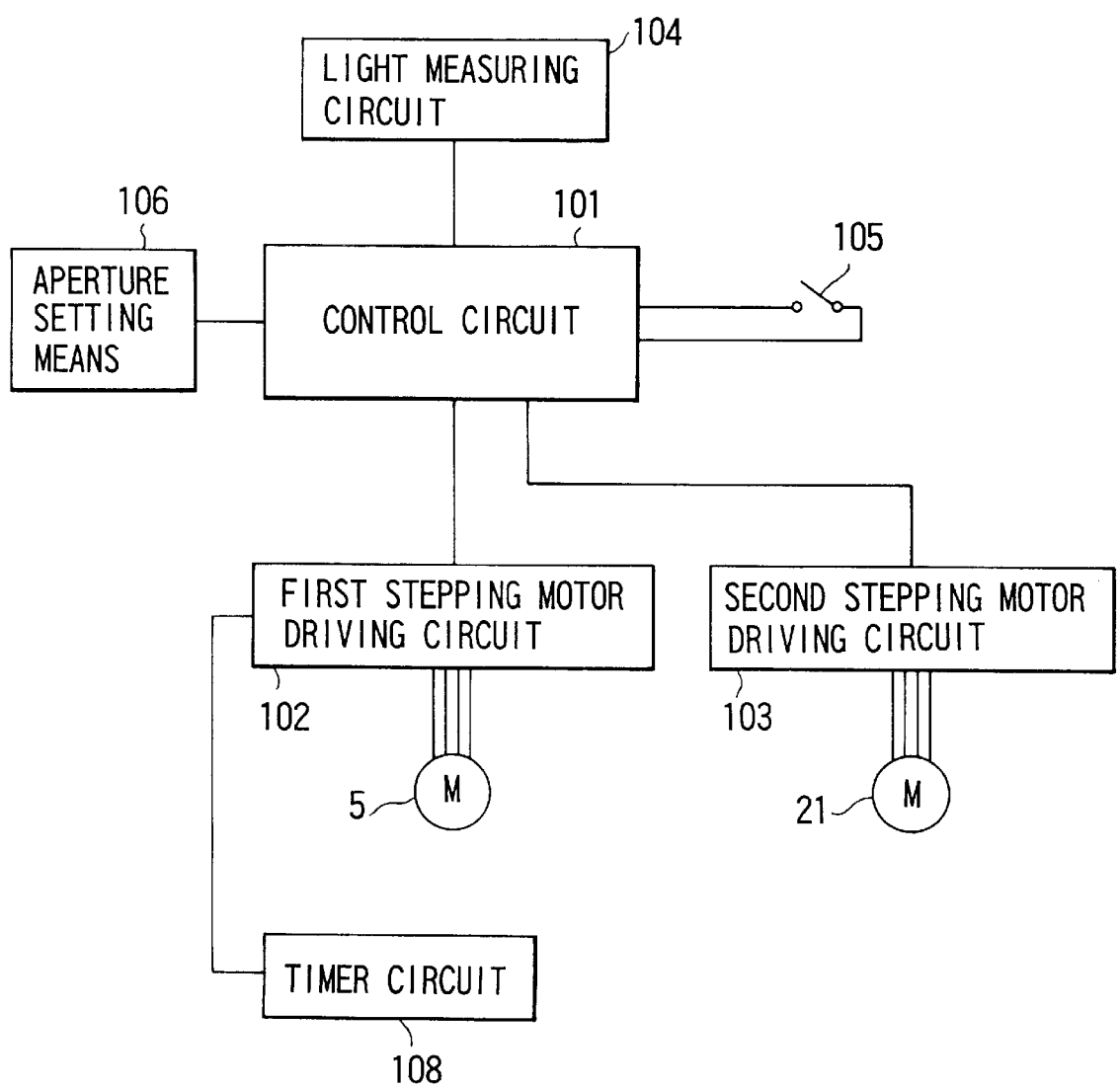
FIG. 17 is a block diagram showing an electric circuit arrangement.

FIG. 17 is a block diagram showing an electric circuit arrangement employed in this embodiment. In FIG. 17, a reference numeral 101 denotes a control circuit which is composed of a microcomputer, etc., and is arranged to control the sequence of actions of the whole device. A first stepping motor driving circuit 102 is arranged to drive the first stepping motor 5. A second stepping motor driving circuit 103 is arranged to drive the second stepping motor 21. A light measuring circuit 104 is arranged to measure in a known manner the luminance of an object to be photographed.

A reference numeral 105 denotes a release switch and a reference numeral 106 denotes an aperture setting means. The aperture setting means 106 is a switch composed of, for example, a pattern circuit board and contacts and is arranged to output such signals that correspond to aperture values which can be set in a plurality of steps (four steps in the case of this embodiment). When the operator operates the aperture setting means 106 to obtain a desired aperture value, the aperture setting means 106 outputs a signal which corresponds to the aperture value. A storage circuit is disposed within the control circuit 101 and stores a time table for setting an exposure time according to signals outputted from the light measuring circuit 104 and the aperture setting means 106.

Figure 18:
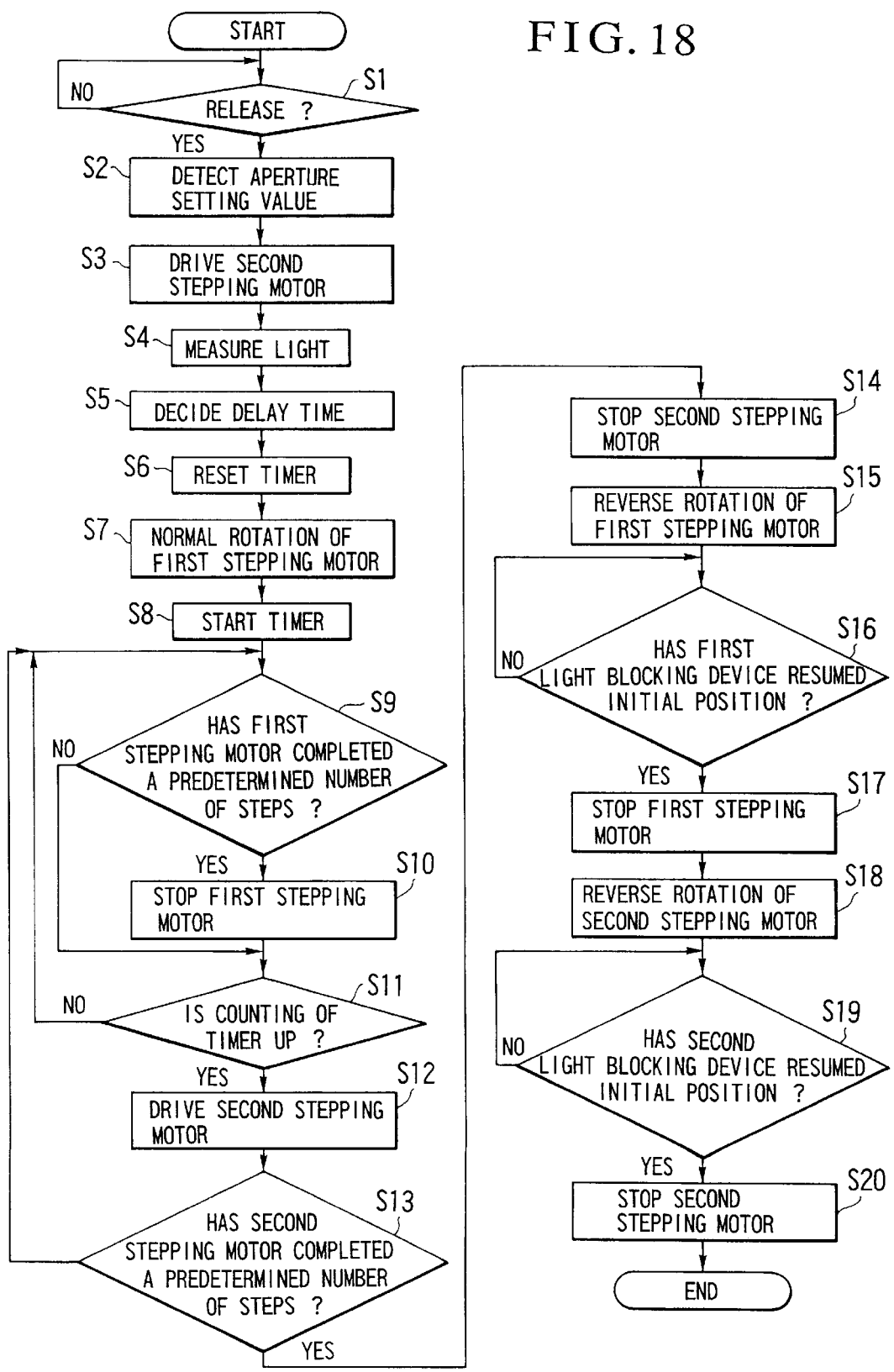
FIG. 18 is a flow chart showing an operation of a control circuit.

FIG. 18 is a flow chart showing an operation of the control circuit 101. The operation is described with reference to FIG. 18 as follows.

At a step S1, a check is made to find if the release switch 105 is turned on by pushing a release button which is not shown. If so, the flow of operation comes to a step S2. If not, the step S1 is repeated.

At the step S2, a signal outputted from the aperture setting means 106 is detected.

At a step S3, the second stepping motor driving circuit 103 is caused to drive the second stepping motor 21 according to the signal outputted from the aperture setting means 106. The second driving ring 20 and the closing blade ring 12 are then driven to rotate reversely to the direction of arrow F. The second light blocking device is thus set in a predetermined stop position, i.e., an aperture stopping-down position. After completion of this setting action, the second stepping motor 21 is brought to a stop.

At a step S4, the light measuring circuit 104 is caused to measure the luminance of an object to be photographed.

At a step S5, a delay time is selected from the time table stored in the storage circuit, on the basis of the relationship between the output signal of the aperture setting means 106 detected at the step S2 and the object luminance measured at the step S4. The delay time thus selected is used later at a step S11 as a count-up time for a timer circuit 108 which is shown in FIG. 17.

At a step S6, the timer circuit 108 is reset.

At a step S7, the first stepping motor driving circuit 102 is caused to drive the first stepping motor 5. The first light blocking device is then brought from the state shown in FIG. 3 into the state shown in FIG. 7. The first stepping motor 5 is driven according to driving frequency data which have been determined beforehand.

At a step S8, the timer circuit 108 is caused to begin counting a length of time elapsing from the commencement of driving the first stepping motor 5.

At a step S9, a check is made through the first stepping motor driving circuit 102 to find if the first stepping motor 5 has been driven by a predetermined number of steps (12 steps in the case of this embodiment as shown in FIG. 8). If so, the flow comes to a step S10. If not, the flow comes to the step S11 while allowing the driving action on the first stepping motor 5 to continue.

At the step S10, the first stepping motor driving circuit 102 is caused to stop the first stepping motor 5 from rotating.

At the step S11, a check is made to find if the time count by the timer circuit 108 started at the step S8 has reached a length of time set at the step S5. If not, the flow comes back to the step S9. If so, the flow comes to a step S12.

At the step S12, the second stepping motor driving circuit 103 is caused to drive the second stepping motor 21 according to the predetermined driving frequency data. The second driving ring 20 is thus caused to rotate in the direction of arrow F of FIG. 13.

At a step S13, a check is made through the second stepping motor driving circuit 103 to find if the second stepping motor 21 has been driven by a predetermined number of steps, i.e., until the second driving ring 20 reaches its position shown in FIG. 16. If so, the flow comes to a step S14. If not, the flow comes back to the step S9 while allowing the driving action on the second stepping motor 21 to continue.

At the step S14, the second stepping motor driving circuit 103 is caused to stop the second stepping motor 21.

At a step S15, for bringing the first light blocking device back to its state shown in FIG. 3, the first stepping motor driving circuit 102 is caused to begin to drive the first stepping motor 5 at a predetermined driving frequency.

At a step S16, a check is made to find if the first light blocking device has come back to the state of FIG. 3. If so, the flow comes to a step S17. If not, the flow repeats the step S16.

At the step S17, the first stepping motor driving circuit 102 is caused to stop the first stepping motor 5.

At a step S18, for bringing the second driving ring 20 back to its state shown in FIG. 12, the second stepping motor driving circuit 103 is caused to drive the second stepping motor 21 at a predetermined driving frequency.

At a step S19, a check is made to find if the second driving ring 20 has come back to the state of FIG. 12. If so the flow comes to a step S20. If not, the flow repeats the step S19.

At the step S20, the second stepping motor driving circuit 103 is caused to stop the second stepping motor 21 from rotating.

With the shutter device driven for an exposure in accordance with the sequence of actions described above, the area of the lens aperture varies as shown in FIGS. 19 to 22. In these drawings, time "t" having elapsed after the first stepping motor 5 is caused to make its normal rotation at the step S7 is shown on the axis of abscissa. The delay time set at the step S5 is indicated by a reference symbol T. The area of the lens aperture formed by the first light blocking device is indicated by a reference symbol "a". The area of the lens aperture formed by the second light blocking device is indicated by a reference symbol "b". In each of FIGS. 19 to 22, a part shown with hatching represents the area actually used for the exposure by the shutter device as a whole.

As apparent from these drawings, the arrangement of varying a difference in start time between the first stepping motor 5 and the second stepping motor 21, i.e., the above-stated delay time T, causes the position of the curve "b" relative to the curve "a" to shift to the right or left as viewed on these drawings. Then, the amount of exposure indicated by hatching varies accordingly.

Figure 19:
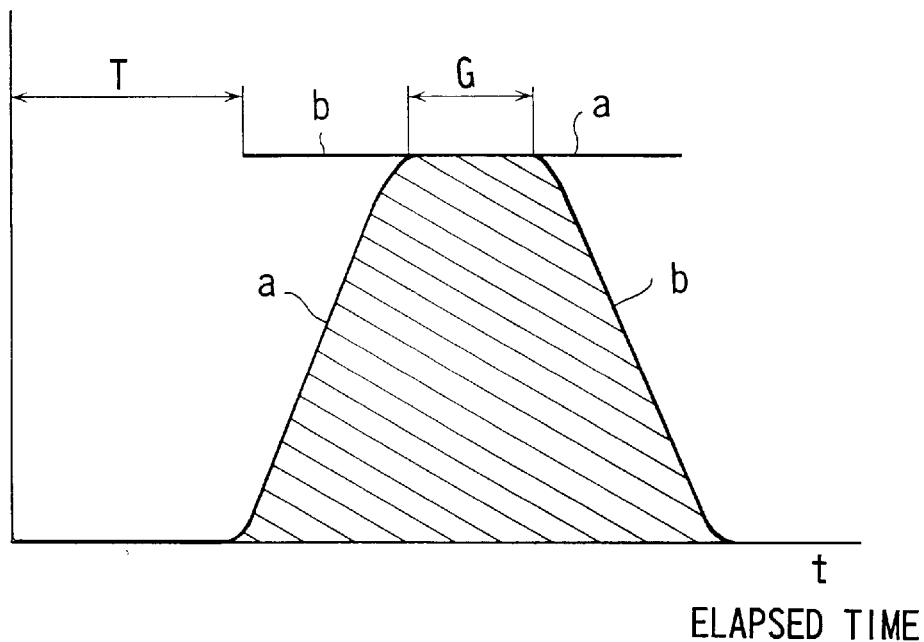
FIG. 19 is a graph showing a state of exposure.
Figure 20:
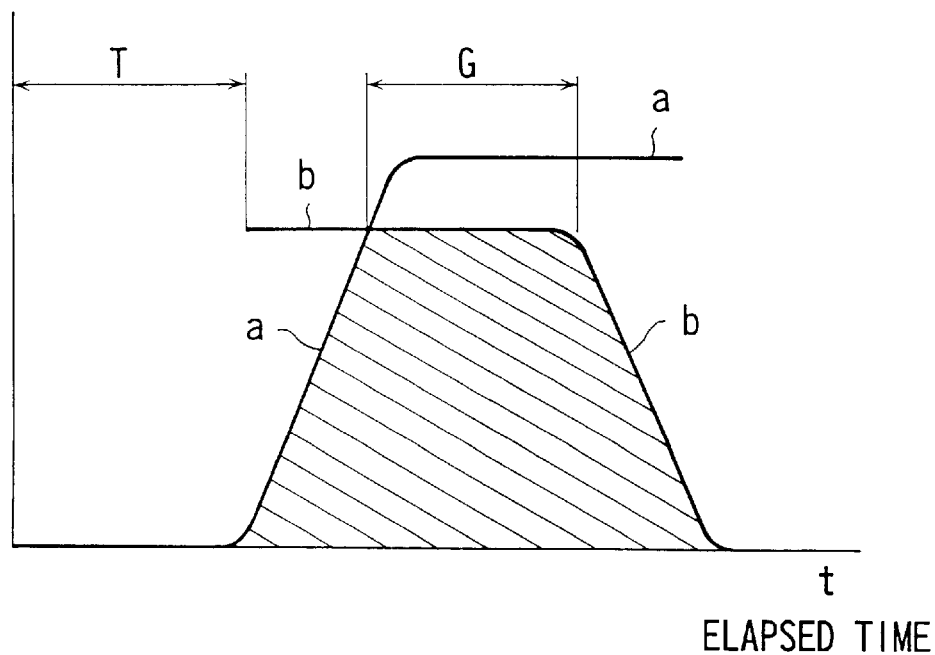
FIG. 20 is a graph showing a state of exposure.
Figure 21:
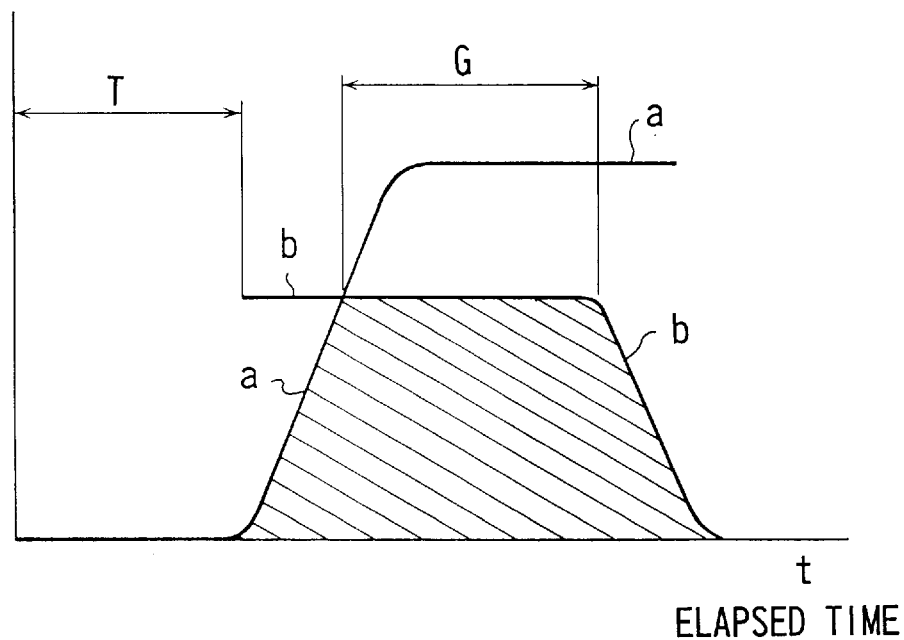
FIG. 21 is a graph showing a state of exposure.
Figure 22:
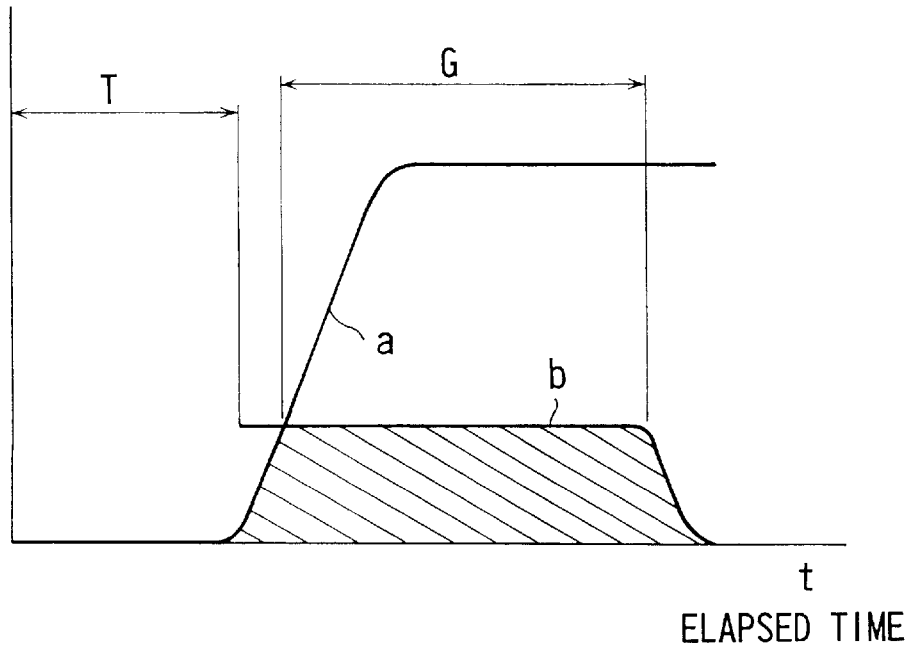
FIG. 22 is a graph showing a state of exposure.

Of these drawings, FIG. 19 shows a case where the lock pawl 17 engages the lock part 11n of the lower base plate 11. FIG. 20 shows a case where the lock pawl 17 engages the lock part 11m of the lower base plate 11. FIG. 21 shows a case where the lock pawl 17 engages the lock part 11l of the lower base plate 11. FIG. 22 shows another case where the lock pawl 17 engages the lock part 11k of the lower base plate 11.

As apparent from these drawings, the shutter device which is the first embodiment of this invention is arranged to allow the second light blocking device to begin a closing action after the lapse of a predetermined length of time (determined by the delay time T) from a point of time at which the position of an opening action of the first light blocking device passes a point which corresponds to the stop position of the second light blocking device. By virtue of this arrangement, an exposure can be made effectively using an aperture area corresponding to the set aperture value during almost the whole period of time of exposure indicated by a reference symbol G in each of these drawings. Therefore, a desired depth of field can be obtained for a main object.

Second Embodiment

Figure 23:
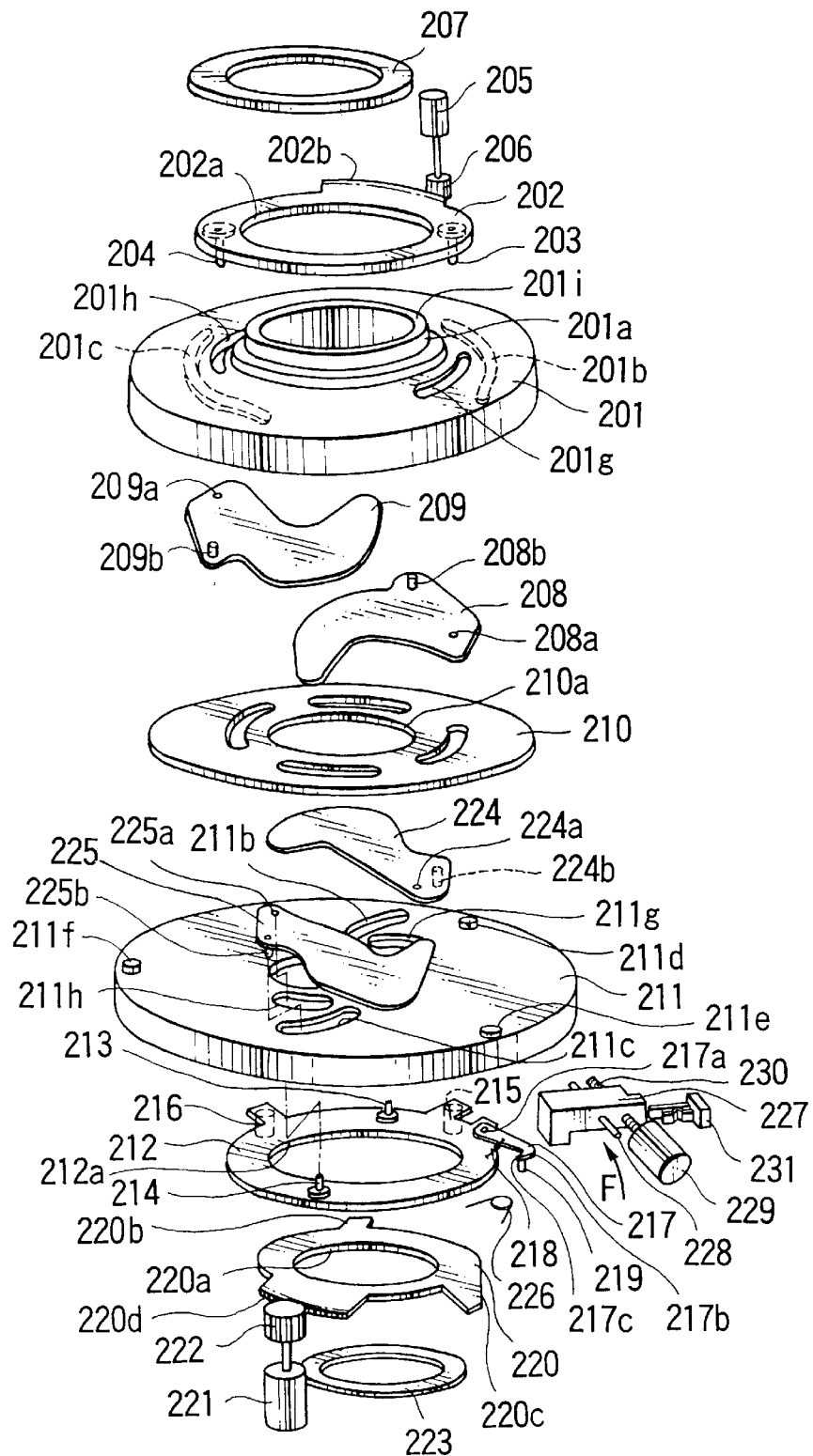
FIG. 23 is an oblique view showing essential parts of a shutter device which is a second embodiment.
Figure 24:
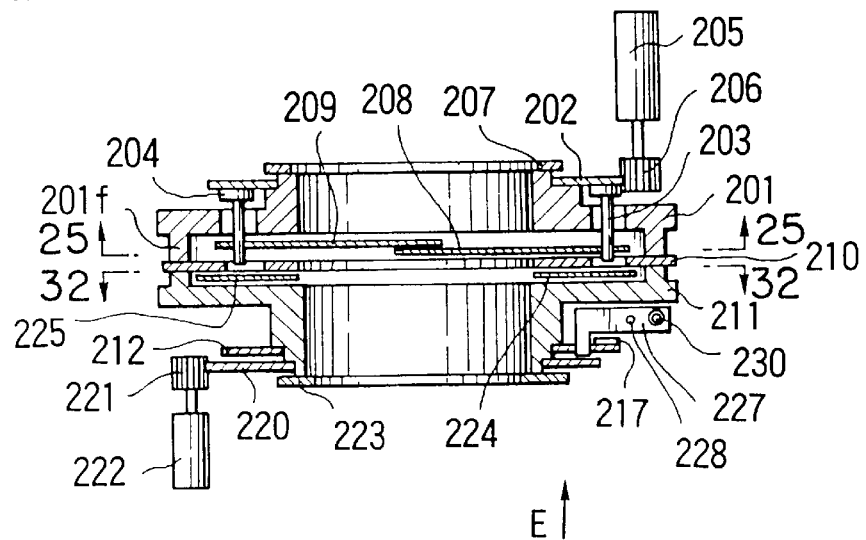
FIG. 24 is a sectional view showing the shutter device which is the second embodiment.

FIGS. 23 to 44 relate to a shutter device which is arranged as a second embodiment of this invention. FIG. 23 is an oblique view showing the relationship between component parts of the shutter device. FIG. 24 is a sectional view. Referring to FIGS. 23 and 24, the shutter device includes an upper base plate 201 and a first driving ring 202. An inner diametral part 202a of the first driving ring 202 is rotatably fitted on a cylindrical part 201a formed in the middle of the upper base plate 201.

Driving pins 203 and 204 are secured to the lower side of the first driving ring 202. A first stepping motor 205 is capable of making stepwise Indexing rotation in a known manner at predetermined unit rotation angles.

A first pinion 206 is secured to the output shaft of the first stepping motor 205. The first pinion 206 is in mesh with a gear part 202b of the first driving ring 202 and is arranged to transmit the rotative driving force of the first stepping motor 205 to the first driving ring 202. A first retaining plate 207 is secured to the top face 201i of the cylindrical part 201a to prevent the first driving ring 202 from coming off after the first driving ring 202 is fitted on the cylindrical part 201a as shown in FIG. 24.

A first shutter blade 208 has a hole 208a. The above-stated driving pin 203 is revolvably fitted in the hole 208a through a slot 201g formed in the upper base plate 201. A pin 208b is formed on the upper surface of the first shutter blade 208 and is slidably fitted into a cam groove 201b which is formed in the lower surface of the upper base plate 201.

A second shutter blade 209 has a hole 209a. The above-stated driving pin 204 is revolvably fitted in the hole 209a through a slot 201h formed in the upper base plate 201. A pin 209b is formed on the upper surface of the second shutter blade 209. The pin 209b is slidably fitted into a cam groove 201c which is formed in the lower surface of the upper base plate 201.

A blade retaining plate 210 has an aperture part 210a formed in the middle thereof. The first shutter blade 208 and the second shutter blade 209 are held within a space formed between the upper base plate 201 and the blade retaining plate 210 and are arranged to be movable in the planar direction of the space. To form the space between the upper base plate 201 and the blade retaining plate 210, there are formed projections 201d, 201e and 201f which extend from the lower surface of the upper base plate 201.

The shutter device also has a lower base plate 211 and a closing blade ring 212. The inner diametral part 212a of the closing blade ring 212 is rotatably fitted on a cylindrical part 211a formed in the middle of the lower base plate 211. Driving pins 213 and 214 are secured to the upper surface of the closing blade ring 212. Pins 215 and 216 are secured to arms 212c and 212d which are two of three arms formed on the periphery of the closing blade ring 212.

A lock pawl 217 is mounted on another arm 212b of the closing blade ring 212 and arranged to be swingable on a pin 217a. A claw part 217c which is formed at the fore end of the lock pawl 217 is arranged to be capable of engaging a bent-up part 212e (see FIG. 34, etc.) of the arm 212b of the closing blade ring 212. The engagement of these parts restricts the counterclockwise swinging motion of the lock pawl 217 as viewed on FIG. 34.

A coiled tension spring 218 has its one end secured to the closing blade ring 212 and the other end to the lock pawl 217. The coiled spring 218 is thus arranged to urge the lock pawl 217 to move counterclockwise as viewed on FIG. 34. The coiled spring 218 may be replaced with some other suitable elastic member such as a torsion spring or a compression spring.

Figure 34:
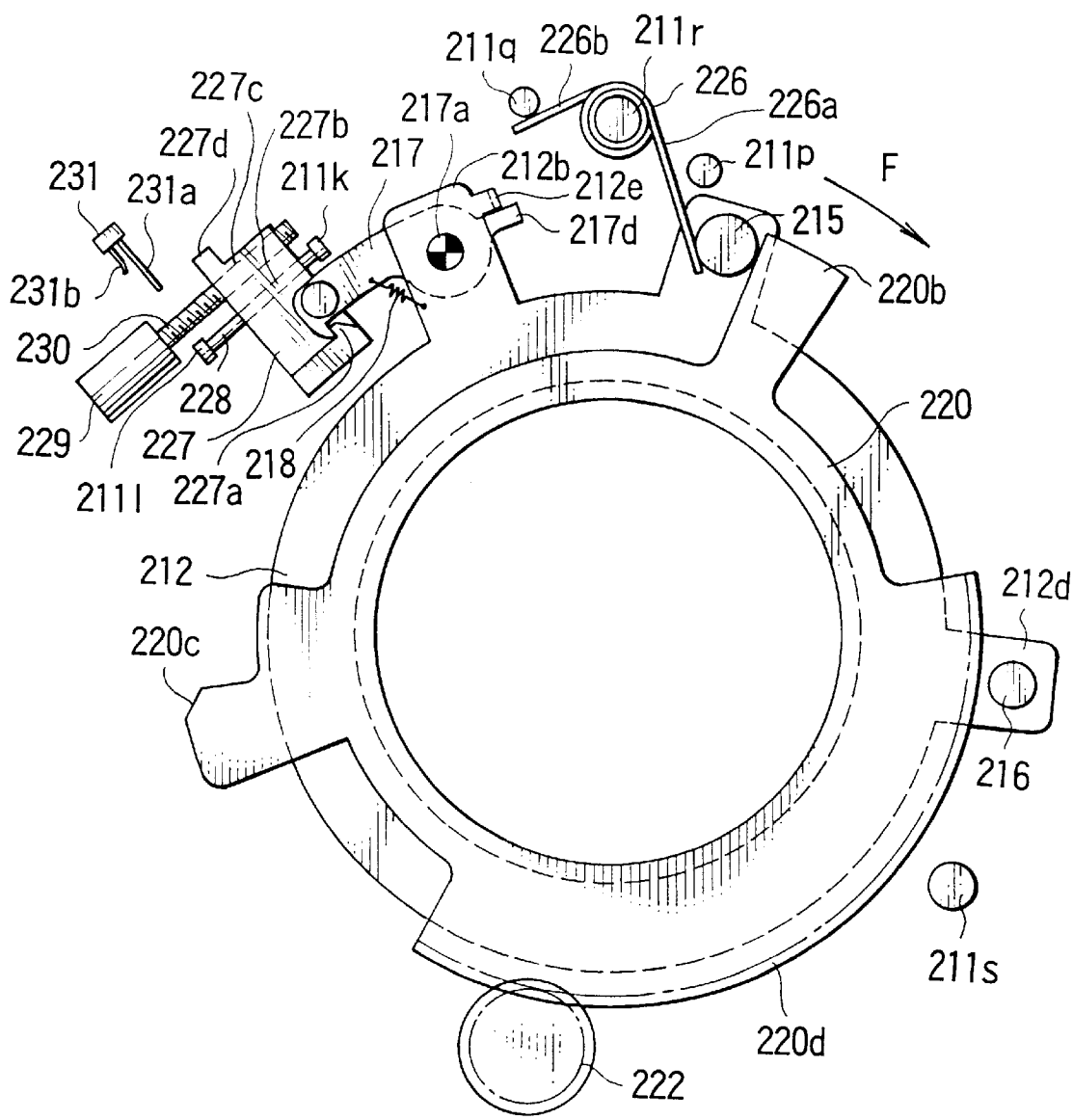
FIG. 34 is a plan view of the second embodiment taken in the direction of arrow E of FIG. 24.

The claw part 217c of the lock pawl 217 is arranged to be capable of engaging, for example, a lock part 227a formed on a lock member 227 which will be described later, as shown in FIG. 34. A release pin 219 is secured to an arm part 217b of the lock pawl 217 and is arranged to be capable of abutting on a cam face 220c of a second driving ring 220.

The second driving ring 220 is rotatably fitted at its inner diametral part 220a on a cylindrical part 211j formed in the middle of the lower base plate 211 (around an optical axis). An arm 220b which is formed on the second driving ring 220 is arranged to be capable of abutting on the above-stated pins 215 and 216.

As shown in FIG. 34, etc., a stopper 211s is formed on the lower base plate 211. The rotation of the closing blade ring 212 in the direction of arrow F is restricted with the arm 212d of the closing blade ring 212 coming to abut on the stopper 211s.

A second stepping motor 221 is arranged to be capable of making stepwise indexing rotation in a known manner at predetermined unit rotation angles.

A second pinion 222 is secured to the output shaft of the second stepping motor 221. The second pinion 222 is in mesh with a gear part 220d of the second driving ring 220 and is thus arranged to transmit the rotative driving force of the second stepping motor 221 to the second driving ring 220. A second retaining plate 223 is arranged, as shown in FIG. 24, to be fitted on the cylindrical part 211j of the lower base plate 211 and, after that, secured to the top part 211i of the cylindrical part 211j in such a way as to prevent the second driving ring 220 from coming off.

As shown in FIG. 34, a torsion spring 226 has its coiled part mounted on the periphery of a projection 211r formed on the lower surface of the lower base plate 211. One arm 226b of the torsion spring 226 engages a projection 211q of the lower base plate 211 and the other arm 226a engages the pin 215 of the closing blade ring 212. The torsion spring 226 is thus arranged to urge the closing blade ring 212 to move in the direction of arrow F as shown in FIG. 34. By virtue of the urging force of the torsion spring 226, when the lock pawl 217 engages the lock part 227a of the lock member 227 which will be described later, the rotating position of the closing blade ring 212 is stably restricted. A projection 211p which is formed on the lower side of the lower base plate 211 is located in a position to be capable of engaging the arm 226a of the torsion spring 226. Although the arm 226a is not engaging the projection 211p in the state of FIG. 34, the arm 226a comes to engage the projection 211p, parting from the pin 215, when the closing blade ring 212 rotates in the direction of arrow F from the state of FIG. 34.

A third shutter blade 224 has a hole 224a. The driving pin 213 which comes through a slot 211g formed in the lower base plate 211 is rotatably fitted into the hole 224a. A pin 224b which is secured to the third shutter blade 224 is slidably fitted into a cam groove 211b formed in the upper surface of the lower base plate 211.

A fourth shutter blade 225 has a hole 225a. The driving pin 214 which comes through a slot 211h formed in the lower base plate 211 is rotatably fitted into the hole 225a. A pin 225b which is secured to the fourth shutter blade 225 is slidably fitted into a cam groove 211c formed in the upper surface of the lower base plate 211.

The third and fourth shutter blades 224 and 225 are held to be movable in the planar direction within a space formed between the lower base plate 211 and the blade retaining plate 210. Projections 211d, 211e and 211f are formed on the upper surface of the lower base plate 211 and arranged to secure the space between the blade retaining plate 210 and the lower base plate 211.

The lock member 227 is provided with the lock part 227a which is arranged to be capable of engaging the claw part 217c of the lock pawl 217. There is provided a guide bar 228 which is secured at its two ends to holding parts 211k and 211l formed on the lower base plate 211. The guide bar 228 is slidably fitted into a guide hole 227b of the lock member 227. A third stepping motor 229 is secured to the lower base plate 211. The third stepping motor 229 is also arranged to be capable of making stepwise indexing rotation at predetermined unit rotation angles in a known manner.

A screw member 230 is secured to the output shaft of the third stepping motor 229. A female screw part 227c formed in the lock member 227 engages the screw member 230. When the third stepping motor 229 is driven, the lock member 227 moves in the axial direction of the screw member 230 while being guided by the guide bar 228 in a state of being prevented from rotating by the guide bar 228.

A switch 231 which consists of contact pieces 231a and 231b is secured to the lower base plate 211. The contact piece 231a is arranged to come into contact with the protruding part 227d of the lock member 227. When the lock member 227 moves to a predetermined position, the switch 231 turns on or off.

Figure 25:
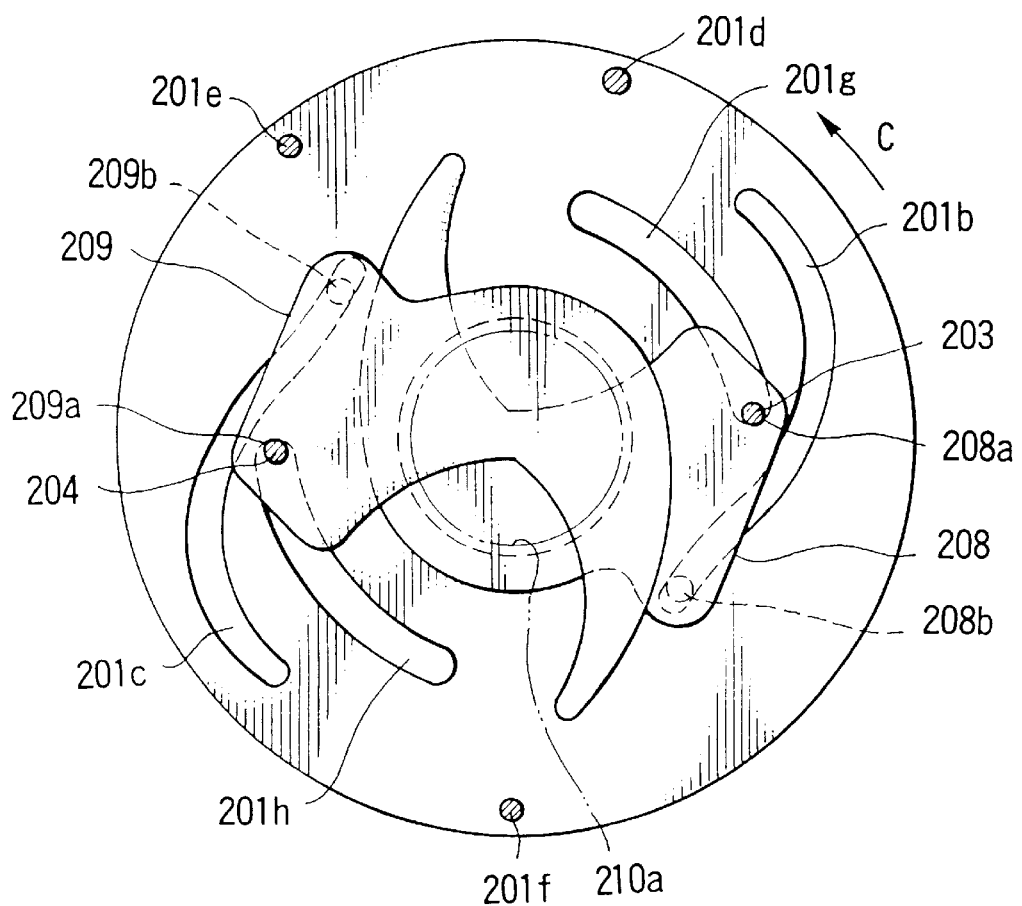
FIG. 25 is a section taken on a line 25—25 of FIG. 24 showing a first light blocking device in a plan view.

FIG. 25 is a sectional view taken on a line 25—25 of FIG. 24 showing the embodiment as viewed in the direction of arrows 25—25. In the state shown in FIG. 25, the aperture part 210a is closed by the first and second shutter blades 208 and 209. When the first driving ring 202 carrying the driving pins 203 and 204 is rotated in the direction of arrow C from this state, the driving pins 203 and 204 respectively move within the slots 201g and 201h to allow the first and second shutter blades 208 and 209 to move around the optical axis. At this moment, since the pins 208b and 209b are fitted respectively in the cam grooves 201b and 201c, the first shutter blade 208 swings on the hole 208a and the second shutter blade 209 swings on the hole 209a. The lens aperture is opened wider according to and as the shutter blades 208 and 209 swing in this manner.

Figure 26:
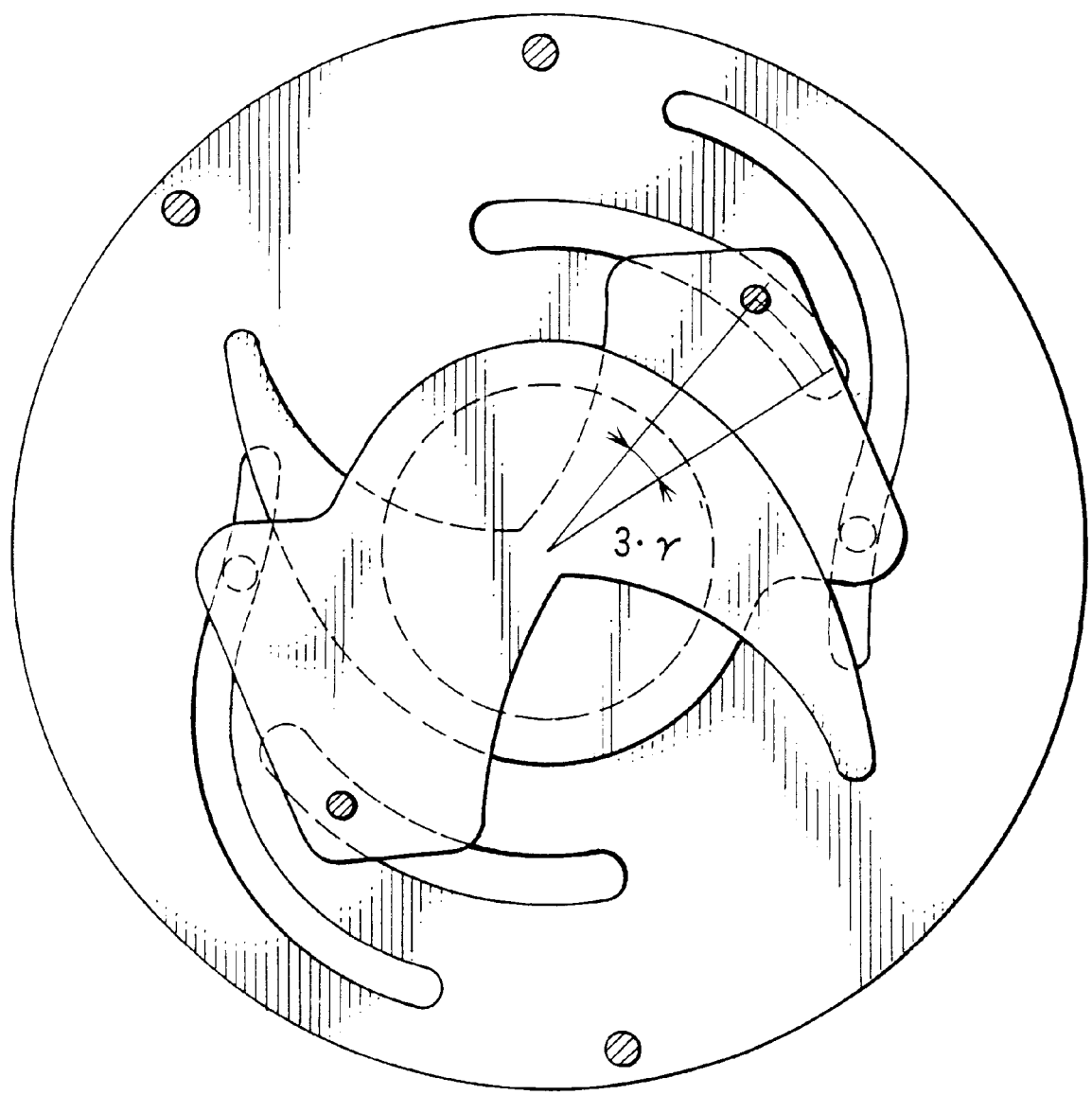
FIG. 26 is a plan view showing the first light blocking device in a state obtained after driving it three steps by a first stepping motor.

Under this condition, when the first stepping motor 205 is driven to rotate by one step, the first driving ring 202 rotates on the optical axis as much as an amount γ. The cam grooves 201b and 201c are arranged, as shown in FIG. 26, not to allow the first and second shutter blades 208 and 209 to swing on the holes 208a and 209a even if the first driving ring 202 rotates from the state of FIG. 25 as much as 3.γ, i.e., even if the first stepping motor 205 is driven by three steps. The first and second shutter blades 208 and 209 which rotate around the optical axis are thus arranged to be swung on the holes 208a and 209a by the subsequent steps of the first stepping motor 205.

Figure 27:
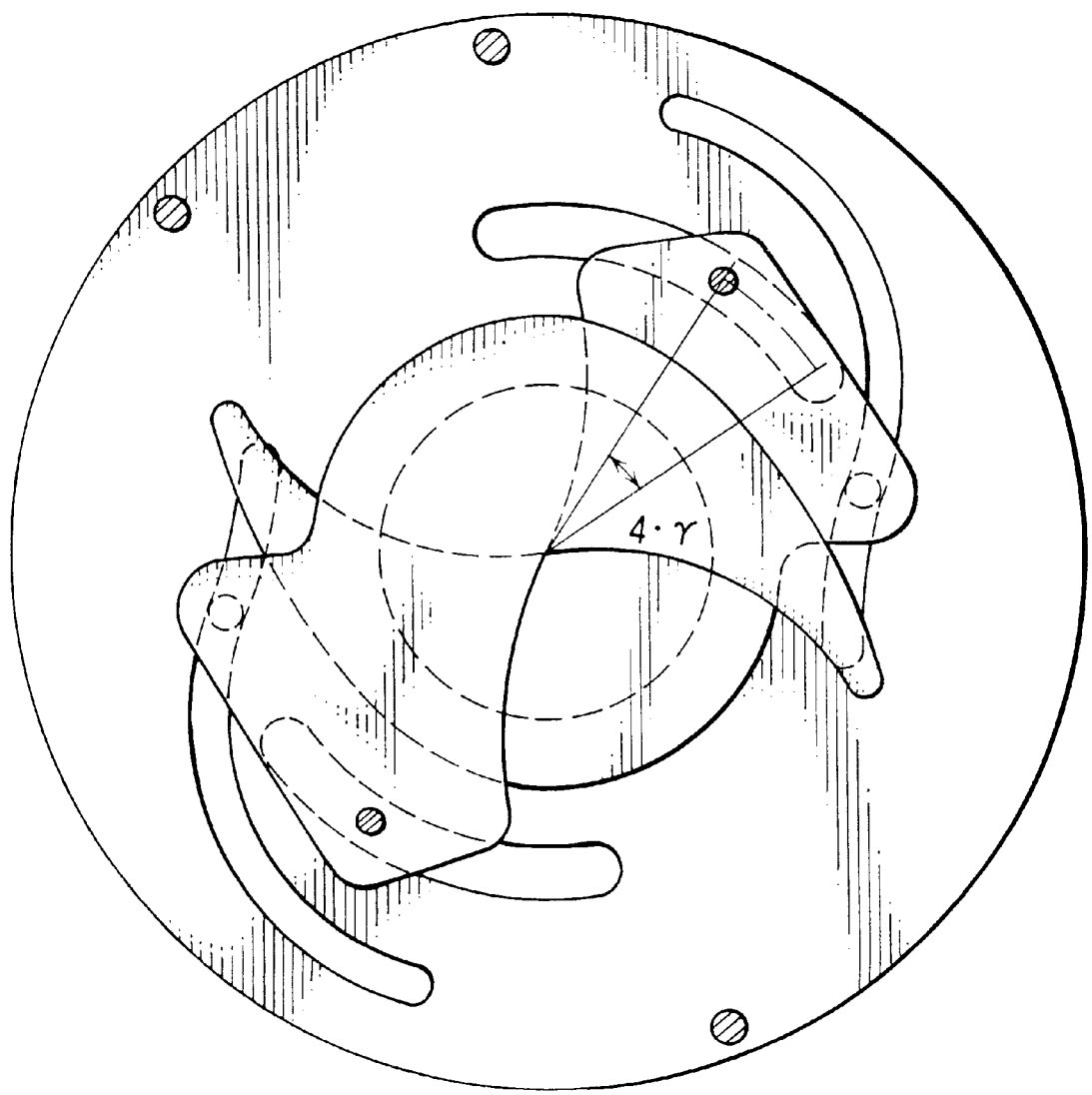
FIG. 27 is a plan view showing the first light blocking device in a state obtained after driving it four steps by the first stepping motor.
Figure 28:
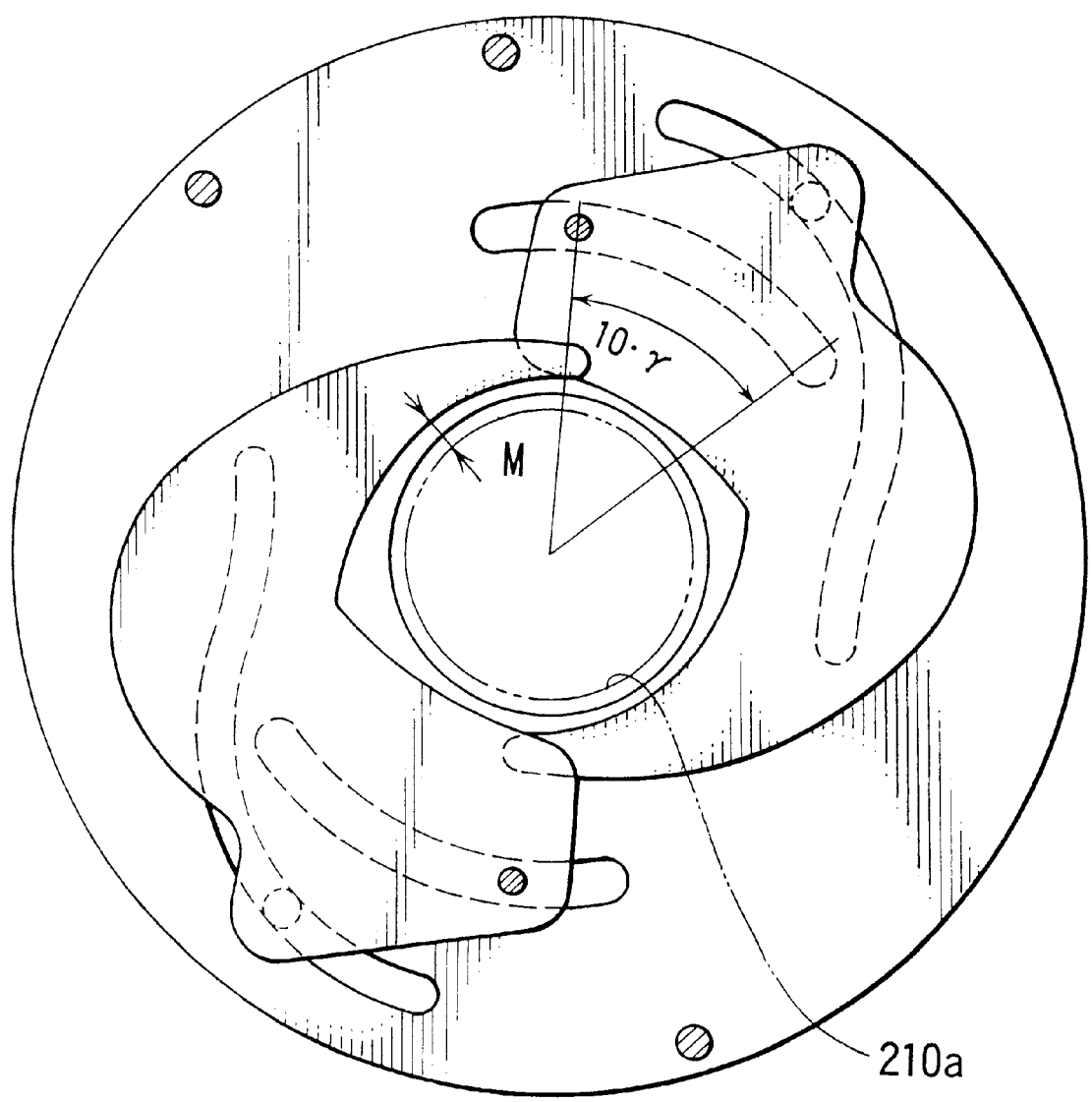
FIG. 28 is a plan view showing the first light blocking device in a state obtained after driving it ten steps by the first stepping motor.

As shown in FIG. 27, at the fourth step of the first stepping motor 205, i.e., at a rotating position 4.γ from the initial position of the first driving ring 202, the lens aperture defined by the first shutter blade 208 and the second shutter blade 209 comes to assume a pinhole state. Then, as shown in FIG. 28, the lens aperture is caused to assume a fully open state by the tenth step of the first stepping motor 205, i.e., at the rotating position 10.γ from the initial position of the first driving ring 202. The shutter blades 208 and 209 are then retracted as much as an escaping amount M from the aperture part 210a of the blade retaining plate 210.

Figure 29:
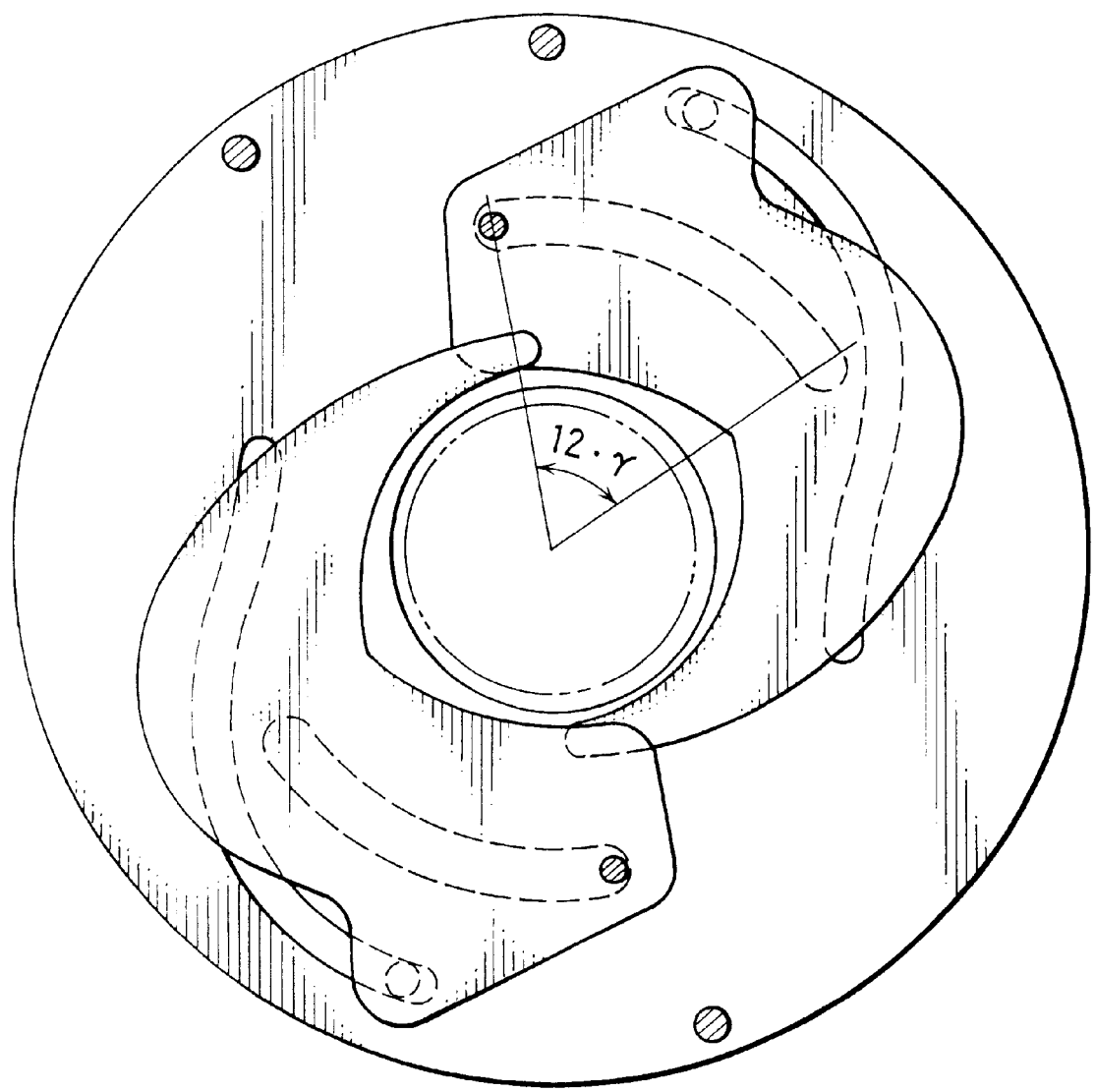
FIG. 29 is a plan view showing the first light blocking device in a state obtained after driving it twelve steps by the first stepping motor.

The cam grooves 201b and 201c are arranged such that, at the steps after the tenth step of the first stepping motor 205, the first and second shutter blades 208 and 209 are kept in their fully open states and not allowed to swing on the holes 208a and 209a. They are then allowed only to rotate on the optical axis along with the first driving ring 202. A state obtained by the twelfth step which gives the final rotating position of the first driving ring 202 is as shown in FIG. 29.

Figure 30:
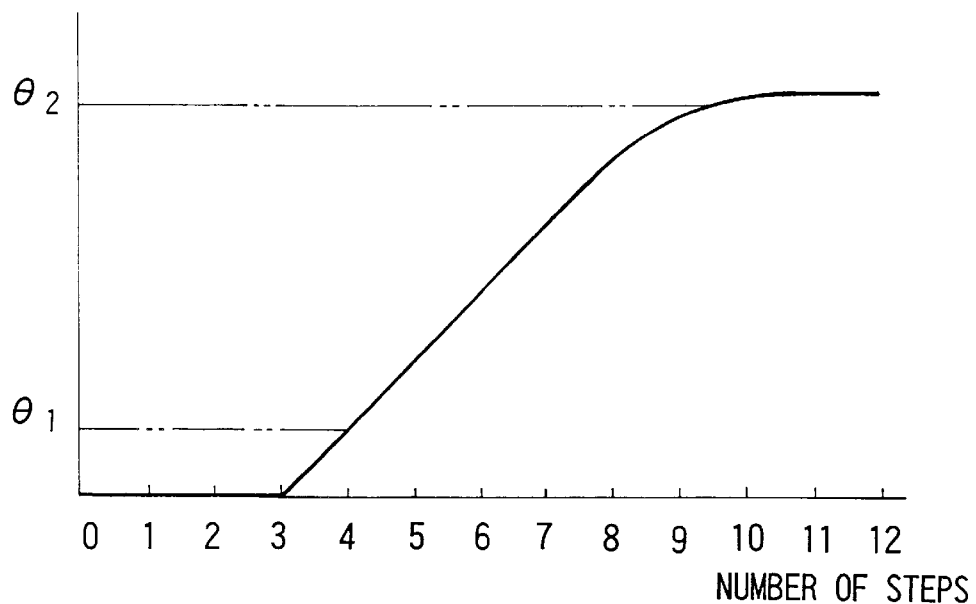
FIG. 30 is a graph showing the blade rotation angle of the first light blocking device in relation to the number of steps of the stepping motor.

FIG. 30 shows in a graph the angle of rotation (swing) of the first and second shutter blades 208 and 209 on the holes 208a and 209a in relation to the number of steps of the first stepping motor 205. The lens aperture is a pinhole when the rotation angle θ is θ1 (at the fourth step) and is fully open when the rotation angle θ is θ2 (at the tenth step).

Figure 31:
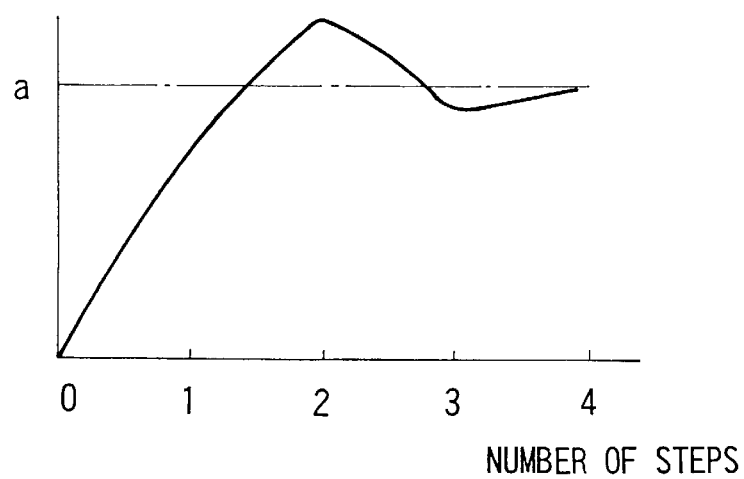
FIG. 31 is a graph showing the characteristic of the stepping motor.

FIG. 31 shows in a graph the characteristic of the stepping motor. As apparent from this graph, when a driving electric signal is inputted to cause the rotation speed of the stepping motor, for example, to be a speed "a", the stepping motor does not instantly respond to the input signal. A certain number of steps (3 or 4 steps in this case) are necessary before the actual rotation speed of the stepping motor reaches the speed "a". Therefore, in the case of this embodiment, the lens aperture is arranged to be opened by steps subsequent to the fourth step of the first stepping motor 205. This arrangement makes the error of a shutter opening speed with respect to the speed set by an electrical signal very small. Further, it is to be understood that this invention is not limited to the numbers of steps mentioned herein, which are set by way of example only.

The escaping amount M of the shutter blades 208 and 209 obtained away from the aperture part 210a in the state of having the lens aperture fully open, as shown in FIG. 28, is small. However, with the actual final stroke arranged to be made at the twelfth step as shown in FIG. 29, the shutter blades 208 and 209 never bounce back into the aperture part 210a in their final stroke positions.

The light blocking device consisting-of the first and second shutter blades 208 and 209, the first driving ring 202 and the first stepping motor 205 hereinafter will be called a first light blocking device.

The position of the device at which the lens aperture is closed by the first and second shutter blades 208 and 209 as shown in FIG. 25 will be called a closed position. The position at which the lens aperture is fully opened by the first and second shutter blades 208 and 209 as shown in FIGS. 28 and 29 will be called a fully open position.

Figure 32:
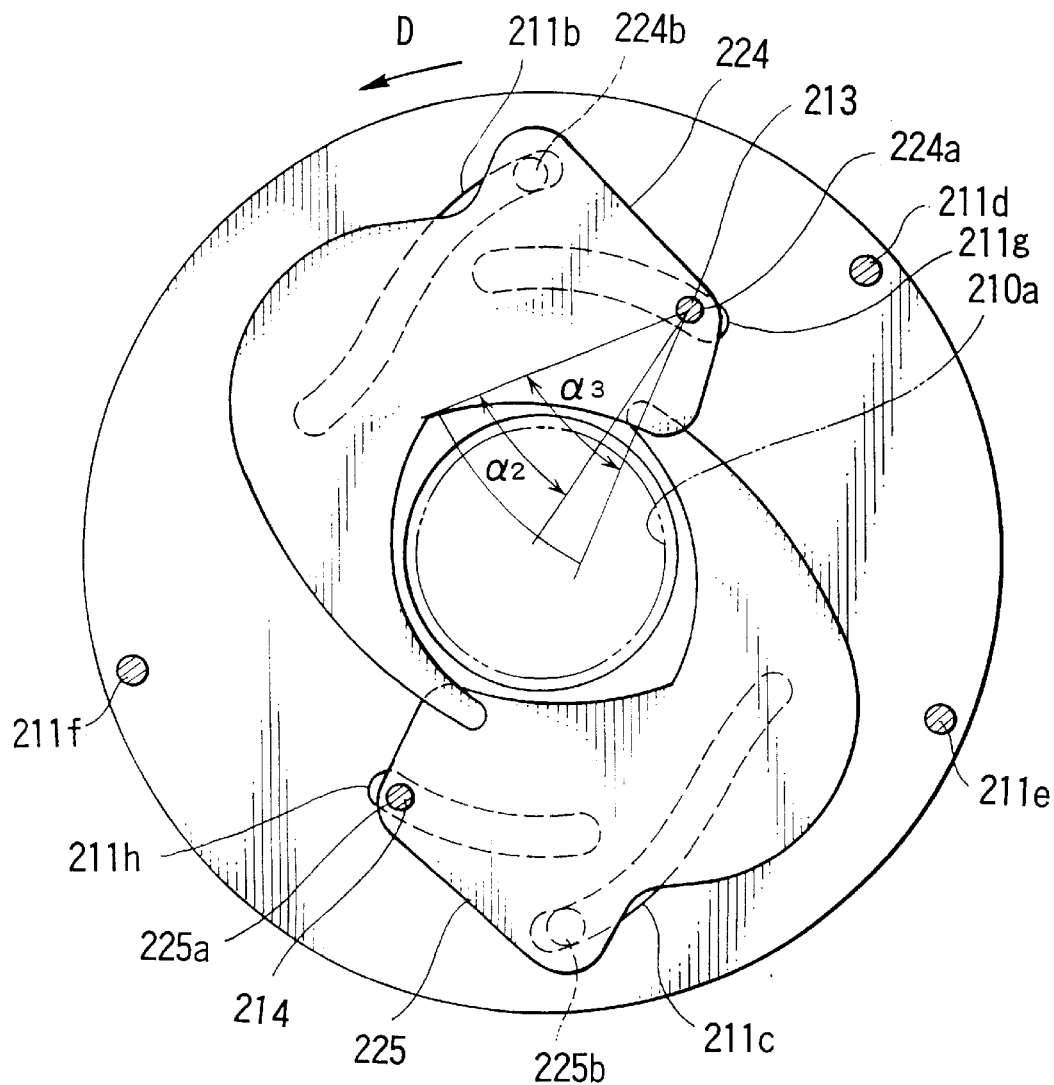
FIG. 32 is a section taken on a line 32—32 of FIG. 24 showing a second light blocking device in a plan view.
Figure 33:
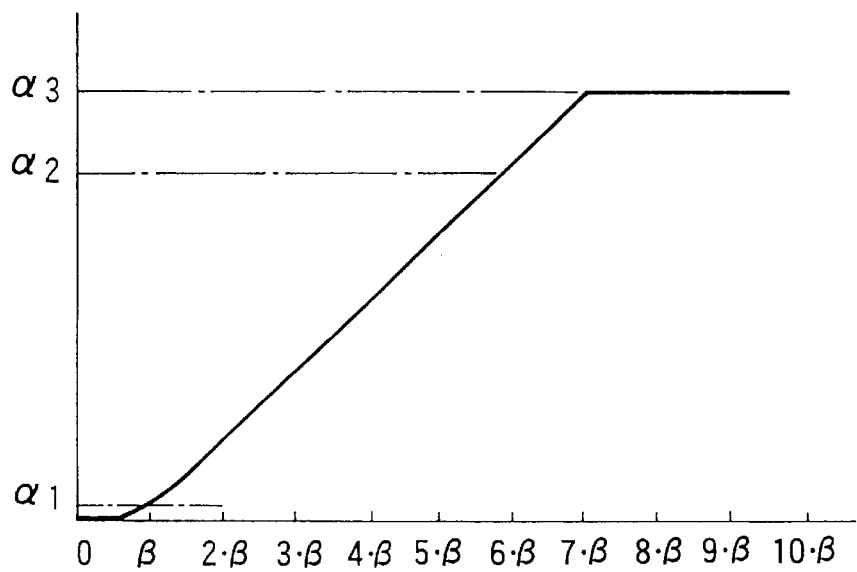
FIG. 33 is a graph showing the blade rotation angle of the second light blocking device in relation to the amount of rotation of a closing blade ring.

FIG. 32 is a sectional view taken on a line 32—32 of FIG. 24 showing the embodiment as viewed in the direction of arrows 32—32. Referring to FIG. 32, when the closing blade ring 212 is driven to move in the direction of arrow D by an arrangement which will be described later herein, the third and fourth shutter blades 224 and 225 move around the optical axis and, at the same time, also swing on the holes 224a and 225a while moving within the cam grooves 211b and 211c. FIG. 33 shows the rotation angle α of the rotation (swing) of the third and fourth shutter blades 224 and 225 on the holes 224a and 225a in relation to the rotation angle of the second driving ring 220. In FIG. 33, the axis of abscissa shows the angle of rotation of the closing blade ring 212 in the direction of arrow D. The position of it shown in FIG. 32 is indicated as 0 degree while its final stroke position is indicated as 10.β degrees. The term "the final stroke position" as used herein means a position where the arm 212d of the closing blade ring 212 abuts on the stopper 211s of the lower base plate 211. The axis of ordinate shows the rotation angle α of the swinging motions of the third and fourth shutter blades 224 and 225 on the holes 224a and 225a.

As apparent from this graph, the cam grooves 211b and 211c of the lower base plate 211 are arranged to allow the rotation angle α of the shutter blades 224 and 225 to be increased by the rotation of the closing blade ring 212 up to its position 7.β and to prevent the rotation angle α of the shutter blades 224 and 225 from being increased any further by the further rotation of the closing blade ring 212. In other words, the third and fourth shutter blades 224 and 225 are allowed only to rotate around the optical axis while the closing blade ring 212 rotates between its positions 7.β and 10.β.

In FIGS. 32 and 33, a reference symbol α1 denotes a rotation angle at which the third and fourth shutter blades 224 and 225 come inside of the aperture part 210a and another rotation angle α2 is an angle at which the lens aperture is stopped down to a pinhole state.

The light blocking device consisting of the third shutter blade 224, the fourth shutter blade 225 and the closing blade ring 212 will be hereinafter called a second light blocking device.

Further, the position where the third and fourth shutter blades 224 and 225 fully open the lens aperture, as shown in FIG. 32, will be called a fully open position. A position where the lens aperture is closed by the shutter blades 224 and 225 with these blades swinging more than the rotation angle α2 on the holes 224*a* and 224*b* will be called a closed position.

FIGS. 34 to 38 are plan views showing the second pinion 221, the second driving ring 220, the closing blade ring 212, etc., as viewed in the direction of arrow E of FIG. 24. The direction of arrow D shown in FIG. 32 is the same as the direction of arrow F of FIGS. 34 to 38.

A position of the closing blade ring 212 where the lock pawl 217 engages the lock member 227 disposed at the right end of the guide bar 228, as shown in FIG. 34, corresponds to a position 5.β of FIG. 33. When the closing blade ring 212 is in this position, the lens aperture defined by the third and fourth shutter blades 224 and 225 is a little larger than a pinhole. The area of the lens aperture obtained at this time is a minimum aperture area of the shutter device in this case.

Figure 35:
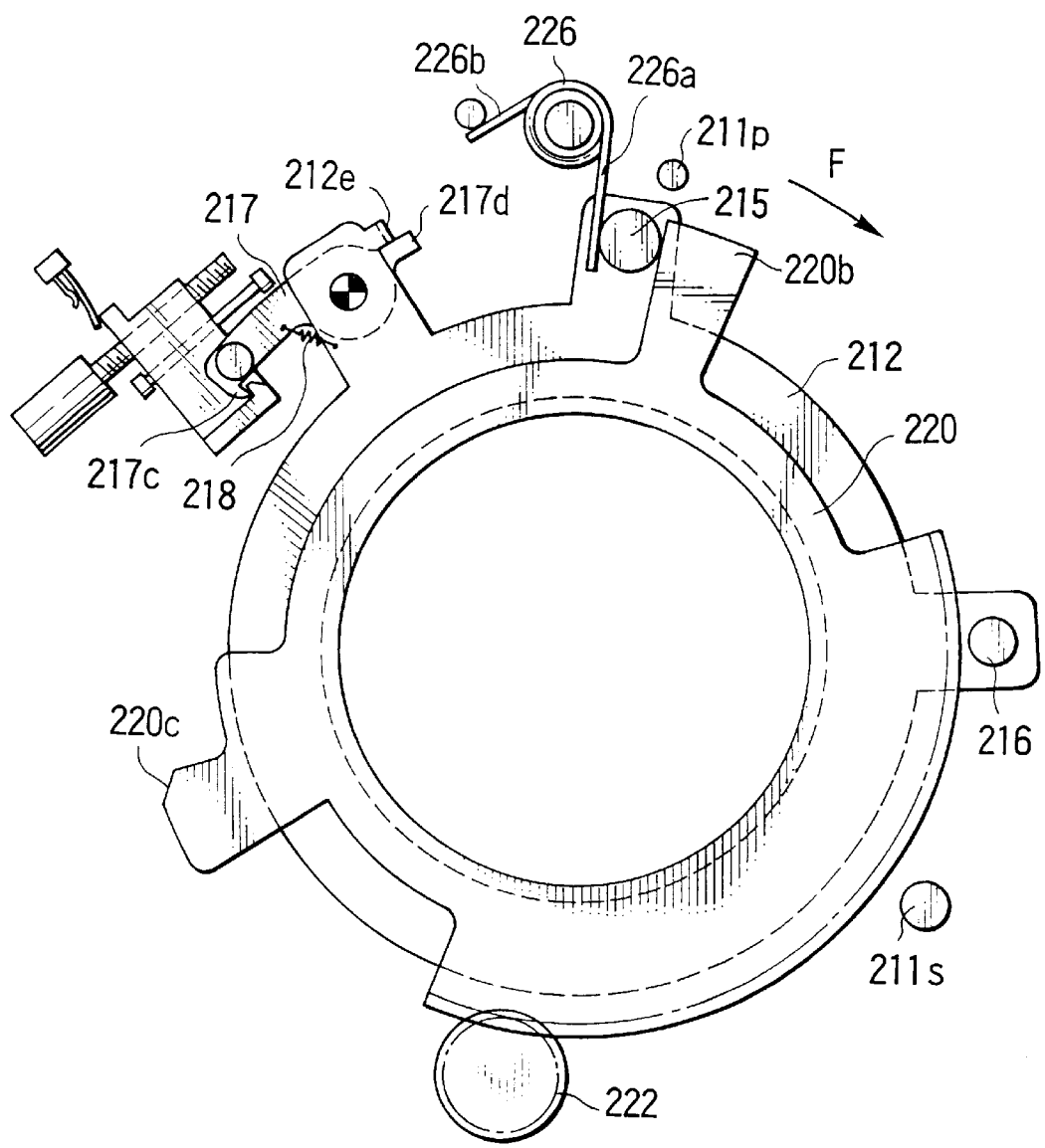
FIG. 35 is a plan view of the second embodiment taken in the direction of arrow E of FIG. 24.

Another position of the closing blade ring 212 where the lock pawl 217 engages the lock member 227 disposed at the left end of the guide bar 228, as shown in FIG. 35, corresponds to the rotation angle position 0 degree of FIG. 33. When the closing blade ring 212 is in this position, the area of the lens aperture thus defined by the third and fourth shutter blades 224 and 225 is a maximum area of the shutter device. This state is the same as the state shown in FIG. 32.

Further, the lock member 227 is movable by the screw member 230 between its position shown in FIG. 34 and another position shown in FIG. 35. The area of the lens aperture set by the second light blocking device corresponds to the position of the lock member 227.

The operation of the second light blocking device is next described as follows.

FIGS. 34 and 35 show the second light blocking device in an initial position prior to a shutter release action. When the third stepping motor 229 is driven with a main switch which is not shown turned on, the screw member 230 rotates to move the lock member 227 in the axial direction of the screw member 230. When the lock member 227 moves in a state of engaging the lock pawl 217, the closing blade ring 212 also rotates. The closing blade ring 212 thus can be rotated to a position corresponding to a desired aperture value by controlling the amount of driving of the third stepping motor 229.

Since the screw member 230 is arranged to be driven by means of a stepping motor, the current aperture opening area of the camera can be known by storing information on the initial lens aperture (opening) area and the number of driving steps of the stepping motor. After that, even if the setting aperture value is changed, an aperture corresponding to the aperture value newly set can be obtained by driving the stepping motor as much as a number of steps corresponding to the change.

Since the lock member 227 is in screwed connection with the screw member 230, it is possible to arrange the lock member 227 to be finely moved for each step of rotation of the stepping motor by arranging the screw member 230 to have a smaller screw pitch. The use of the stepping motor permits indexing work on the rotating position of the screw member 230 to be accurately and reliably carried out. Further, the position of the third and fourth shutter blades 224 and 225 defined by the engagement of the lock pawl 217 and the lock member 227 will be hereinafter called a stop position.

Next, the relation of the number of steps of the second stepping motor 221 to the rotation angle of the second driving ring 220 and that of the closing blade ring 212 is described as follows. The description is given on the assumption that a shutter closing action begins in the state shown in FIG. 35, i.e., when the stop position of the third and fourth shutter blades 224 and 225 is a fully open position.

Figure 36:
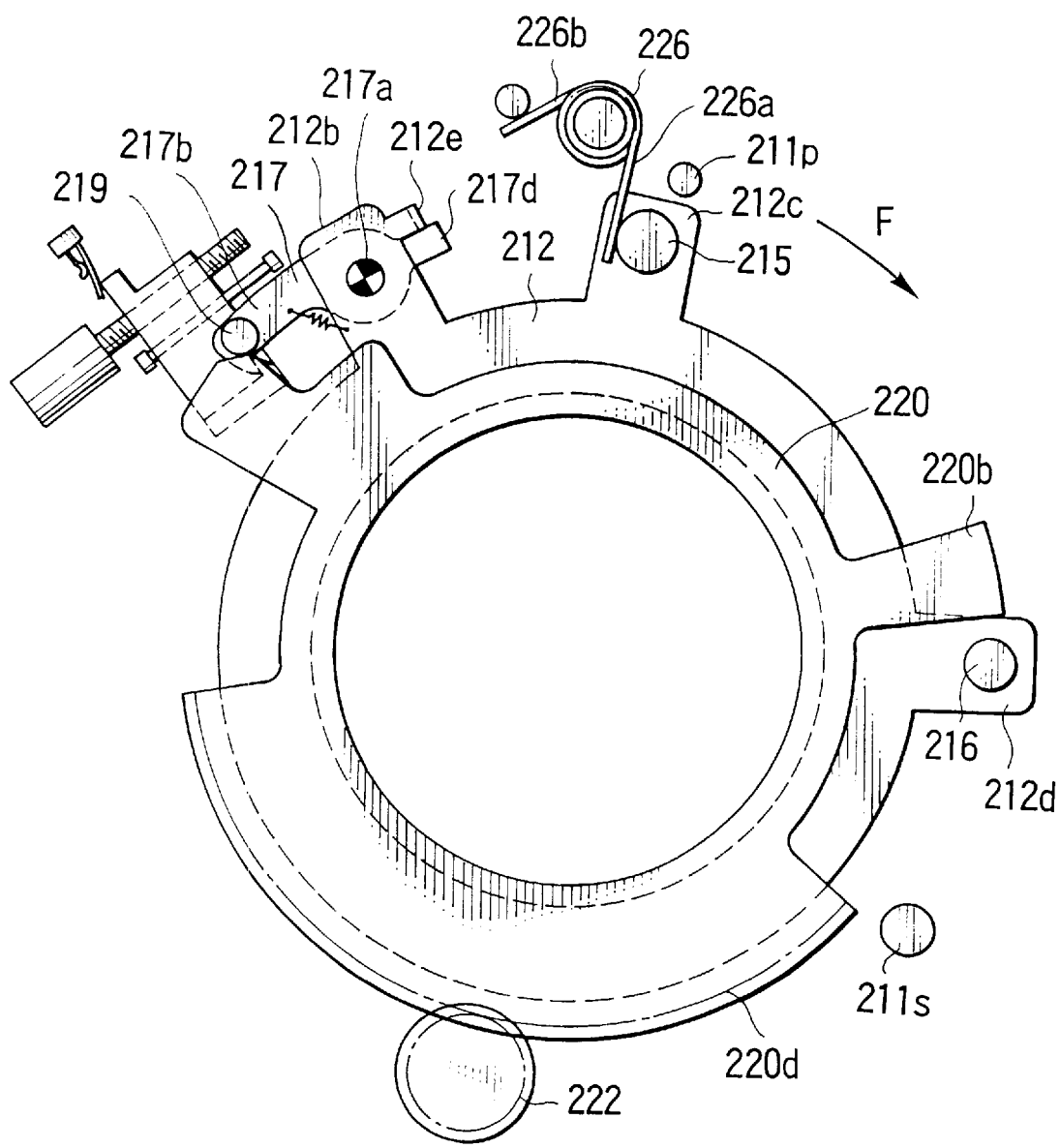
FIG. 36 is a plan view of the second embodiment taken in the direction of arrow E of FIG. 24.

When the second stepping motor 221 is driven to cause the second driving ring 220 to rotate in the direction of arrow F from its position shown in FIG. 35, the cam face 220*c* of the second driving ring 220 comes to abut on the release pin 219 of the lock pawl 217 as shown in FIG. 36. In a state thus obtained, the third and fourth shutter blades 224 and 225 still remain in the above-stated stop position.

When the second driving ring 220 is caused to further rotate in the direction of arrow F from this state, the cam face 220*c* pushes the lock pawl 217 upward against the urging force of the spring 218. The lock pawl 217 is thus disengaged from the lock member 227.

Figure 37:
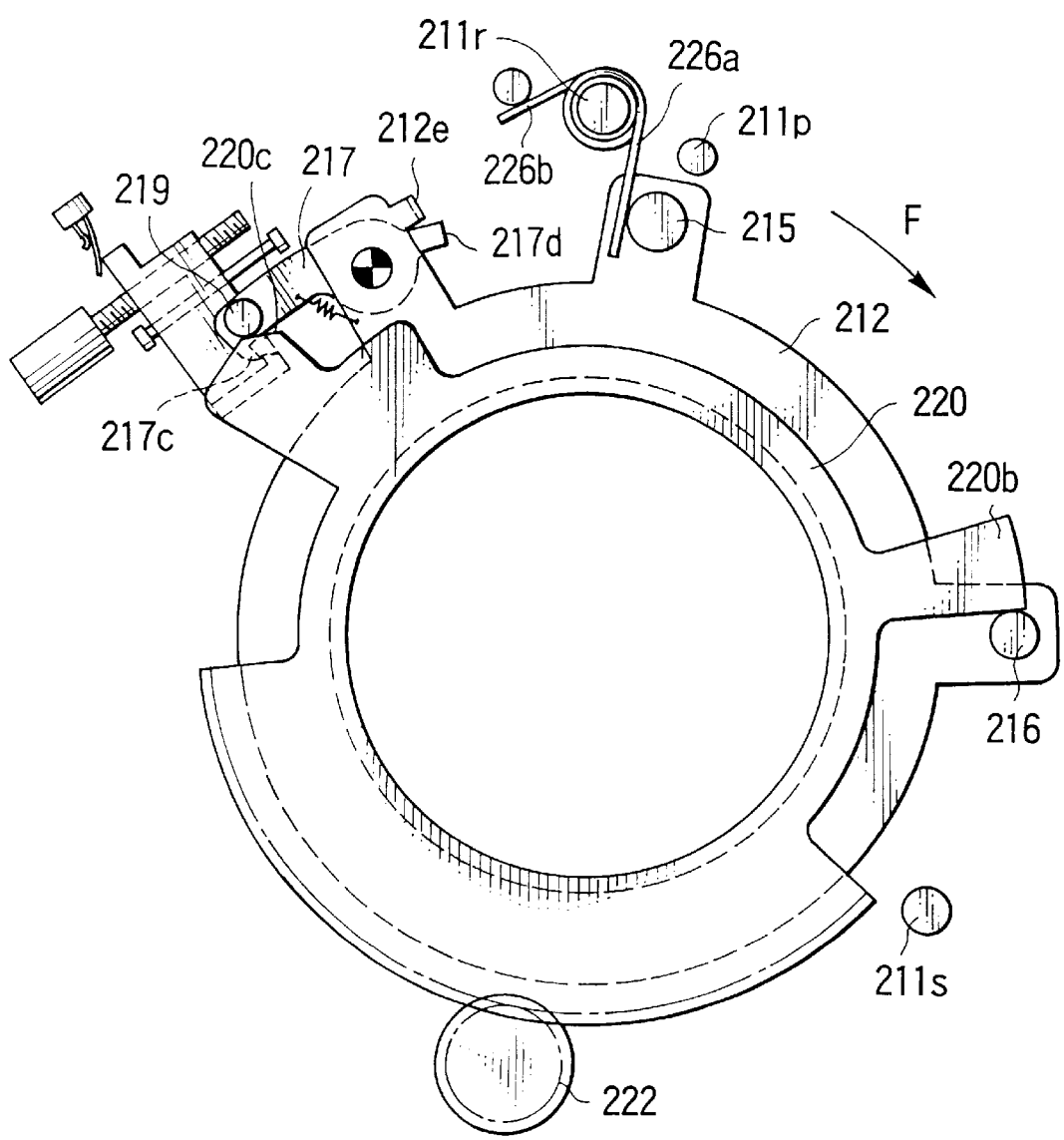
FIG. 37 is a plan view of the second embodiment taken in the direction of arrow E of FIG. 24.

The second driving ring 220 has its arm 220*b* come to abut on the pin 216 immediately after the disengagement or unlocking of the lock pawl 217 and the lock member 227 and thus begins to move the closing blade ring 212 in the direction of arrow F as shown in FIG. 37. The moving action on the second driving ring 220 to move it from its position shown in FIG. 35 to its position shown in FIG. 37 is carried out by rotating the second stepping motor 221 reversely to the direction of arrow F by 14 steps.

The moment of inertia of the second driving ring 220 is arranged to be sufficiently larger than those of the closing blade ring 212, the third shutter blade 224 and the fourth shutter blade 225. Therefore, the rotation of the second driving ring 220 is stably made thereafter with little deceleration. Further, while the second driving ring 220 is in process of moving from the position of FIG. 35 to the position of FIG. 37, the error of the lens aperture stopping-down speed of the second light blocking device with respect to the electrical signal applied for driving the second stepping motor 221 is very small, so that the aperture stopping-down speed can be sufficiently increased. This relation is equivalent to the relation between the aperture opening speed of the first light blocking device and the driving signal applied to the first stepping motor 205.

When the closing blade ring 212 rotates to an extent of angle from the position 0 to a position 7.β of FIG. 33 corresponding to 7 steps of rotation of the second stepping motor 221, the third and fourth shutter blades 224 and 225 swing on the holes 224*a* and 225*a* to the rotation angle α3 to bring the lens aperture from the fully open state to a totally closed state.

Until the rotating position of the closing blade ring 212 is brought from the position 7.β to a position 10.β by driving the second stepping motor 221 to rotate four steps, the third and fourth shutter blades 224 and 225 are kept in the closed state. Therefore, with the final stroke position attained as shown in FIG. 38, even if the arm 212*d* of the closing blade ring 212 bounces by abutting on the stopper 211*s* of the lower base plate 211, the lens aperture can never be caused to open again by the bouncing.

Figure 38:
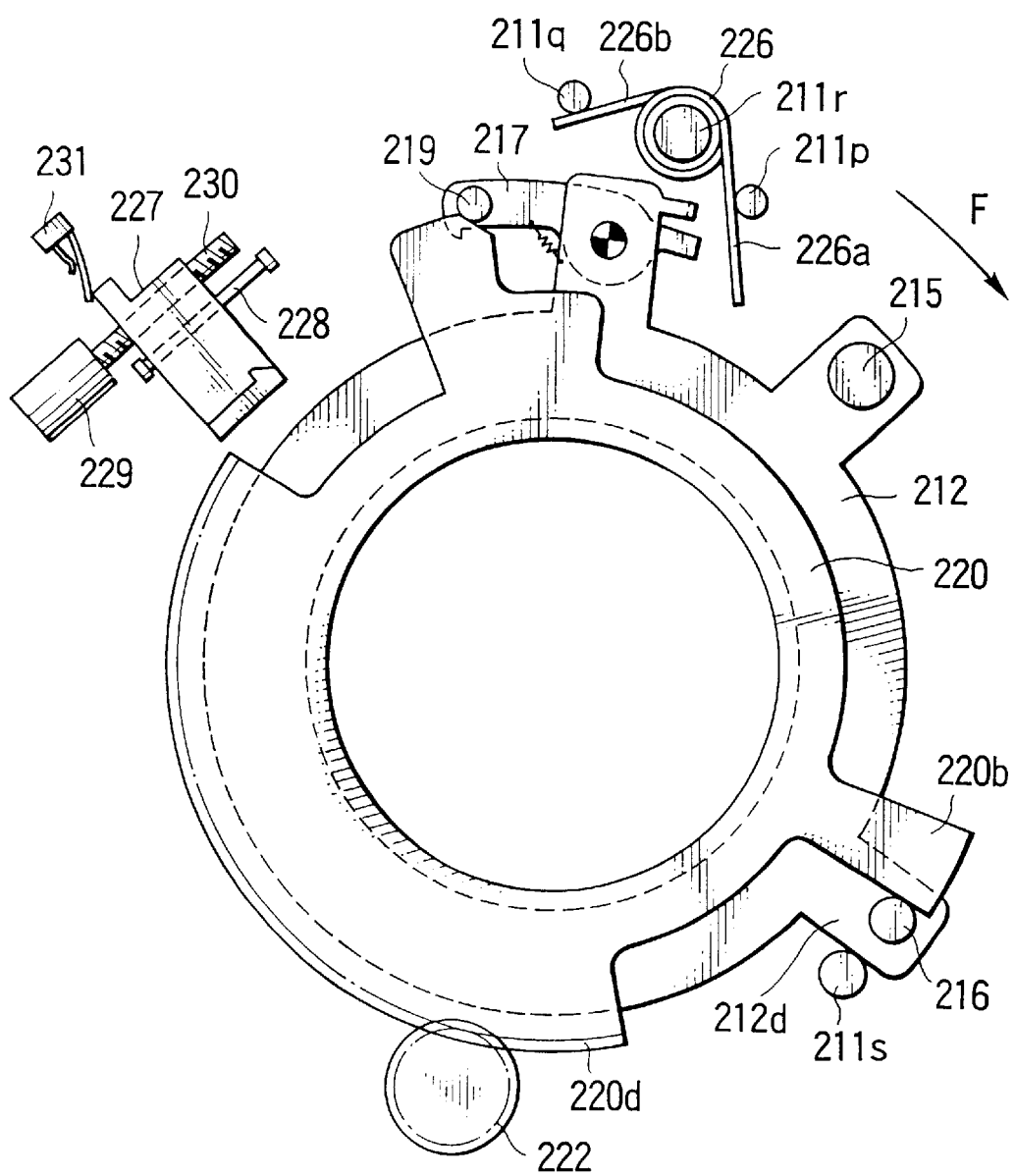
FIG. 38 is a plan view of the second embodiment taken in the direction of arrow E of FIG. 24.

After arrival of the second driving ring 220 at the position shown in FIG. 38 together with the closing blade ring 212, in bringing the state of FIG. 38 back to the initial state as shown in FIG. 34, the second driving ring 220 is caused to rotate reversely to the direction of arrow F by reversely rotating the second stepping motor 221. During this returning process, the arm 220*b* of the second driving ring 220 abuts on the pin 215 secured to the closing blade ring 212 to cause the closing blade ring 212 to rotate also reversely to the direction of arrow F. The state of FIG. 34 is resumed when the second stepping motor 21 is driven a predetermined number of steps.

Figure 39:
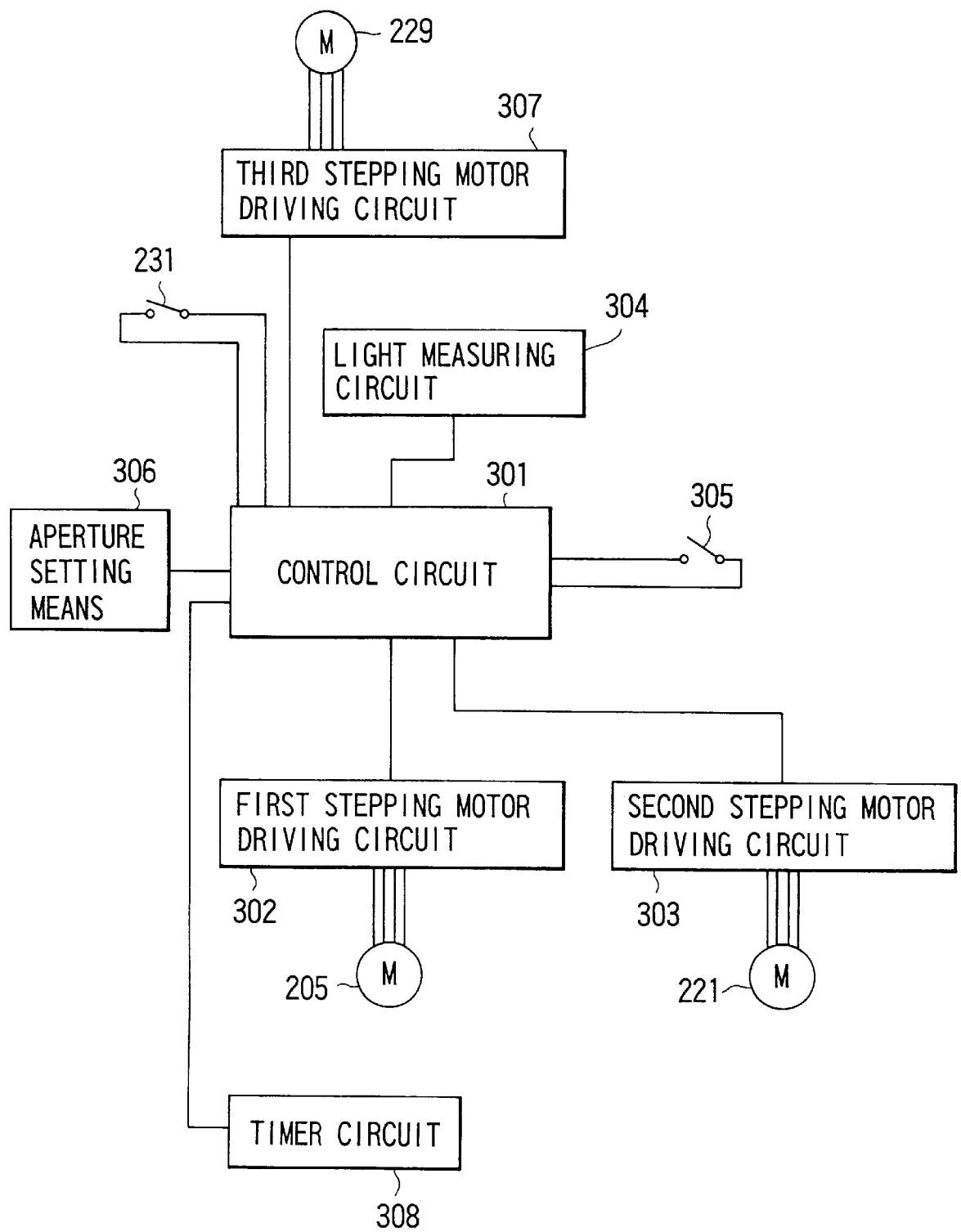
FIG. 39 is a block diagram showing an electric circuit arrangement of the second embodiment.

FIG. 39 is a block diagram showing an electric circuit arrangement employed in this embodiment. In FIG. 39, a reference numeral 301 denotes a control circuit which is composed of a microcomputer, etc., and is arranged to control the sequence of actions of the whole device. A first stepping motor driving circuit 302 is arranged to drive the first stepping motor 205. A second stepping motor driving circuit 303 is arranged to drive the second stepping motor 221. A light measuring circuit 304 is arranged to measure in a known manner the luminance of an object to be photographed.

A reference numeral 305 denotes a release switch and a reference numeral 306 denotes an aperture setting means. The aperture setting means 306 is a switch composed of, for example, a pattern circuit board and contacts and is arranged to output such signals that correspond to aperture values which can be set in a plurality of steps (four steps in the case of this embodiment). When the operator operates the aperture setting means 306 to obtain a desired aperture value, the aperture setting means 306 outputs a signal which corresponds to the aperture value. A reference numeral 307 denotes a third stepping motor driving circuit, which is arranged to drive the third stepping motor 229.

A storage circuit is disposed within the control circuit 301 and is arranged to store a time table for setting an exposure time according to signals outputted from the light measuring circuit 304 and the aperture setting means 306.

Figure 40:
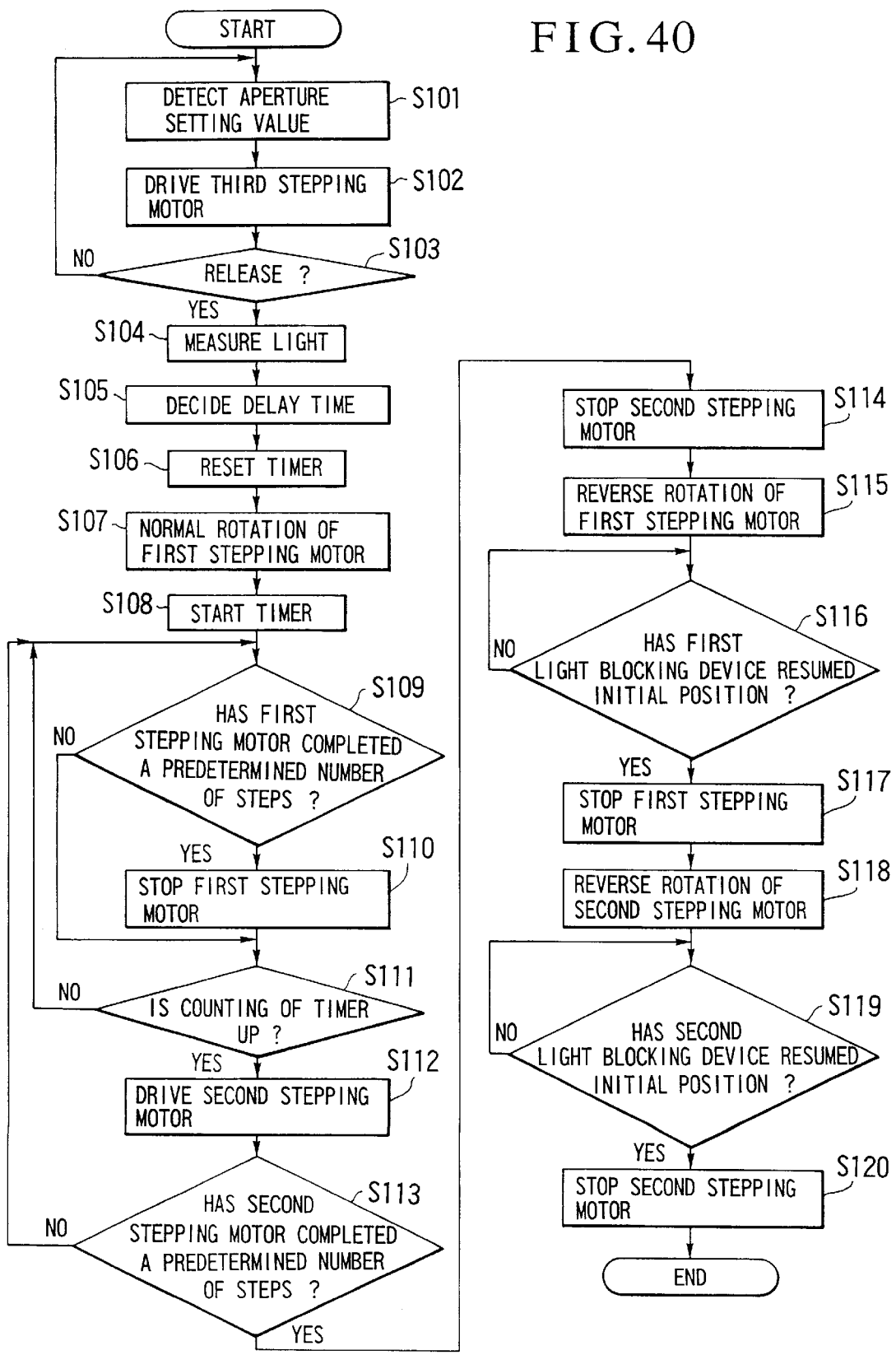
FIG. 40 is a flow chart showing an operation of a control circuit of the second embodiment.

FIG. 40 is a flow chart showing an operation of the control circuit 301. The operation of the control circuit 301 is described with reference to FIG. 40 as follows.

When a main switch is turned on, the flow of operation comes to a step S101.

At the step S101, a signal outputted from the aperture setting means 306 is detected.

At the step S102, the third stepping motor driving circuit 307 is caused to drive the third stepping motor 229 as much as a number of steps corresponding to a difference between the signal outputted from the aperture setting means 306 and the area of the current lens aperture. The closing blade ring 212 is caused to rotate by moving the lock member 227 to set the second light blocking device in a predetermined stop position (an aperture stopping-down position).

At a step S103, a check is made to find if the release switch 305 is turned on by pushing a release button which is not shown. If so, the flow comes to a step S104. If not, the flow repeats the step S101.

At a step S104, the light measuring circuit 304 is activated to measure the luminance of the object.

At a step S105, a delay time value is selected from the time table of the storage circuit on the basis of a relation between the signal from the aperture setting means 306 detected at the step S101 and the luminance of the object measured at the step S104. The delay time thus selected is used as count-up time of the timer at a step S111 which will be described later.

At a step S106, the timer circuit 308 is reset.

At a step S107, the first stepping motor driving circuit 302 is caused to drive the first stepping motor 205. The first light blocking device is then brought from the state shown in FIG. 25 into the state shown in FIG. 29. The first stepping motor 205 is driven according to driving frequency data which have been determined beforehand.

At a step S108, the timer circuit 308 is caused to begin counting a length of time elapsing from the commencement of driving the first stepping motor 205.

At a step S109, a check is made through the first stepping motor driving circuit 302 to find if the first stepping motor 205 has been driven a predetermined number of steps (12 steps in the case of this embodiment as shown in FIG. 30). If so, the flow comes to a step S110. If not, the flow comes to the step S111 while allowing the driving action on the first stepping motor 205 to continue.

At the step S110, the first stepping motor driving circuit 302 is caused to stop the first stepping motor 205.

At the step S111, a check is made to find if the time count by the timer circuit 308 started at the step S108 has reached a length of time set at the step S105. If not, the flow comes back to the step S109. If so, the flow comes to a step S112.

At the step S112, the second stepping motor driving circuit 303 is caused to drive the second stepping motor 221 according to the predetermined driving frequency data. The second driving ring 220 is thus caused to rotate in the direction of arrow F in FIG. 35.

At a step S113, a check is made through the second stepping motor driving circuit 303 to find if the second stepping motor 221 has been driven a predetermined number of steps, i.e., until the second driving ring 220 reaches its position shown in FIG. 38. If so, the flow comes to a step S114. If not, the flow comes back to the step S109 while allowing the driving action on the second stepping motor 221 to continue.

At the step S114, the second stepping motor driving circuit 303 is caused to stop the second stepping motor 221.

At a step S115, to bring the first light blocking device back to its state shown in FIG. 25, the first stepping motor driving circuit 302 is caused to begin to drive the first stepping motor 205 at a predetermined driving frequency.

At a step S116, a check is made to find if the first light blocking device has come back to the state of FIG. 25. If so, the flow comes to a step S117. If not, the flow repeats the step S116.

At the step S117, the first stepping motor driving circuit 302 is caused to stop the first stepping motor 205.

At a step S118, to bring the second driving ring 220 back to its state shown in FIG. 35, the second stepping motor driving circuit 303 is caused to drive the second stepping motor 221 at a predetermined driving frequency.

At a step S119, a check is made to find if the second driving ring 220 has come back to the state of FIG. 35. If so the flow comes to a step S120. If not, the flow repeats the step S119.

At the step S120, the second stepping motor driving circuit 303 is caused to stop the second stepping motor 221 from rotating.

With the shutter device driven for an exposure in accordance with the sequence of actions described above, the area of the lens aperture varies as shown in FIGS. 41 to 44. In these drawings, time "t" having elapsed after the first stepping motor 205 is caused to make its normal rotation at the step S107 is shown on the axis of abscissa. The delay time set at the step S105 is indicated by a reference symbol T. The area of the lens aperture formed by the first light blocking device is indicated by a reference symbol "a". The area of the lens aperture formed by the second light blocking device is indicated by a reference symbol "b". In each of FIGS. 41 to 44, a part shown with hatching represents the area actually used for the exposure by the shutter device as a whole.

As apparent from comparison of these drawings, the arrangement of varying a difference in start time between the first stepping motor 205 and the second stepping motor 221, i.e., the above-stated delay time T, causes the position of the curve "b" relative to the curve "a" to shift to the right or left as viewed on these drawings. As a result, the amount of exposure which is indicated by hatching varies accordingly.

Figure 41:
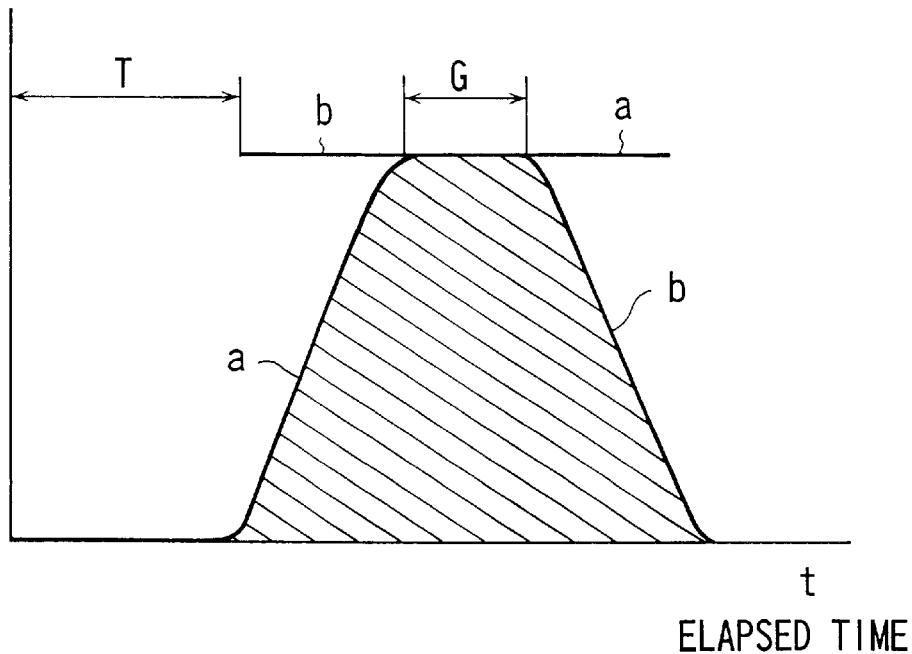
FIG. 41 is a graph showing a state of exposure.
Figure 42:
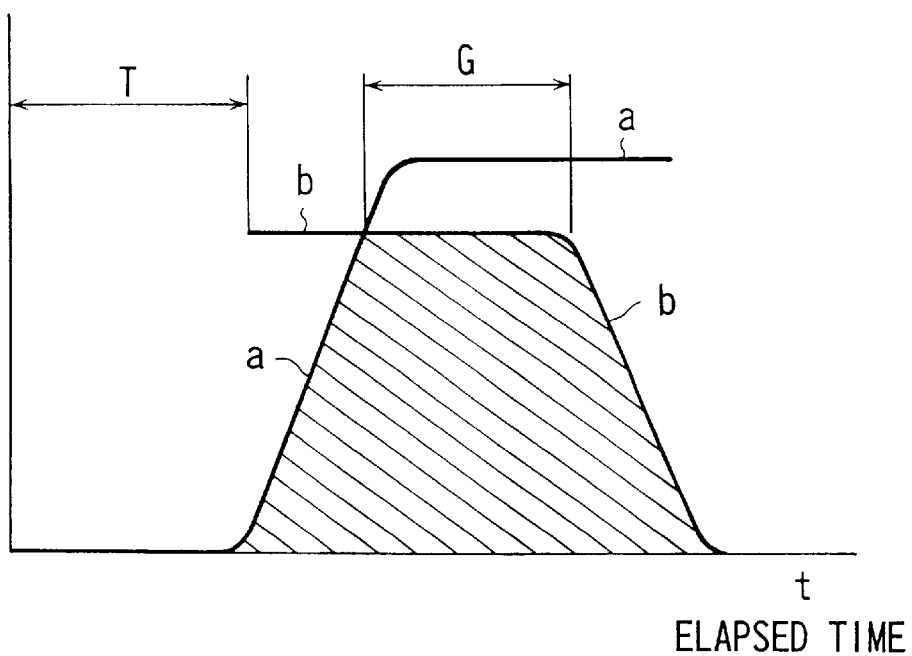
FIG. 42 is a graph showing a state of exposure.
Figure 43:
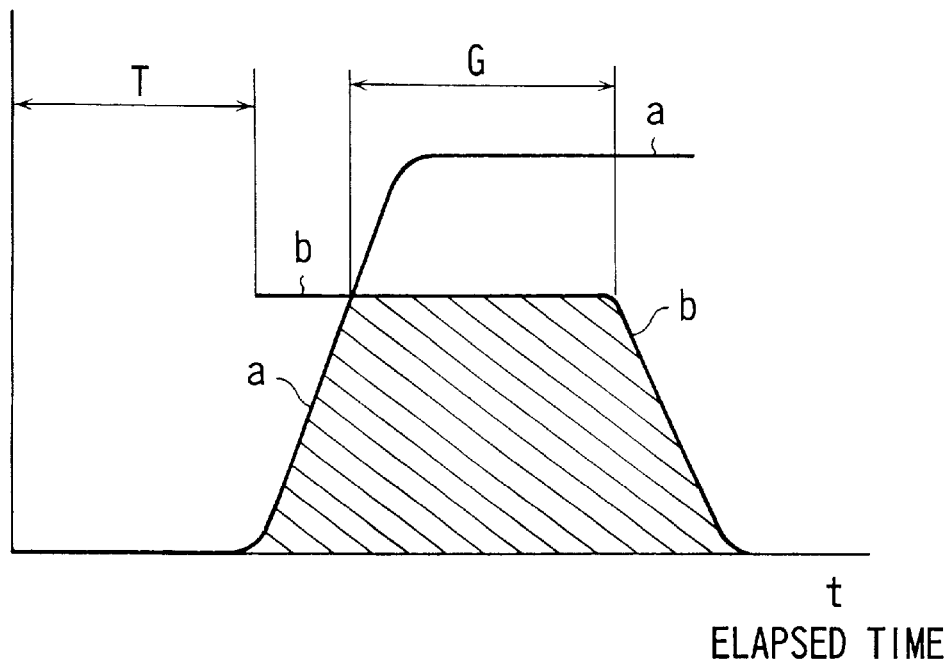
FIG. 43 is a graph showing a state of exposure.
Figure 44:
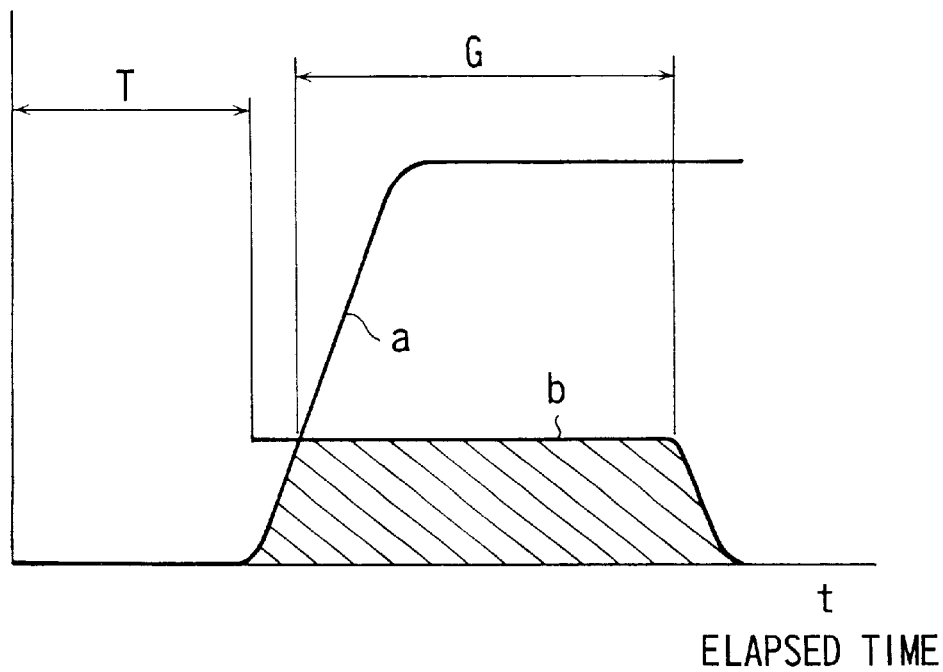
FIG. 44 is a graph showing a state of exposure.

Of these drawings, FIG. 41 shows a case where the lock member 227 is set at the left end of the guide bar 228, as shown in FIG. 35. FIG. 44 shows a case where the lock member 227 is set at the right end of the guide bar 228, as shown in FIG. 34. FIGS. 42 and 43 respectively show cases where the lock member 227 is located at intermediate parts of the screw member 230.

As apparent from these drawings, the shutter device which is the second embodiment of this invention is arranged to allow the second light blocking device to begin a closing action after the lapse of a predetermined length of time (determined by the delay time T) from a point of time at which the position of an opening action of the first light blocking device passes a point which corresponds to the stop position of the second light blocking device. By virtue of this arrangement, an exposure can be made effectively using an aperture area corresponding to the set aperture value during almost the whole period of time of exposure indicated by a reference symbol G in each of these drawings. Therefore, a desired depth of field can be obtained for a main object.

In the event of disappearance of the stored information on a position of the lock member 227 caused by discontinuation of supply of power to the control circuit 301 due to replacement of a battery, a malfunction of the camera or the like, the information on the position of the lock member 227 is stored again by moving the lock member 227 to a position where the switch 231 turns on at the time of restart. The action of the step S102 can be made possible by that process.

Third Embodiment

Figure 45:
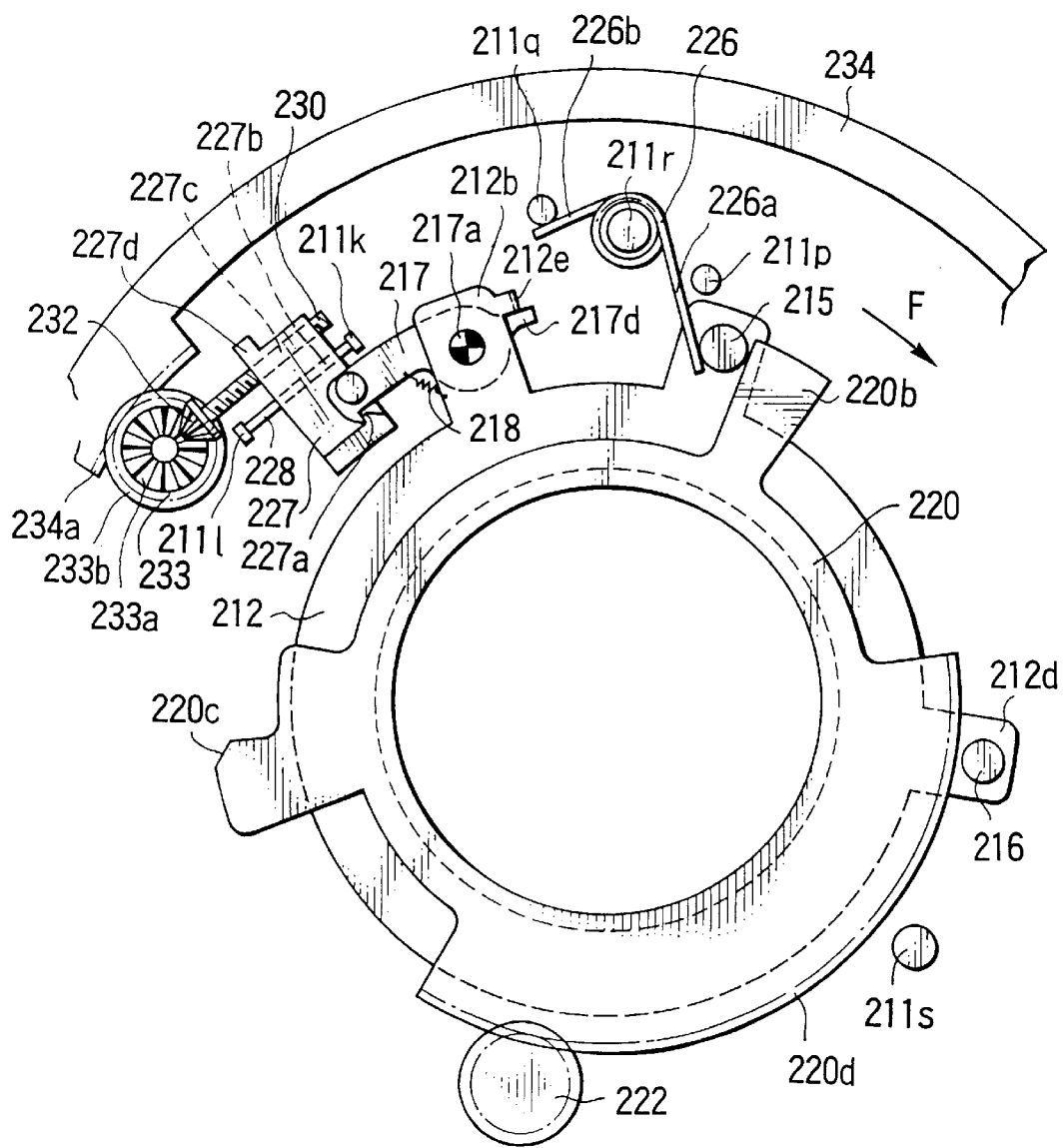
FIG. 45 shows the arrangement of a shutter device arranged as a third embodiment of this invention.

FIG. 45 shows a shutter device which is arranged as a third embodiment of this invention. While the second embodiment is arranged to drive the screw member 230 by means of a stepping motor, the third embodiment is arranged to have the screw member 230 manually rotated for cost reduction.

Referring to FIG. 45, a bevel gear 232 is secured to the screw member 230. The bevel gear 232 is rotatably carried by the lower base plate 211 together with the screw member 230 in a known manner.

A transmission gear 233 is rotatably mounted on the lower base plate 211 and is provided with a bevel gear part 233a and a spur gear part 233b, which are in mesh with each other.

An operation ring 234 is mounted on a base plate (not shown) in such a way as to be rotatable around an optical axis. The operation ring 234 can be rotated by a manual operation and is provided with a gear part 234a. The gear part 234a is in mesh with the spur gear part 233b of the transmission gear 233.

With the shutter device arranged in this manner, when the operation ring 234 is manually rotated, the rotation of the operation ring 234 is transmitted via the transmission gear 233 and the bevel gear 232 to the screw member 230 to cause the screw member 230 to rotate. With the screw member 230 thus rotated, like in the second embodiment, the lock member 227 is caused to move in the axial direction of the screw member 230. This motion of the lock member 227 in turn causes the closing blade ring 212 to rotate in such a way as to set an amount of opening of the lens aperture.

Fourth Embodiment

Figure 46:
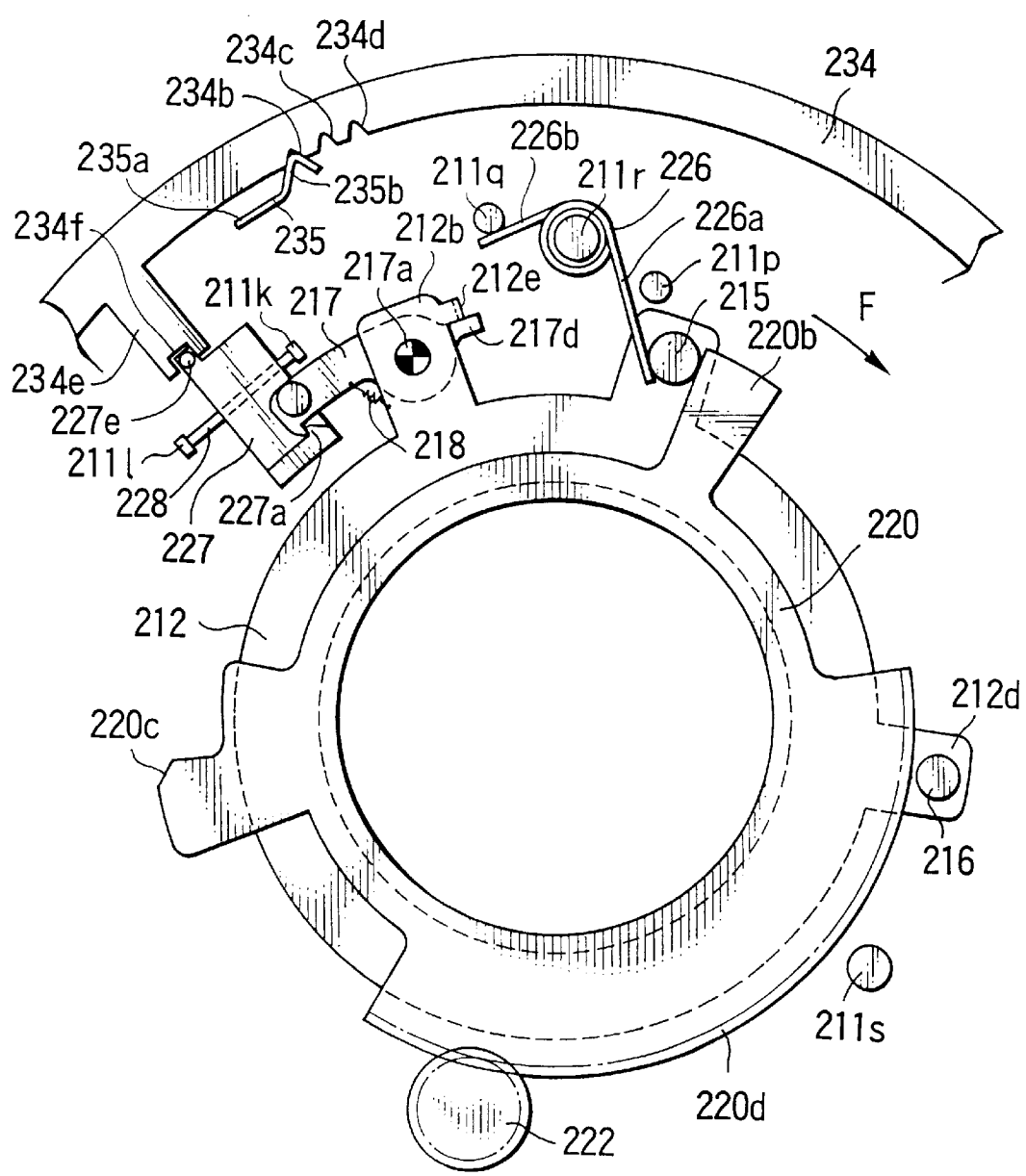
FIG. 46 shows the arrangement of a shutter device arranged as a fourth embodiment of this invention.

FIG. 46 shows a shutter device which is arranged as a fourth embodiment of this invention.

Referring to FIG. 46, a reference numeral 235 denotes a flexible click leaf spring. The fixed end 235a of the click leaf spring 235 is secured to a base plate which is not shown. The free end 235b of the click leaf spring 235 is arranged to be capable of engaging each of click grooves 234b, 234c and 234d which are formed in the operation ring 234. When the operation ring 234 is operated, the free end 235b of the click leaf spring 235 engages one of the click grooves 234b, 234c and 234d to define the position the operation ring 234.

The operation ring 234 has an arm 234e. The arm 234e is provided with a groove 234f for holding a pin 227e which is provided on the lock member 227. When the operation ring 234 is operated to rotate it, therefore, the lock member 227 moves along the guide bar 228.

With the shutter device arranged in this manner, an amount of opening of the aperture by the second light blocking device can be set with a simple arrangement.

Fifth Embodiment

Figure 47:
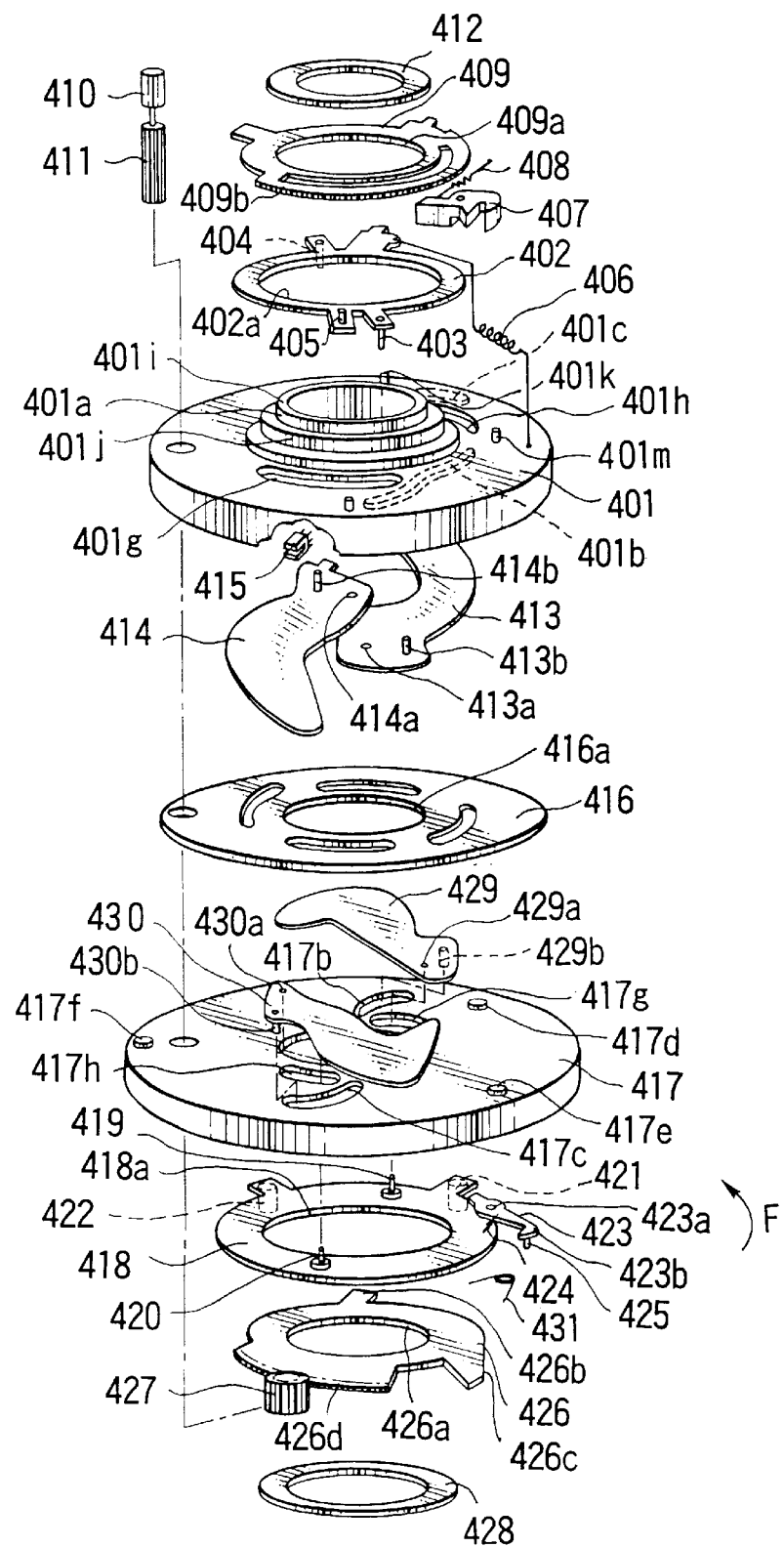
FIG. 47 is an oblique view showing essential parts of a shutter device arranged as a fifth embodiment.
Figure 48:
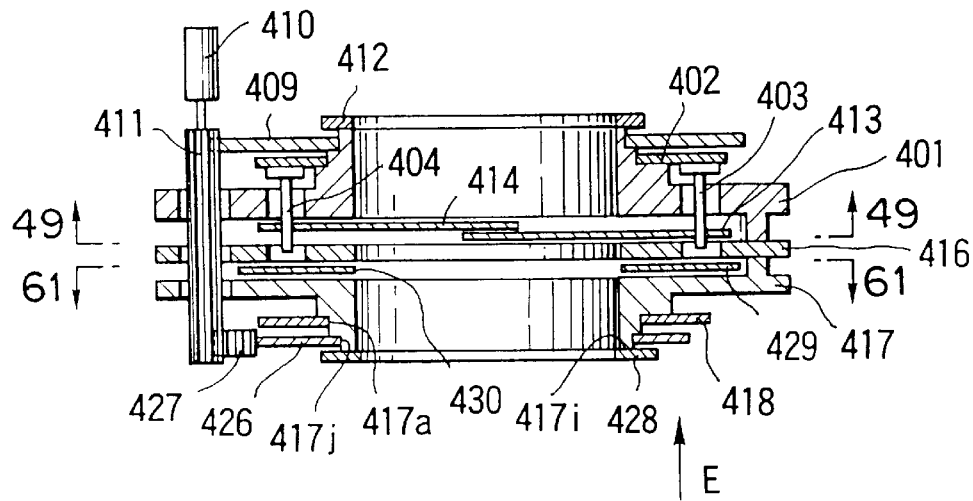
FIG. 48 is a sectional view of the shutter deice which is the fifth embodiment.

FIGS. 47 to 71 relate to a shutter device which is a fifth embodiment of this invention. FIG. 47 is an oblique view showing the relationship between component parts of the shutter device. FIG. 48 is a sectional view of the shutter device.

The shutter device includes an upper base plate 401 and a first driving ring 402. The inner diametral part 402a of the first driving ring 402 is rotatably fitted on a cylindrical part 401j formed in the middle part of the upper base plate 401. The rotating position of the first driving ring 402 is restricted when the first driving ring 402 comes to abut on a stopper 401m formed on the upper surface of the upper base plate 401.

Figure 50:
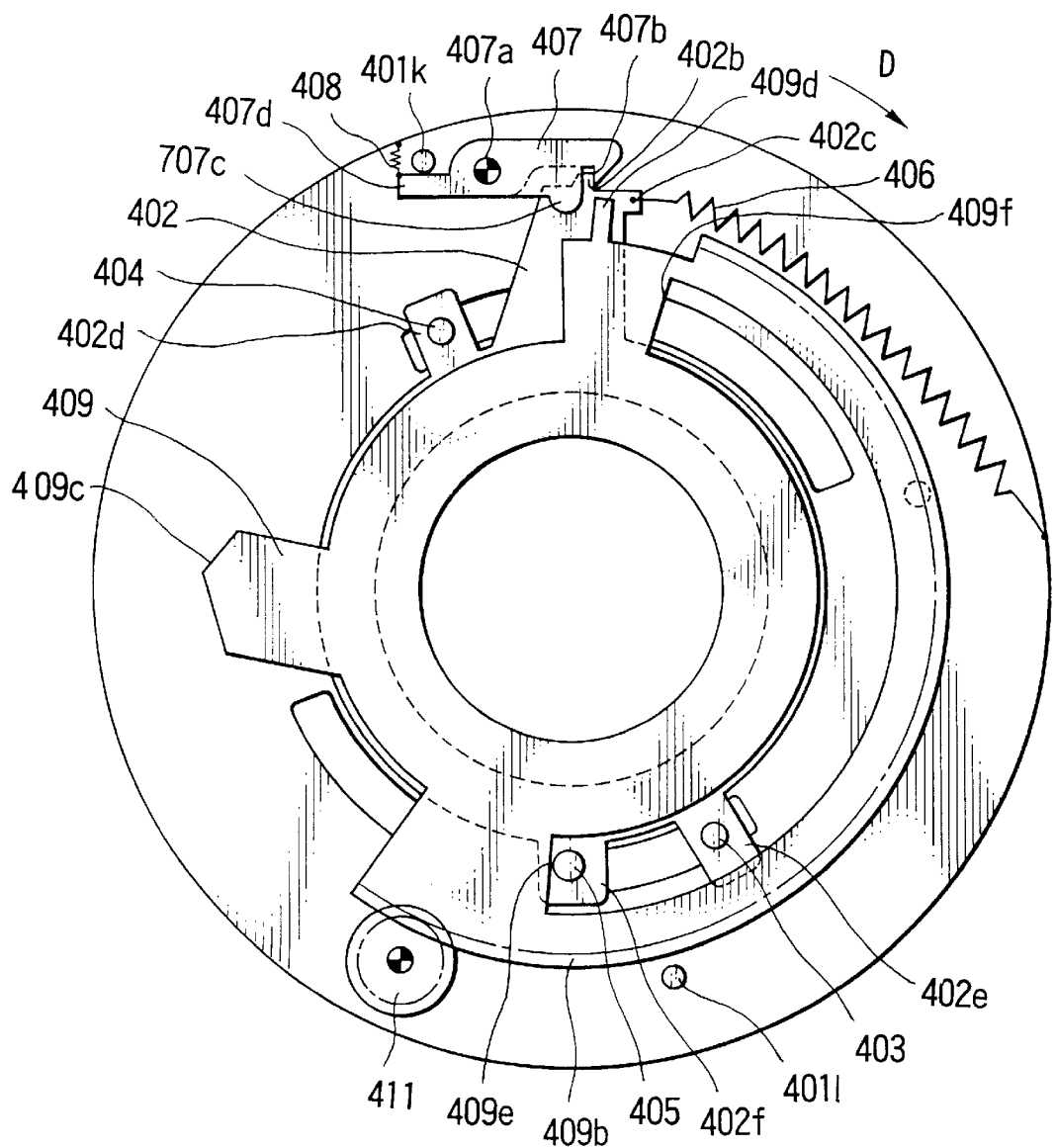
FIG. 50 is a plan view showing the first light blocking device of the fifth embodiment in an initial position.

Driving pins 403 and 404 are respectively secured to the lower surfaces of arms 402e and 402d of the first driving ring 402. A charging projection 405 is secured to the upper surface of the arm 402f of the first driving ring 402. A coiled tension spring 406 has its one end secured to the upper base plate 401 and the other end to the arm 402c of the first driving ring 402. The coiled spring 406 is arranged to urge the first driving ring 402 to rotate in the direction of arrow D as shown in FIG. 50. An opening start lever 407 is mounted on the upper surface of the upper base plate 401 in such a way as to be rotatable on a shaft 407a.

The opening start lever 407 has a claw part 407b which is capable of engaging a lock part 402b formed on the first driving ring 402.

A coiled tension spring 408 has its one end secured to the arm 407d of the opening start lever 407 and the other end to the upper base plate 401. The coiled tension spring 408 is arranged to urge the opening start lever 407 to move clockwise as viewed on FIG. 50. The clockwise swing of the opening start lever 407 is arranged to be restricted when the arm 407d of the opening start lever 407 comes to abut on a projection 401k formed on the upper surface of the upper base plate 401.

An inner diametral part 409a of a charge ring 409 is rotatably fitted on a cylindrical part 401a formed on the inner side of the cylindrical part 401j of the upper base plate 401.

The charge ring 409 is provided with a slot 409g which extends along the circumference of the charge ring 409. The end faces 409e and 409f in the circumferential direction of the slot 409g are arranged to be capable of abutting on the charging projection 405. A cam face part 409c which is formed in the periphery of the charge ring 409 is arranged to come to abut on a protruding part 407c of the opening start lever 407.

A stepping motor 410 is capable of making stepwise indexing rotation in a known manner at predetermined unit rotation angles.

A first pinion 411 is secured to the output shaft of the first stepping motor 410 and is in mesh with a gear part 409b of the charge ring 409 and a second gear 427 which will be described later. A first retaining plate 412 is secured to the top face 401*i* of the cylindrical part 401*a* after the charge ring 409 is fitted on the cylindrical part 401*a* in such a way as to prevent the charge ring 409 from coming off.

A first shutter blade 413 has a hole 413*a*. The above-stated driving pin 403 is revolvably fitted in the hole 413*a* through a slot 401*g* formed in the upper base plate 401. A pin 413*b* is secured to the upper surface of the first shutter blade 413. The pin 413*b* is slidably fitted into a cam groove 401*b* which is formed in the lower surface of the upper base plate 401.

A second shutter blade 414 has a hole 414*a*. The above-stated driving pin 404 is revolvably fitted in the hole 414*a* through a slot 401*h* formed in the upper base plate 401. A pin 414*b* is formed on the upper surface of the second shutter blade 414. The pin 414*b* is slidably fitted into a cam groove 401*c* which is formed in the lower surface of the upper base plate 401.

A blade retaining plate 416 has an aperture part 416*a* formed in the middle part thereof. The first shutter blade 413 and the second shutter blade 414 are held within a space formed between the upper base plate 401 and the blade retaining plate 416 and are arranged to be movable in the planar direction of the space. To form the space between the upper base plate 401 and the blade retaining plate 416, there are formed projections 401*d*, 401*e* and 401*f* which extend from the lower surface of the upper base plate 401.

A photo-interrupter 415 is secured to the upper base plate 401 and is arranged to detect passing of the arm part 414*c* of the second shutter blade 414 and outputs a signal to a control circuit which will be described later. The arrangement of the embodiment is not limited to the use of the photo-interrupter 415, which may be replaced with some means for detecting the position of the second shutter blade 414, for example, through the on-state or off-state of a known electrical contact piece or by some other means as long as the position of the second shutter blade 414 is detectable.

The shutter device also has a lower base plate 417 and a closing blade ring 418. The inner diametral part 418*a* of the closing blade ring 418 is rotatably fitted on a cylindrical part 417*a* formed in the middle of the lower base plate 417. Driving pins 419 and 420 are secured to the upper surface of the closing blade ring 418. Pins 421 and 422 are secured to arms 418*c* and 418*d* which are two of three arms formed on the periphery of the closing blade ring 418.

A lock pawl 423 is mounted on the arm 418*b* of the closing blade ring 418 and arranged to be swingable on a pin 423*a*. A base end part 423*c* of the lock pawl 423 is arranged to be capable of engaging a bent-up part 418*e* (see FIG. 63, etc.) of the arm 418*b* of the closing blade ring 418. The counterclockwise swing of the lock pawl 423 as viewed on FIG. 63 is restricted when these parts engage each other.

A coiled tension spring 424 has its one end secured to the closing blade ring 418 and the other end to the lock pawl 423. The coiled spring 424 is thus arranged to urge the lock pawl 423 to move counterclockwise as viewed on FIG. 63. The coiled spring 424 may be replaced with some other suitable elastic member such as a torsion spring or a compression spring.

Figure 63:
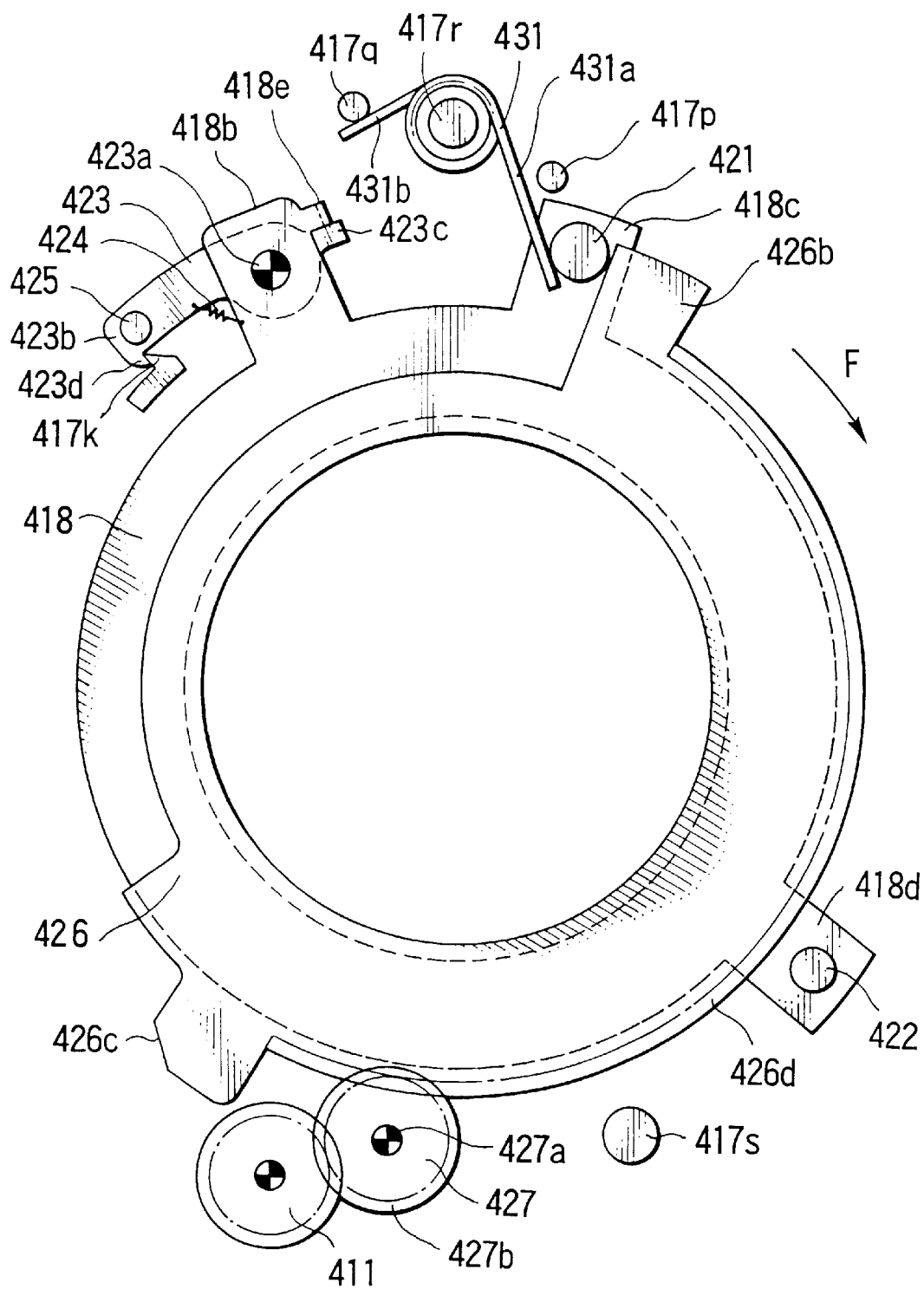
FIG. 63 is a plan view of the fifth embodiment taken in the direction of arrow E of FIG. 48 showing it in a state obtained when the second light blocking device is in its initial position.

A claw part 423*d* formed on the fore end of the lock pawl 423 is arranged to be capable of engaging a lock part 417*k* formed on the lower base plate 417, as shown in FIG. 63. A release pin 425 is secured to an arm part 423*b* of the lock pawl 423 and is arranged to be capable of abutting on a cam face 426*c* of a second driving ring 426.

A third shutter blade 429 has a hole 429*a*. The driving pin 419 which comes through a slot 417*g* formed in the lower base plate 417 is rotatably fitted into the hole 429*a*. A pin 429*b* is secured to the third shutter blade 429 and is slidably fitted into a cam groove 417*b* formed in the upper surface of the lower base plate 417.

A fourth shutter blade 430 has a hole 430*a*. The driving pin 420 which comes through a slot 417*h* formed in the lower base plate 417 is rotatably fitted into the hole 430*a*. A pin 430*b* which is secured to the fourth shutter blade 430 is slidably fitted into a cam groove 417*c* formed in the upper surface of the lower base plate 417.

The third and fourth shutter blades 429 and 430 are arranged to be movable in the planar direction within a space formed between the lower base plate 417 and the blade retaining plate 416. Projections 417*d*, 417*e* and 417*f* are formed on the upper surface of the lower base plate 417 and arranged to secure the space between the blade retaining plate 416 and the lower base plate 417.

Figure 49:
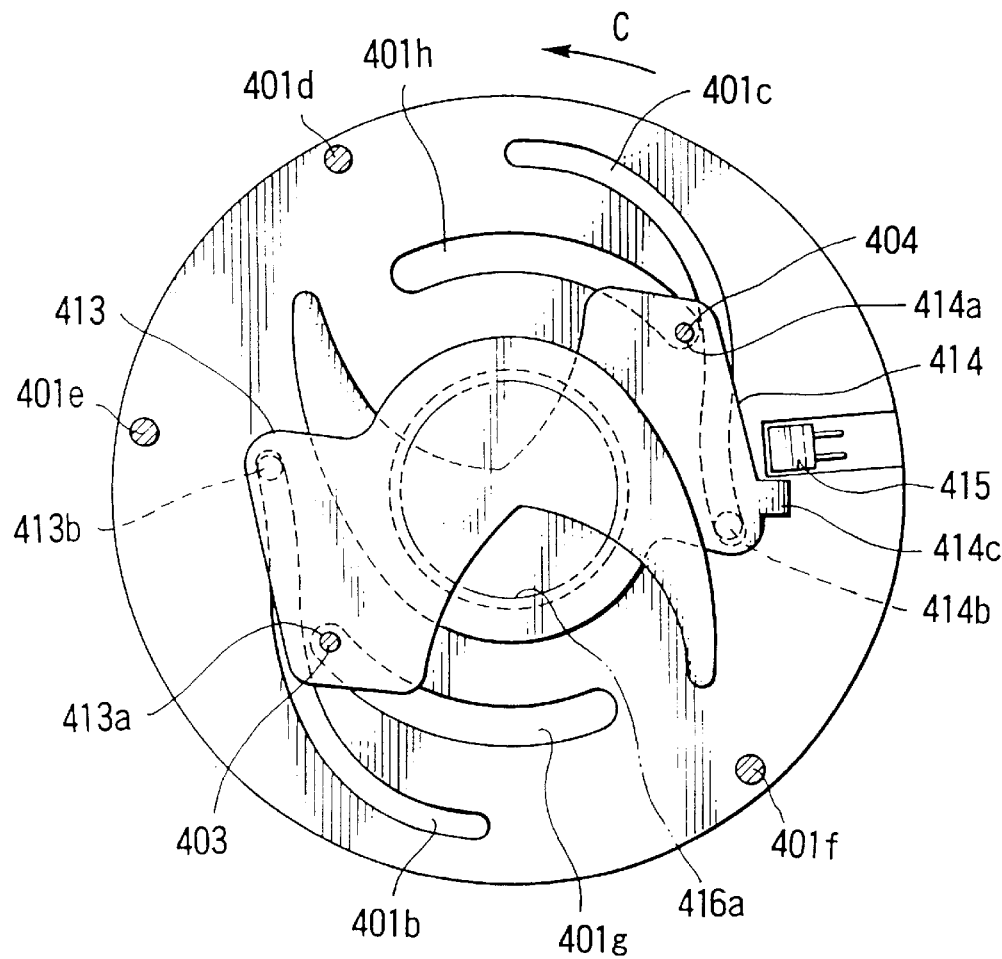
FIG. 49 is a section taken on a line 49—49 of FIG. 48 showing a first light blocking device in a plan view.

FIG. 49 is a sectional view taken on a line 49—49 of FIG. 48 showing the embodiment as viewed in the direction of arrows 49—49. FIG. 50 is a plan view (in which the stepping motor 410 is omitted).

FIGS. 49 and 50 show the shutter device in the same state. In this state, the lock part 402*b* of the first driving ring 402 is engaging the claw part 407*b* of the opening start lever 407. Therefore, the first driving ring 402 is locked in its initial position, as shown, against the urging force of the coiled tension spring 406. When the first driving ring 402 is in this initial position, the first shutter blade 413 and the second shutter blade 414 are closing the lens aperture as shown in FIG. 49.

A second driving ring 426 is rotatably fitted at its inner diametral part 426*a* on a cylindrical part 417*j* which is formed in the middle part (around an optical axis) of the lower base plate 417. An arm 426*b* which is formed on the second driving ring 426 is arranged to be capable of abutting on the pins 421 and 422.

The lower base plate 417 which is shown in FIG. 63, etc., is provided with a stopper 417*s*. The rotation of the closing blade ring 418 in the direction of arrow F in FIG. 63 is restricted when the arm 418*d* of the closing blade ring 418 abuts on the stopper 417*s*.

A second gear 427 is mounted on the lower base plate 417 in such a way as to be rotatable on a shaft 427*a*. The gear part 427*b* of the second gear 427 is in mesh with the first pinion 411 and the gear part 426*d* of the second driving ring 426. The driving force of the stepping motor 410 is thus transmitted to the second driving ring 426 through the second gear 427.

A second retaining plate 428 is secured to the top part 417*i* of the cylindrical part 417*j* of the lower base plate 417 after the second driving ring 426 is fitted on the cylindrical part 417*j*, so that the second driving ring 426 can be prevented from coming off.

As shown in FIG. 63, a torsion spring 431 has its coiled part mounted on the periphery of a projection 417*r* formed on the lower surface of the lower base plate 417. One arm 431*b* of the torsion spring 431 engages a projection 417*q* of the lower base plate 417 while the other arm 431*a* engages the pin 421 of the closing blade ring 418. The torsion spring 431 is thus arranged to urge the closing blade ring 418 to move in the direction of arrow F as shown in FIG. 63. By virtue of the urging force of the torsion spring 431, when the lock pawl 423 engages the lock part 417*k* of the lower base plate 417, the rotating position of the closing blade ring 418 is stably restricted.

A projection 417*p* which is formed on the lower side of the lower base plate 417 is located in a position to be capable of engaging the arm 431a of the torsion spring 431. Although the arm 431a is not engaging the projection 417p in the state of FIG. 62, the arm 431a comes to engage the projection 417p, parting from the pin 421, when the closing blade ring 418 rotates in the direction of arrow F from its position shown in FIG. 62.

A light blocking device consisting of the first shutter blade 413, the second shutter blade 414, the first driving ring 402, etc., hereinafter will be called a first light blocking device.

In the first light blocking device, when the first driving ring 402 rotates in the direction of arrow C as shown in FIG. 49, the first shutter blade 413 and the second shutter blade 414 rotate around the optical axis. Then, while the pins 413b and 414b are guided respectively by the cam grooves 401a and 401c, the first and second shutter blades 413 and 414 swing respectively on their holes 413a and 414a to open the lens aperture.

Figure 54:
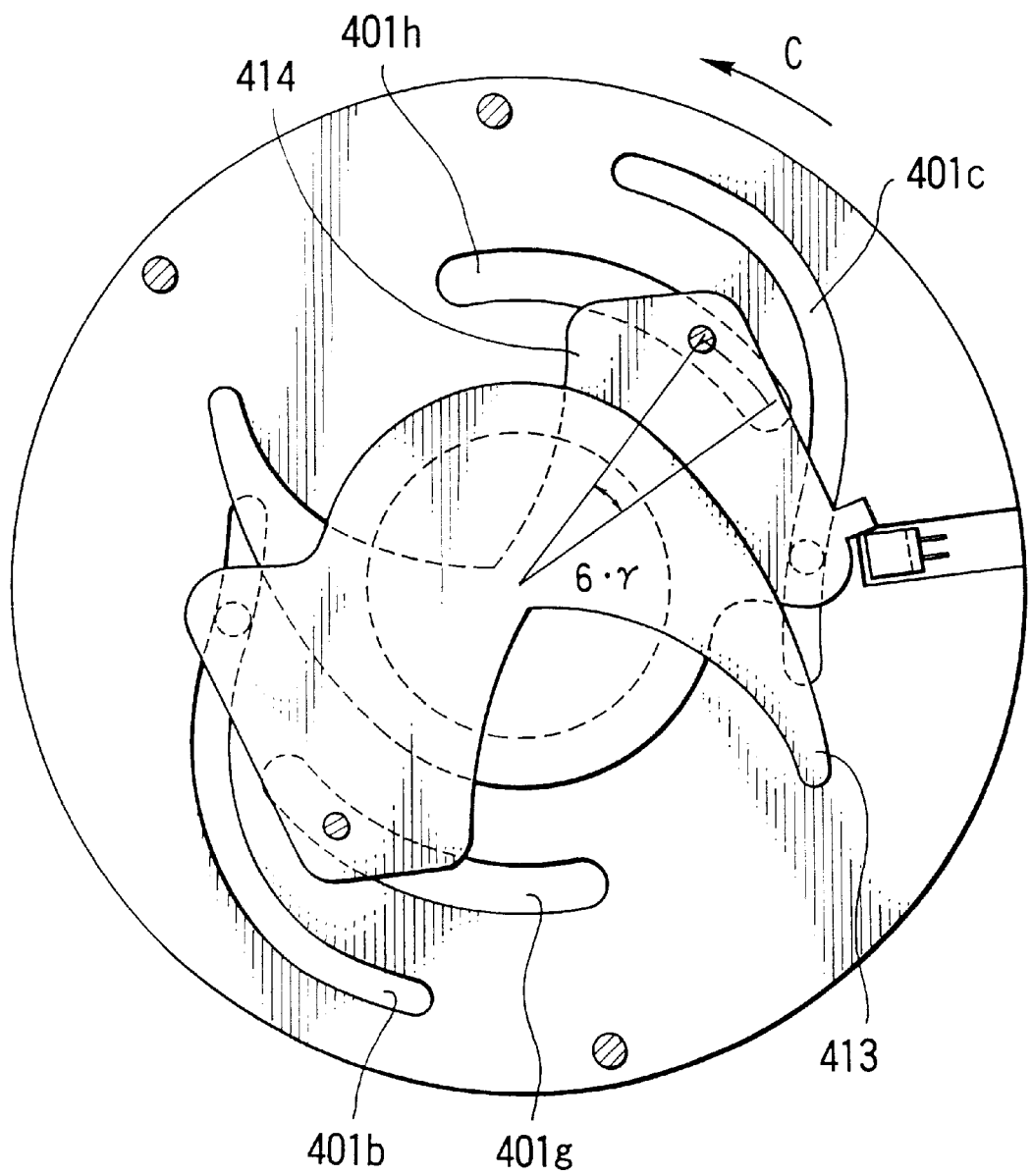
FIG. 54 is a section taken on a line 49—49 of FIG. 48 showing the fifth embodiment in a state obtained when first driving ring has rotated as much as 6.γ.

The cam grooves 401b and 401c are formed, as shown in FIG. 54, in such a way as to prevent the first and second shutter blades 413 and 414 from swinging on their holes 413a and 414a when the first driving ring 402 rotates 6.γ around the optical axis in the direction of arrow C from its position of FIG. 49. Further, the cam grooves 401b and 401c are arranged to allow the first and second shutter blades 413 and 414 not only to rotate around the optical axis but also to swing on the holes 413a and 414a when the first driving ring 402 rotates further.

Figure 55:
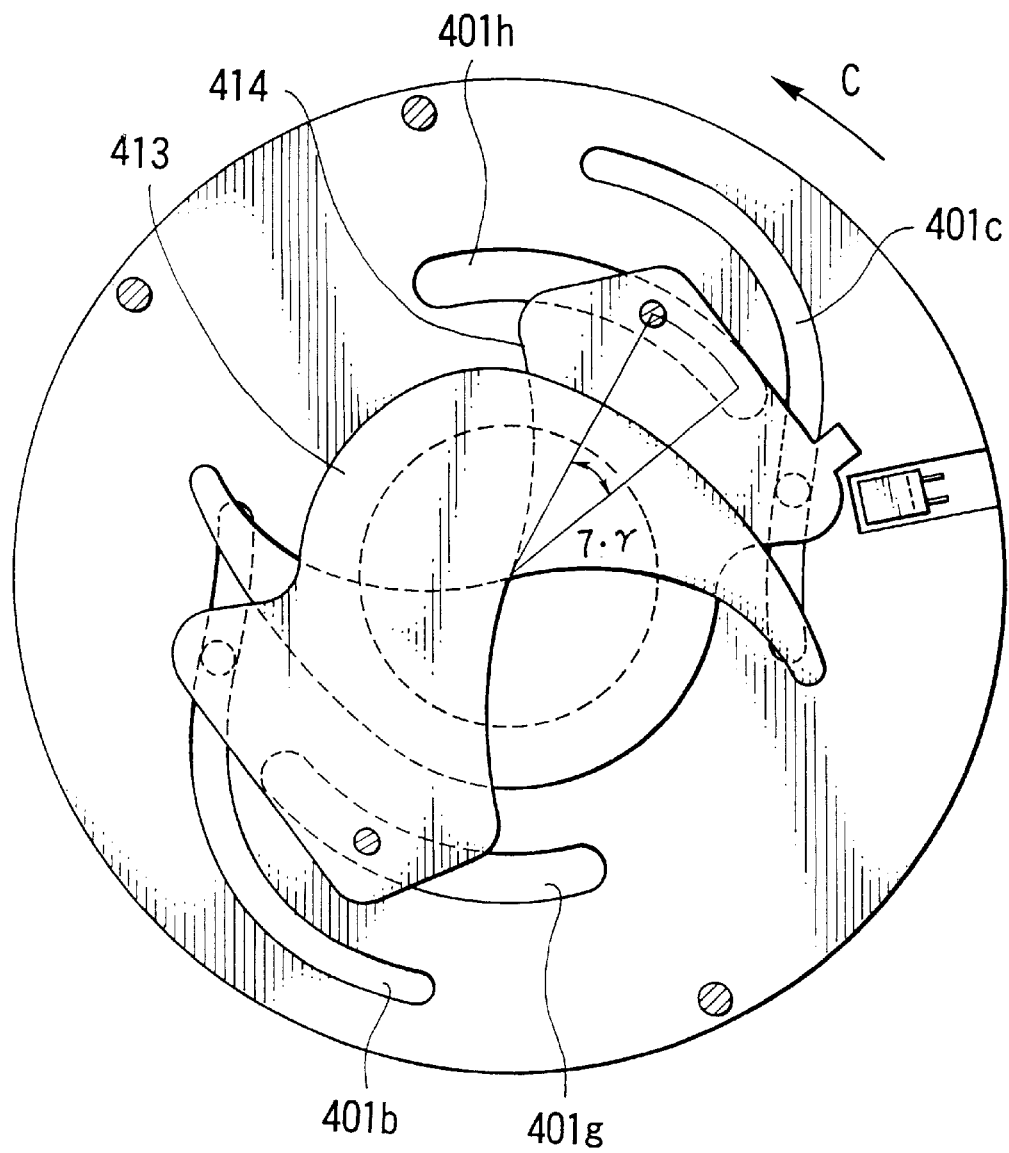
FIG. 55 is a section taken on a line 49—49 of FIG. 48 showing the fifth embodiment in a state obtained when first driving ring has rotated as much as 7.γ.

The first and second shutter blades 413 and 414 open the lens aperture to a pinhole state, as shown in FIG. 55, when the first driving ring 402 is in a position of having rotated 7.γ from the state of FIG. 49.

Figure 56:
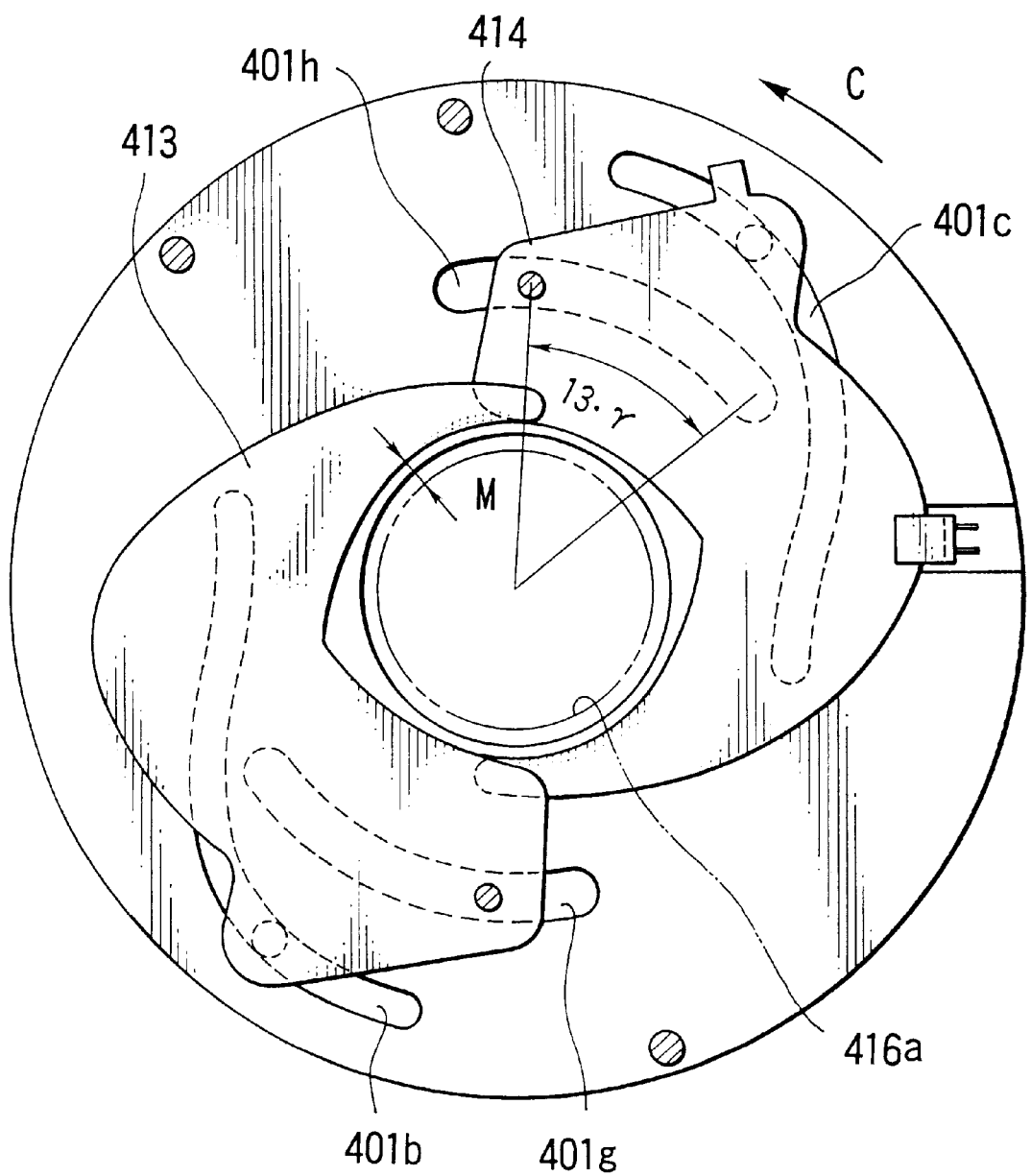
FIG. 56 is a section taken on a line 49—49 of FIG. 48 showing the fifth embodiment in a state obtained when first driving ring has rotated as much as 13.γ.
Figure 57:
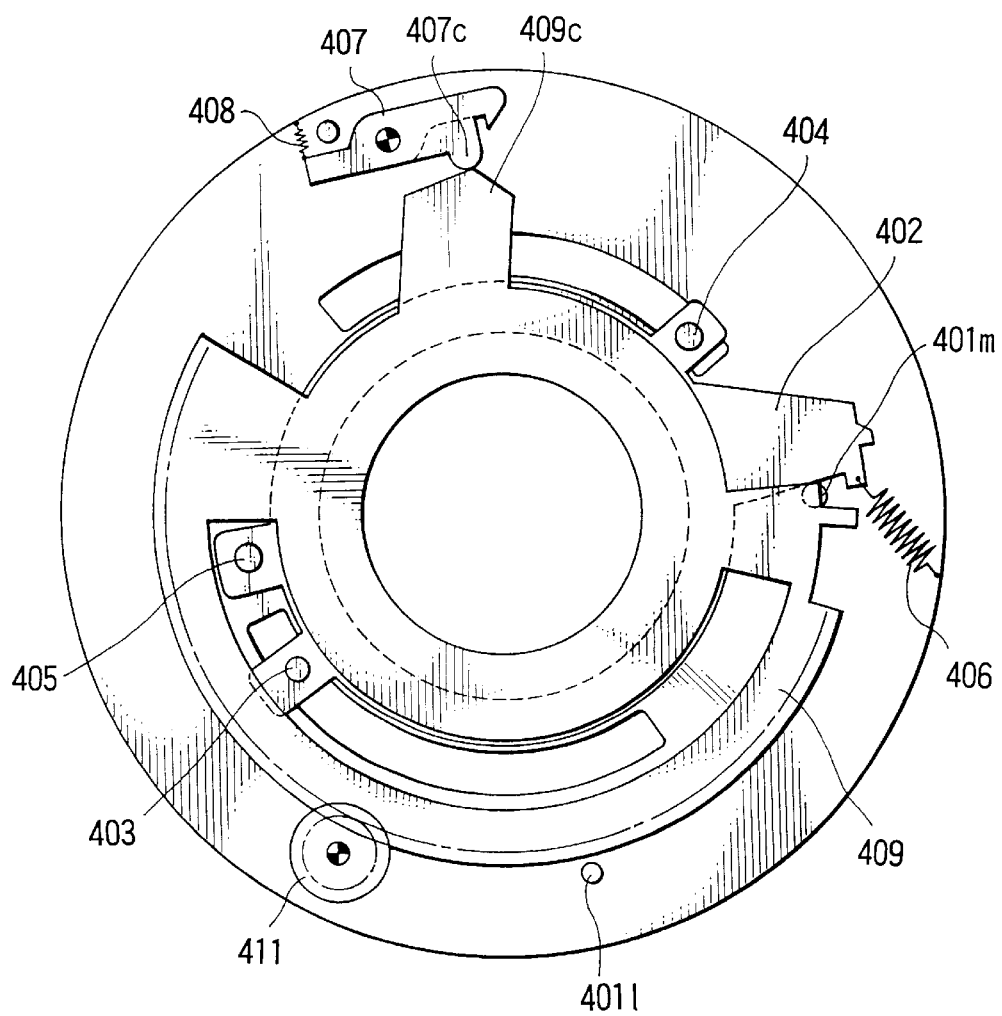
FIG. 57 is a plan view showing the first light blocking device of the fifth embodiment.

When the first driving ring 402 rotates further from its position 7.γ as much as 13.γ, to come from the state of FIG. 49 to a state as shown in FIG. 56, the first and second shutter blades 413 and 414 come to fully open the lens aperture. After that, the first and second shutter blades 413 and 414 no longer swing on the holes 413a and 414a to retain the lens aperture in the fully open state and rotate only around the optical axis along with the first driving ring 402 even when the first driving ring 402 rotates still further.

Figure 58:
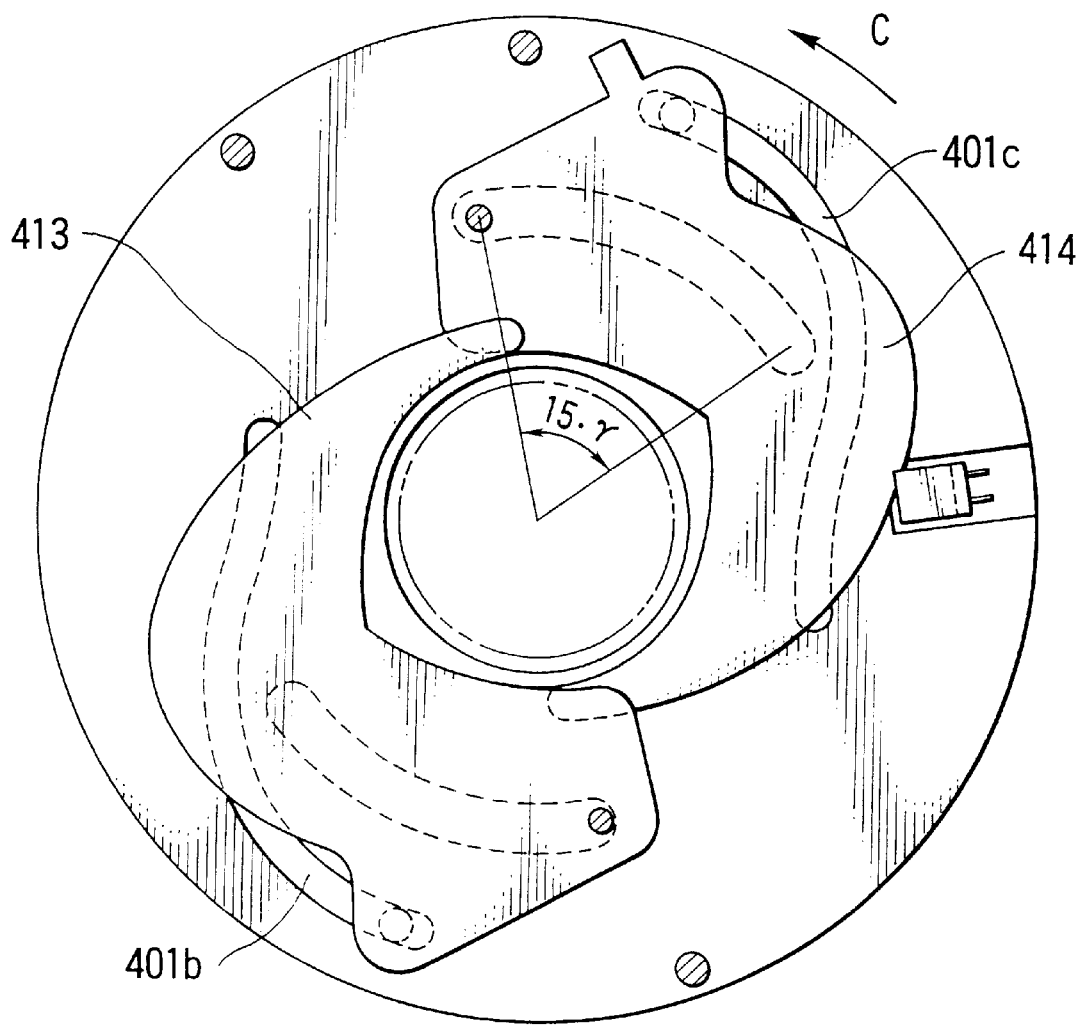
FIG. 58 is a section taken on a line 49—49 of FIG. 48 showing the fifth embodiment in a state obtained when the first driving ring has rotated as much as 15.γ.

FIG. 58 shows a state obtained when the first driving ring 402 has rotated to its final stroke position, i.e., when it has rotated as much as 15.γ.

Although the amount of escape M of the shutter blades 413 and 414 from the aperture part 416a is small when the lens aperture is fully opened, as shown in FIG. 58, the shutter blades 413 and 414 are effectively prevented from bouncing back into the aperture part 416a from their final stroke position by setting the final stroke position at the rotating position 15.γ.

Figure 53:
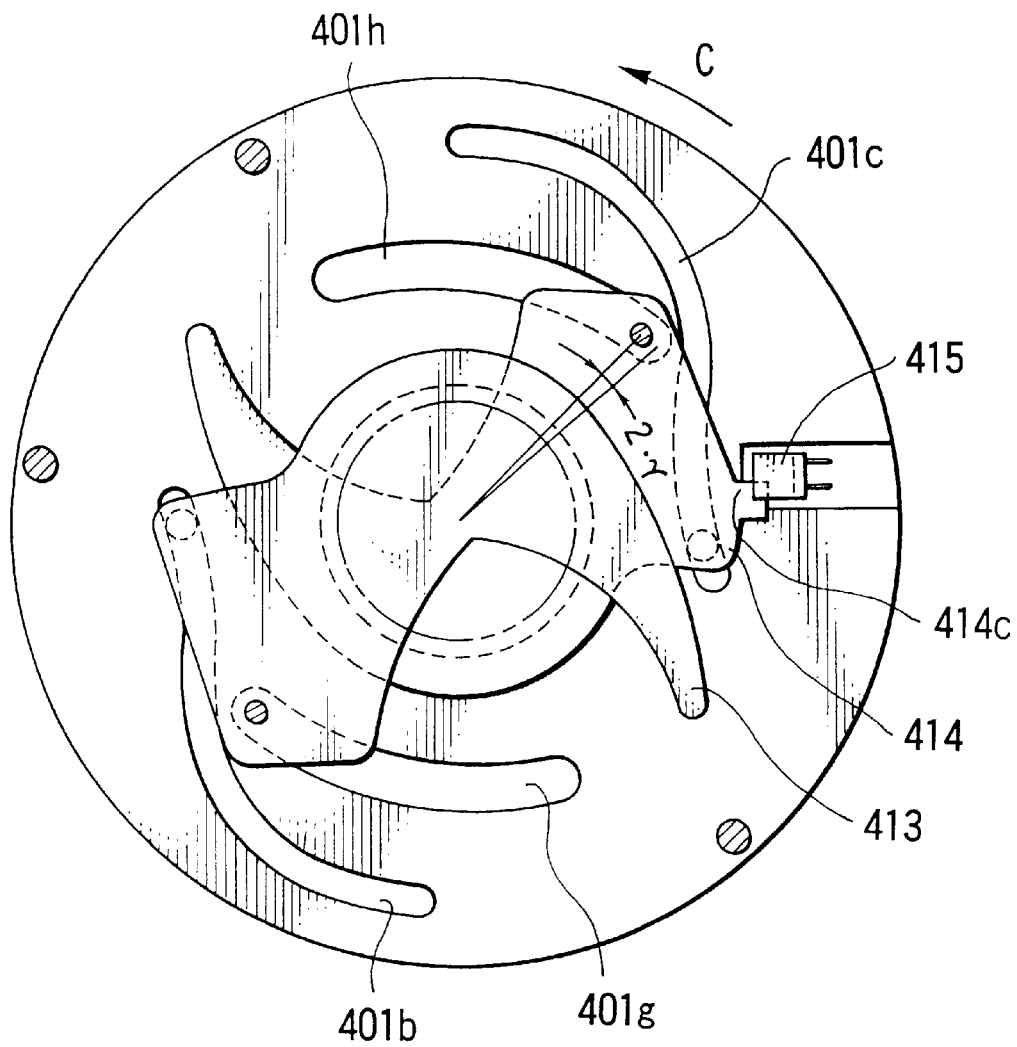
FIG. 53 is a section taken on a line 49—49 of FIG. 48 showing the fifth embodiment in a state obtained when a first driving ring has rotated as much as 2.γ.
Figure 60:
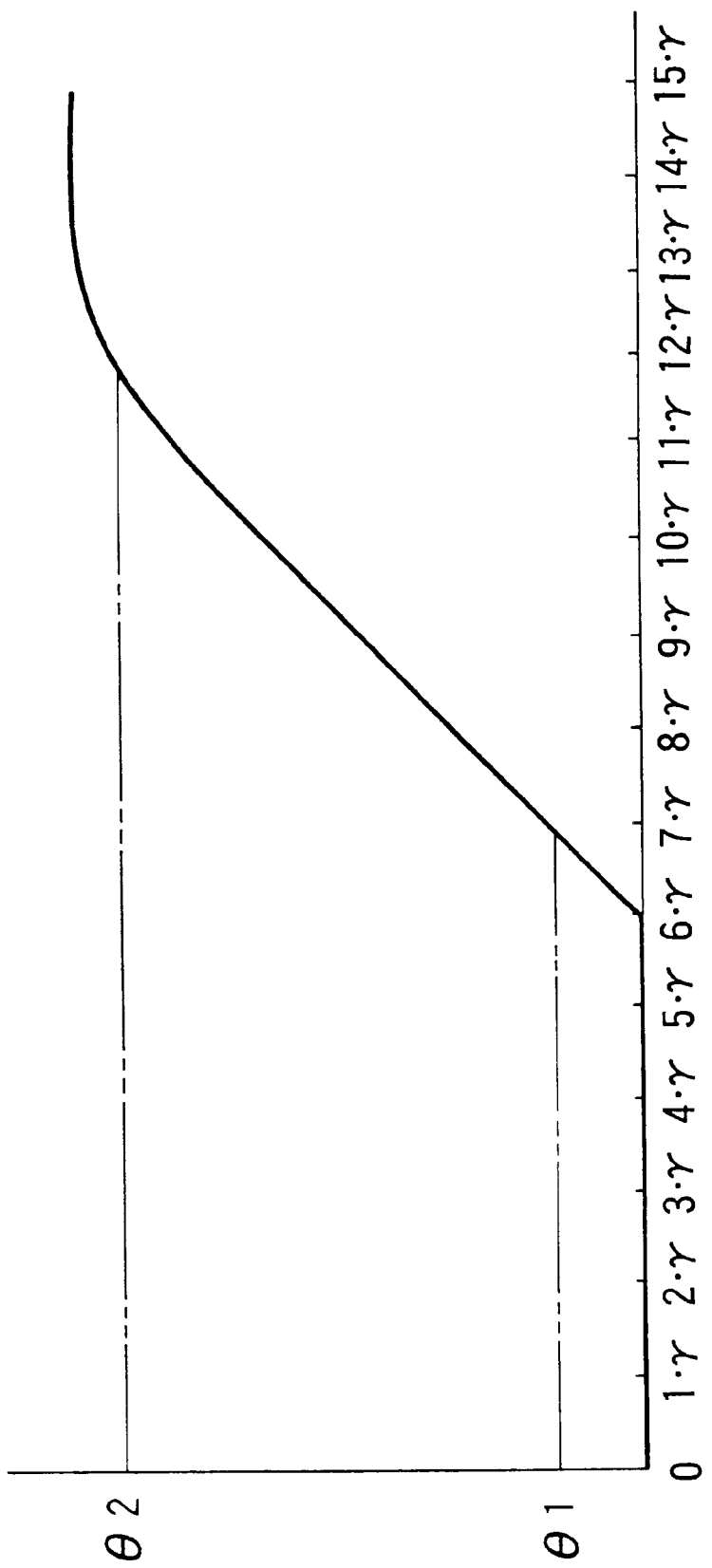
FIG. 60 is a graph showing the blade rotation angle of the first light blocking device in relation to the rotation angle of the first driving ring.

FIG. 60 shows in a graph the relation of the rotating position of the first driving ring 402 to the rotation angle θ, i.e., the angle of rotation, or swing, on the holes 413a and 414a, of the first and second shutter blades 413 and 414. As apparent from this graph, the shutter blades 413 and 414 open the lens aperture to the pinhole state when the rotation angle θ is at θ1 and to the fully open state when the rotation angle is at θ2. Further, when the first driving ring 402 rotates to the rotating position 2.γ from the state of FIG. 49, the arm part 414c of the second shutter blade 414 passes the detecting part of the photo-interrupter 415. The photo-interrupter 415 then outputs a detection signal. A state thus obtained is as shown in FIG. 53.

Generally, a member to be driven to act does not always act in exactly the same manner at the time of start. However, the acting speed is considered to be not much varying after it arrives at a stable speed. The acting speed of the first driving ring 402 tends to vary before arrival at an angle position corresponding to the rotating angle position 2.γ in the process of being driven to rotate by the urging force of the coiled spring 406. However, after this angle position and after the passing of the arm part 414c of the second shutter blade 414 is detected by the photo-interrupter 415, the acting speed of the first driving ring 402 little varies.

Further, the possible arrangement according to this invention is not limited to the above-stated specific amounts of rotation of the first driving ring 402.

Figure 61:
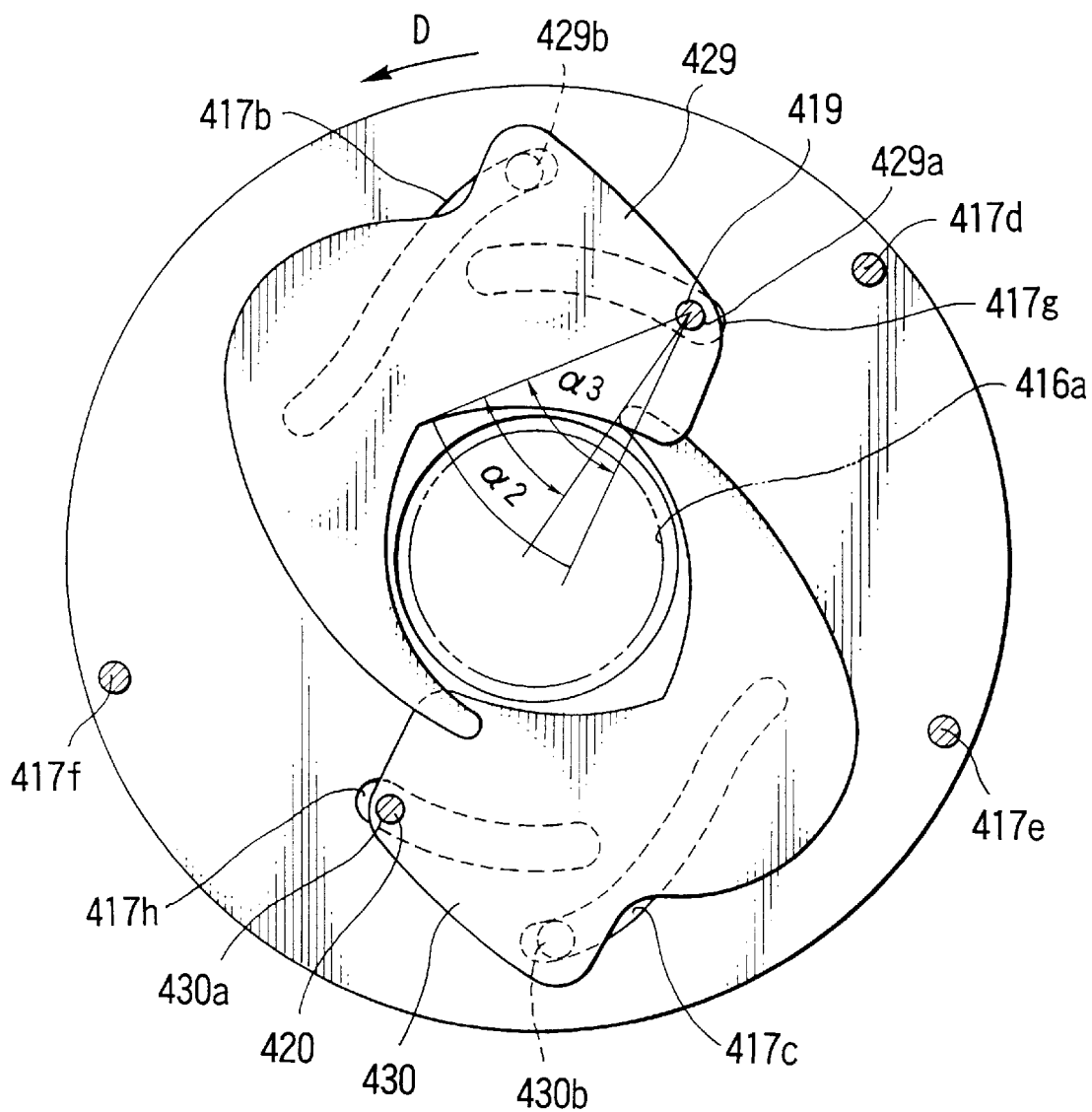
FIG. 61 is a section taken on a line 61—61 of FIG. 48 showing a second light blocking device in a plan view.
Figure 62:
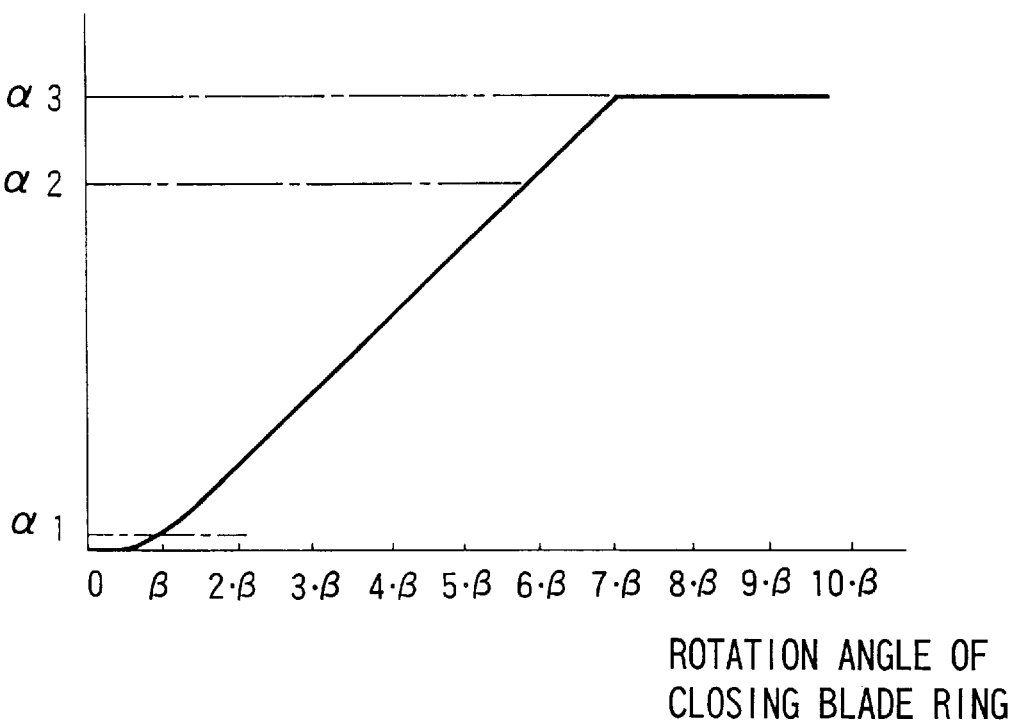
FIG. 62 is a graph showing the blade rotation angle of the second light blocking device in relation to the rotation angle of a closing blade ring.

When the closing blade ring 418 is driven by an arrangement which will be described later to move in the direction of arrow D as shown in FIG. 61, the third and fourth shutter blades 429 and 430 rotate around the optical axis and, at the same time, swing on their holes 429a and 430a while moving within the cam grooves 417b and 417c provided in the lower base plate 417. FIG. 62 shows in a graph the rotation angle α (angle of swing) on the holes 429a and 430a of the third and fourth shutter blades 429 and 430 in relation the rotation angle of the second blade ring 426. The rotation angle in the direction of arrow D of the closing blade ring 418 is shown on the axis of abscissa of the graph. Its position shown in FIG. 61 is indicated as 0 degree and its final stroke position as 10.β degrees. The term "final stroke position" means a position where the arm 418d of the closing blade ring 418 abuts on the stopper 417s of the lower base plate 417. The rotation (swing) angle α on the holes 429a and 430a of the third and fourth shutter blades 429 and 430 is shown on the axis of ordinate.

As apparent from this graph, the cam grooves 417b and 417c of the lower base plate 417 are arranged such that the rotation angle α of the shutter blades 429 and 430 is increased until the closing blade ring 418 rotates to the position 7.β and is not increased any longer when the closing blade ring 418 rotates further. In other words, while the closing blade ring 418 rotates between the positions 7.β and 10.β, the third and fourth shutter blades 429 and 430 are allowed only to rotate around the optical axis. Further, referring to FIGS. 61 and 62, a rotation angle α1 is a rotation angle at which the third and fourth shutter blades 429 and 430 swing into the aperture part 416a. A rotation angle α2 is an angle at which the lens aperture is stopped down to the state of pinhole.

A light blocking device which consists of the third shutter blade 429, the fourth shutter blade 430, the closing blade ring 418, etc., will be hereinafter called a second light blocking device.

FIGS. 63 to 67 are plan views showing the second gear 427, the second driving ring 426, the closing blade ring 418, etc., as viewed in the direction of arrow E shown in FIG. 48. The direction of arrow D shown in FIG. 61 is the same as the direction of arrow F shown in FIGS. 63 to 67.

A position of the closing blade ring 418 at which the lock pawl 423 comes to engage the lock part 417k of the lower base plate 417 corresponds to the rotating position of 0 degree shown in FIG. 62. When the closing blade ring 418 is in this position, the lens aperture defined by the third and fourth shutter blades 429 and 430 is in its maximum state. This state is the same as the state shown in FIG. 61.

Figure 51:
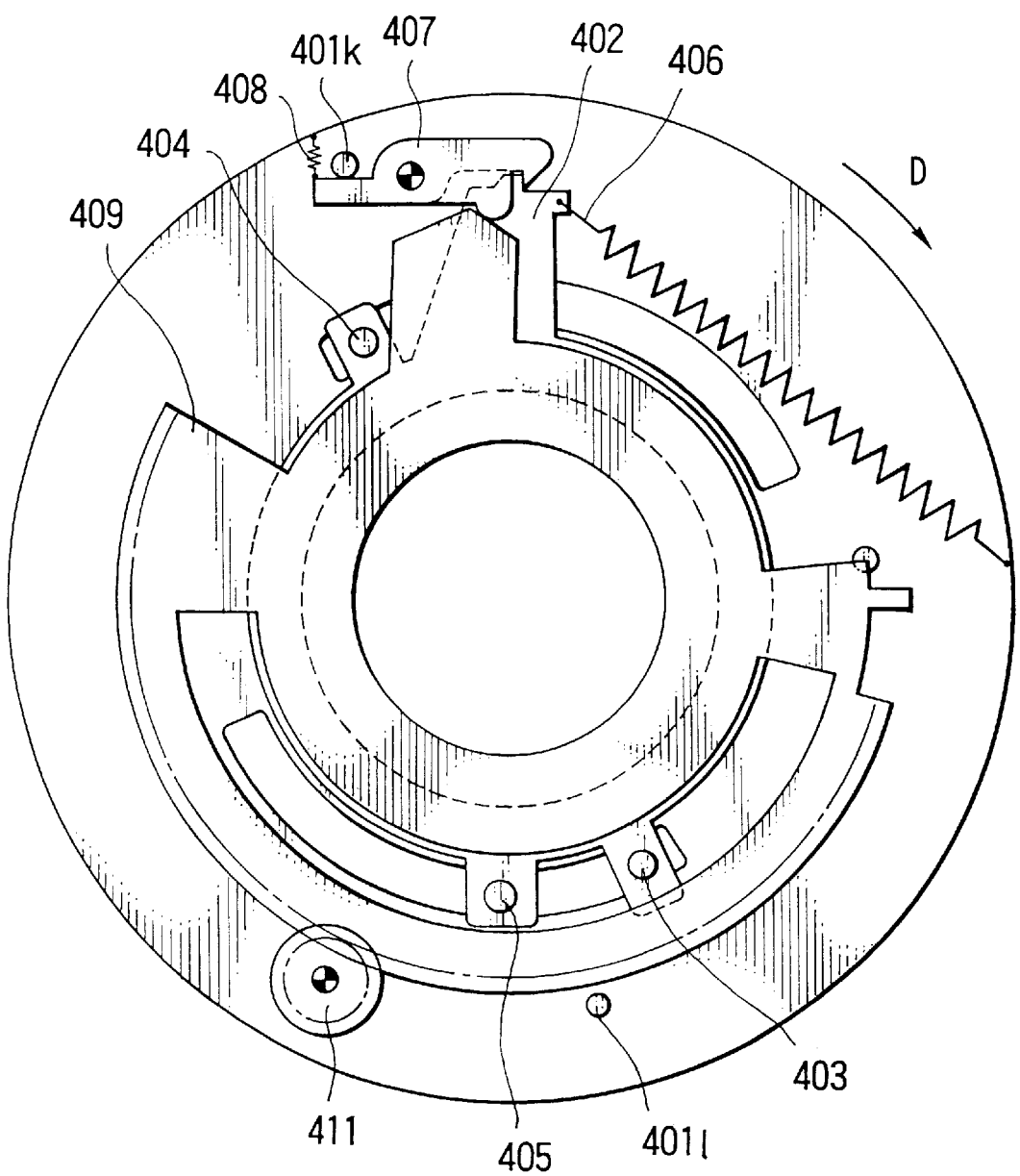
FIG. 51 is a plan view showing the first light blocking device of the fifth embodiment.
Figure 64:
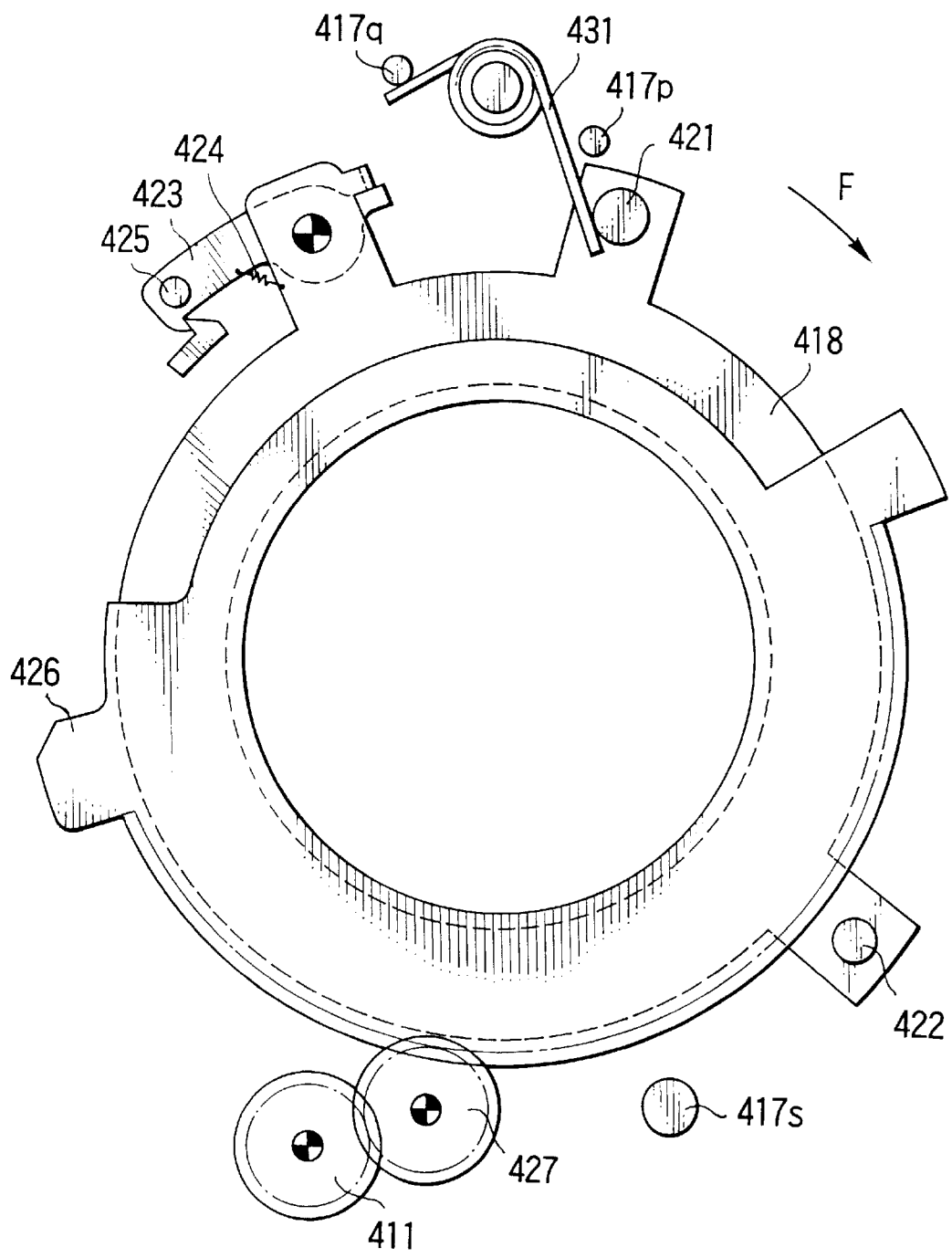
FIG. 64 is a plan view of the fifth embodiment taken in the direction of arrow E of FIG. 48.
Figure 65:
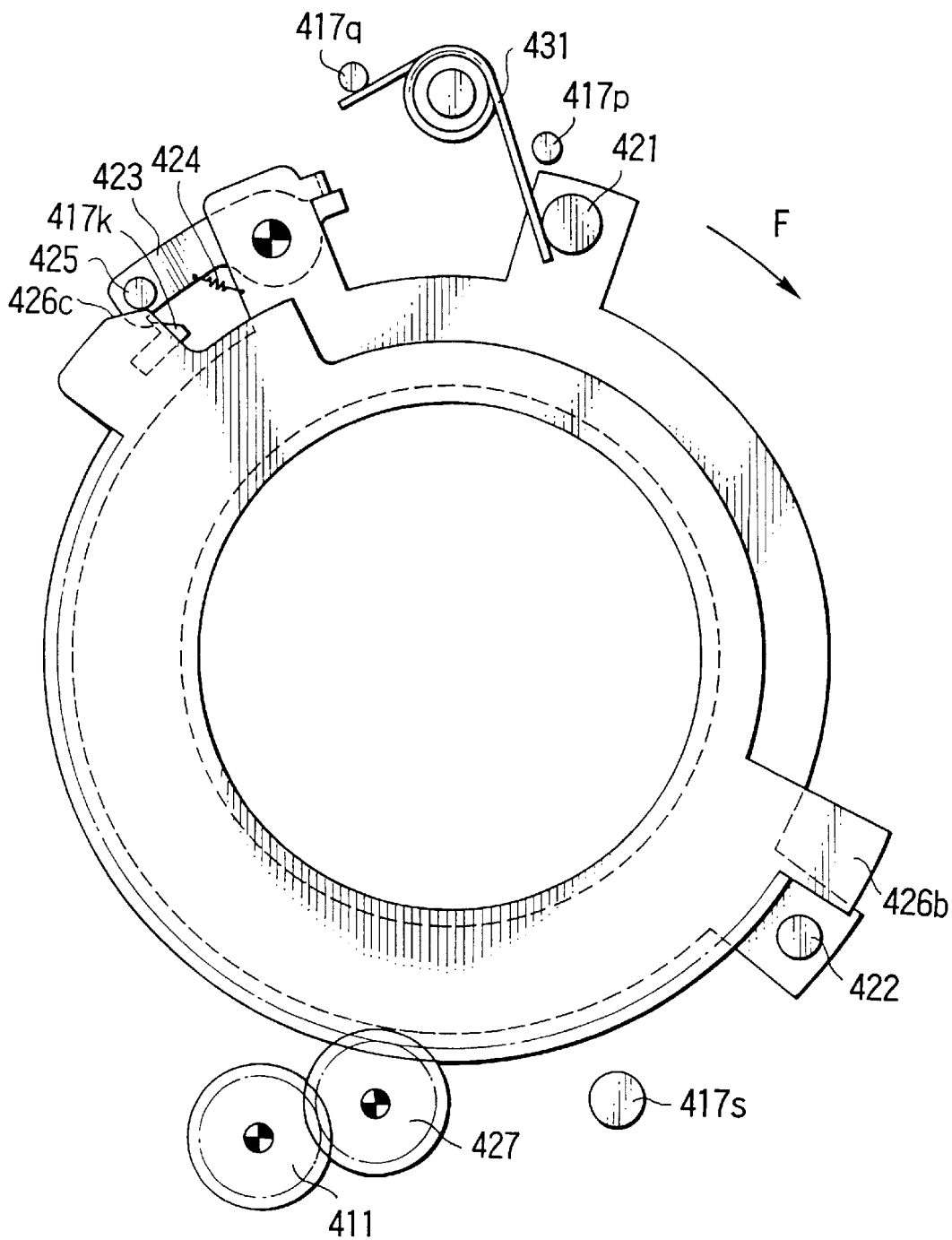
FIG. 65 is a plan view of the fifth embodiment taken in the direction of arrow E of FIG. 48.

FIGS. 49, 50 and 63 show the shutter device in its initial state. When the stepping motor 410 is driven after a shutter release operation, the first pinion 411 rotates counterclockwise as viewed on FIG. 50. The first pinion 411 thus causes the charge ring 409 to rotate in the direction of arrow D and to bring it to a stop in is position as shown in FIG. 51. At this time, although the first driving ring 402 is urged to move in the direction of arrow D by the coiled spring 406, the first driving ring 402 remains in its initial position as the opening start lever 407 is engaging the lock part 402b of the first driving ring 402. In the second light blocking device, on the other hand, the second driving ring 426 rotates from its position shown in FIG. 63 in the direction of arrow F to come to a position as shown in FIG. 64. In the state of FIG. 64, the second light blocking device still remains in its initial state.

Next, when the stepping motor 410 rotates again in the same direction, the charge ring 409 is caused to rotate from its position of FIG. 51 to a position shown in FIG. 62. Then, during the process of rotating to the position shown in FIG. 62, the charge ring 409 has its cam face part 409c abut on the protruding part 407c of the opening start lever 407. The opening start lever 407 is thus pushed up against the urging force of the spring 408. As a result, the claw part 407b of the opening start lever 407 is disengaged from the lock part 402b of the first driving ring 402.

With the first driving ring 402 thus disengaged from the opening start lever 407, the first light blocking device begins to be rotated by the urging force of the coiled spring 406 in the direction of arrow D. When the first driving ring 402 reaches the rotating position 2.γ, the arm part 414c of the second shutter blade 414 is detected by the photo-interrupter 415. A detection signal is then sent from the photo-interrupter 415 to the control circuit. The control circuit then starts a timer by using this signal as a trigger signal. The timer counts a length of time corresponding to the luminance of an object to be photographed. After the time count, the control circuit causes the second light blocking device to perform a shutter closing action.

Since the acting speed of the first driving ring 402 becomes stable when it rotates to the extent of 2.γ after the start of its action, as mentioned in the foregoing, the second light blocking device is arranged to start its action when the first driving ring 402 comes to the rotating position 2.γ. This arrangement enables the first and second light blocking devices to act in a state of adequately synchronized with each other.

Since the second light blocking device is arranged to be driven by the stepping motor 410, an error between an electrical driving signal applied to the stepping motor 410 and the action of the second light blocking device is very small. Therefore, an error of actions of the first and second light blocking devices relative to each other is very small, so that an exposure can be made at a very high degree of precision.

When the first driving ring 402 is caused to rotate in the direction of arrow D by the urging force of the spring 406, the first driving ring 402 acts to cause the first and second shutter blades 413 and 414 to widen the lens aperture while they rotate around the optical axis in the direction of arrow C as shown in FIGS. 54, 55 and 56. The first driving ring 402 comes to a stop when it eventually comes to abut on a stopper 401m which is provided on the upper base plate 401.

The states of the first and second shutter blades 413 and 414 obtained at that time are as shown in FIG. 58. The charge ring 409 is in repose at a position shown in FIG. 57. However, after the lapse of a desired length of time counted by starting the timer when the first driving ring 402 has rotated to the position 2.γ, the charge ring 409 is again caused to move in the direction of arrow D for moving the second light blocking device as mentioned in the foregoing.

The second driving ring 426 rotates from its position shown in FIG. 64 in the direction of arrow F (the direction of arrow D). Then, when the cam face 426c of the second driving ring 426 comes to abut on the release pin 425, the lock pawl 423 is pushed up against the urging force of the spring 424 to be disengaged from the lock part 417k of the lower base plate 417.

Figure 66:
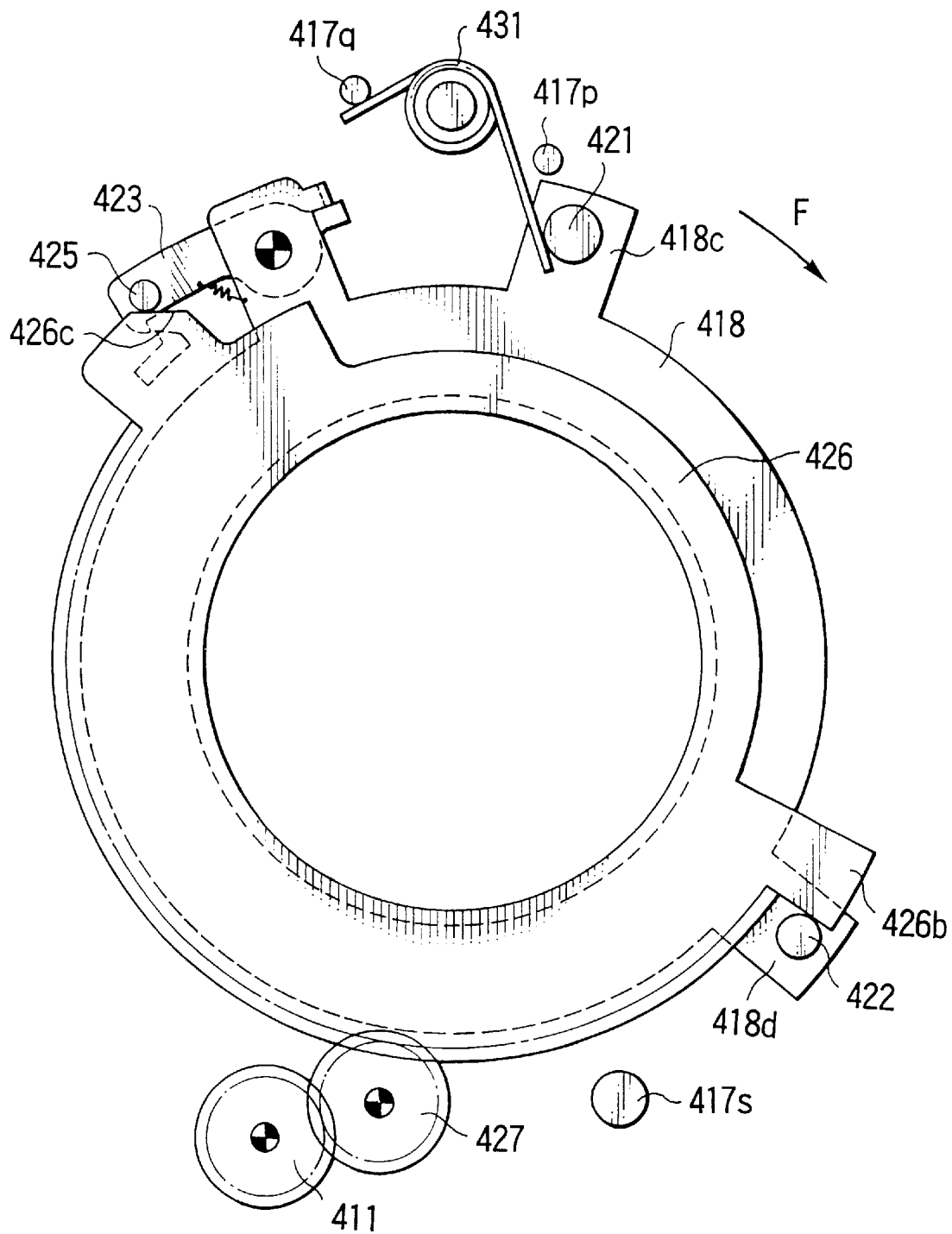
FIG. 66 is a plan view of the fifth embodiment taken in the direction of arrow E of FIG. 48.

Immediately after the disengagement of the lock pawl 423, the second driving ring 426 has its arm 426b abut on the pin 422 to cause the closing blade ring 418 to begin to rotate in the direction of arrow F. A state thus obtained is as shown in FIG. 66. In this instance, since the moment of inertia of the second driving ring 426 is sufficiently larger than those of the closing blade ring 418, the third shutter blade 429 and the fourth shutter blade 430, the second driving ring 426 thereafter stably rotates with little deceleration.

Figure 71:
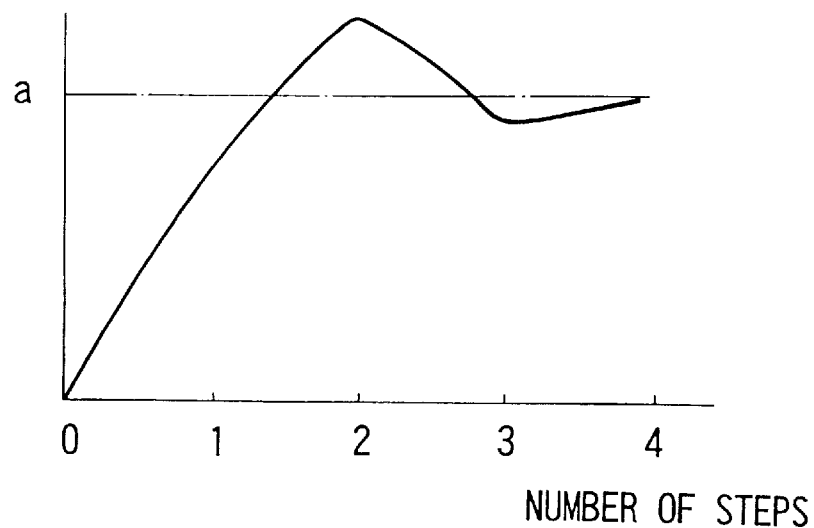
FIG. 71 is a graph showing the characteristic of a stepping motor.

FIG. 71 is a graph showing the characteristic of the stepping motor. As apparent from the graph, a certain number of steps are required before the rotating speed of the stepping motor actually reaches a speed "a" intended by a driving electrical signal, because the stepping motor does not instantly respond to the input of the driving signal. However, since there are provided a sufficient number of driving steps for driving the stepping motor 410 before the second driving ring 426 moves from its position shown in FIG. 64 to a position shown in FIG. 65, the second driving ring 426 can be sufficiently accelerated and the error of rotating speed with respect to the electrical signal for driving the stepping motor 410 is very small.

The second driving ring 426 rotates together with the closing blade ring 418 in the direction of arrow F from its position of FIG. 66. The third and fourth shutter blades 429 and 430 are thus caused to stop down the lens aperture.

When the closing blade ring 418 rotates to an extent corresponding to the seven steps of the stepping motor 410 to come to the position 7.β shown in FIG. 62, the third and fourth shutter blades 429 and 430 swing on the holes 429a and 430a as much as a rotation angle α3 to bring the lens aperture into a state of being fully closed.

Before the closing blade ring 418 is brought to a position 10.β from its rotating position 7.β by driving the stepping motor 410 four steps, the third and fourth shutter blades 429 and 430 are arranged to remain in the closed state as shown in FIG. 62. Therefore, when the arm 418d of the closing blade ring 418 comes to abut on the stopper 417s of the lower base plate 417 with the second driving ring 426 and the closing ring 418 reaching their final stroke positions as shown in FIG. 67, the third and fourth shutter blades 429 and 430 never come to accidentally open the lens aperture even if the arm 418d bounces abutting on the stopper 417s.

Figure 59:
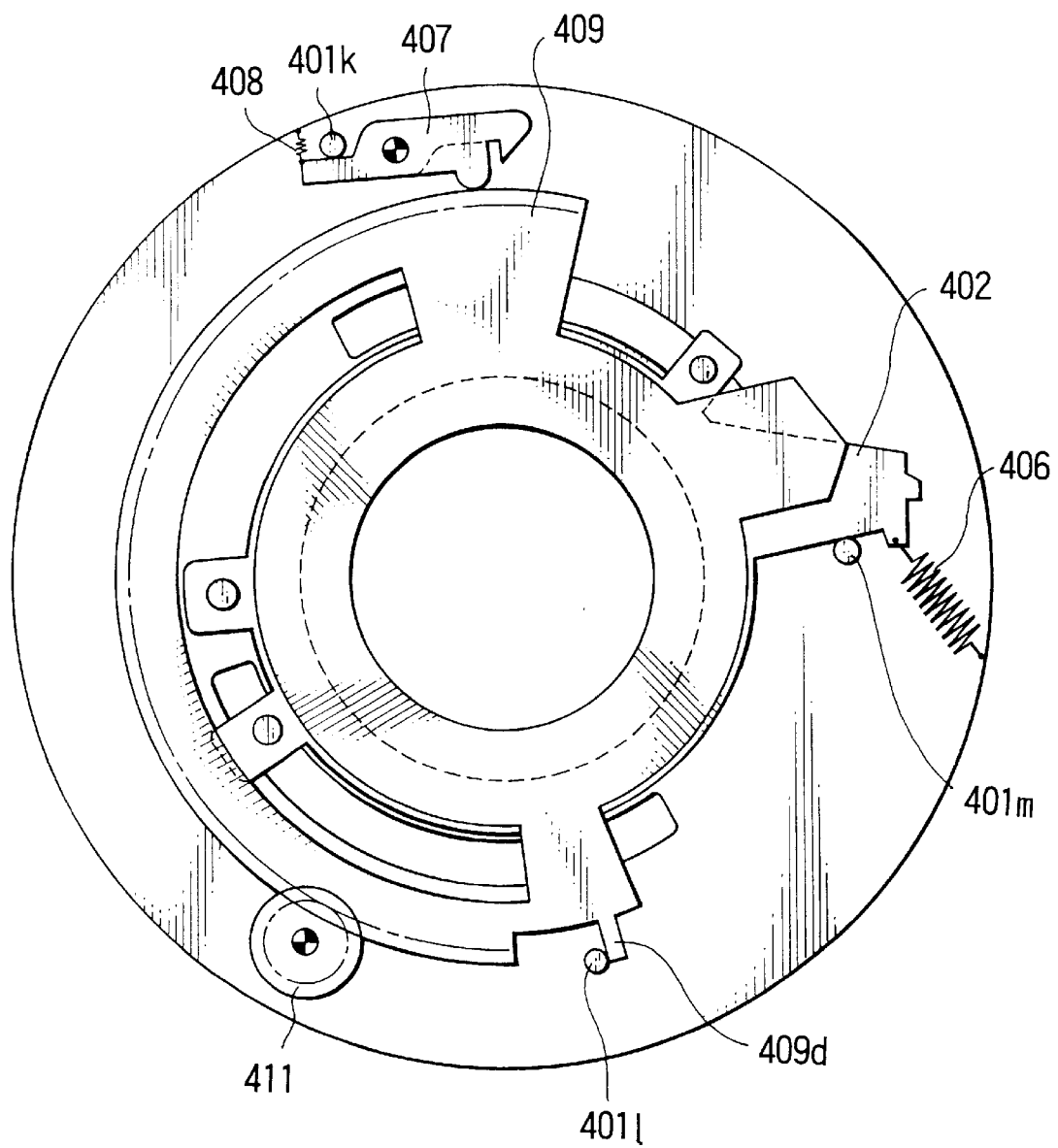
FIG. 59 is a plan view showing the first light blocking device of the fifth embodiment in a state obtained when it has reached its final stroke position.
Figure 67:
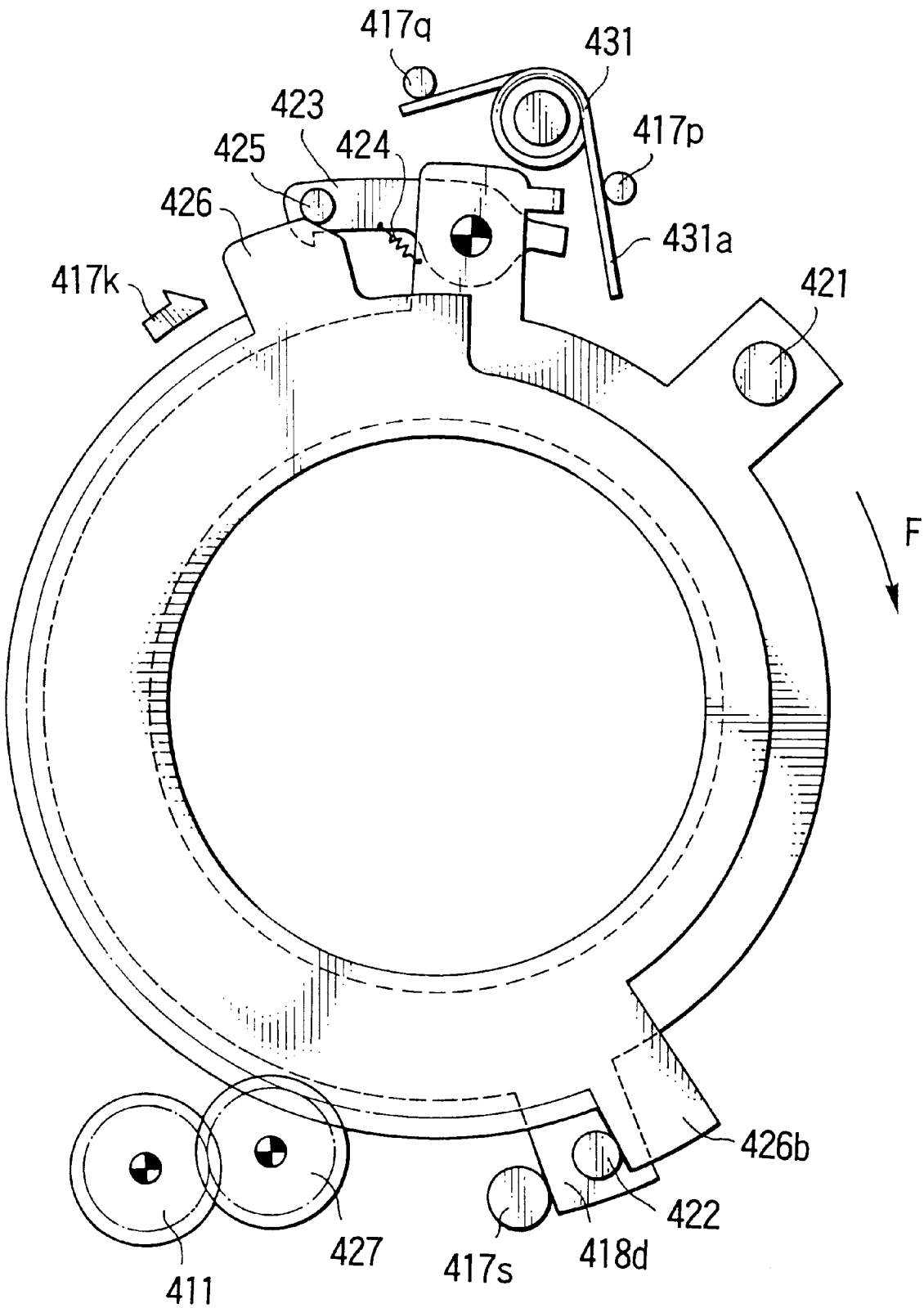
FIG. 67 is a plan view of the fifth embodiment taken in the direction of arrow E of FIG. 48 showing it in a state obtained when the second light blocking device has reached a final stroke position thereof.

FIG. 59 shows a state of the first light blocking device obtained when the second driving ring 426 reaches its position shown in FIG. 67 together with the closing blade ring 418, i.e., when the maximum lens-aperture forming position of the second light blocking device changes to its lens-aperture closing position. At this time, the charge ring 409 comes to a stop exactly at a position where its arm part 409d abuts on the stopper 401l of the upper base plate 401.

In order to bring the first and second light blocking devices back to their initial positions as shown in FIGS. 50 and 63, after the second driving ring 426 comes together with the closing blade ring 418 to the position shown in FIG. 67, the stepping motor 410 is reversely rotated to cause the second driving ring 426 to rotate reversely to the direction of arrow F and to cause the charge ring 409 to rotate reversely to the direction of arrow D. With the second driving ring 426 rotated reversely to the direction of arrow F, the arm 426b of the ring 426 comes to abut on the pin 421 of the closing blade ring 418 to cause the closing blade ring 418 to rotate reversely to the direction of arrow F. The second light blocking device is thus brought back to its initial position as shown in FIG. 63 by driving the stepping motor 410 as much as a predetermined number of steps.

In the meantime, while the charging ring 409 is in process of rotating reverse to the direction of arrow D, the end face 409e of the slot 409g of the charge ring 409 abuts on the charging projection 405 of the first driving ring 402 to cause the first driving ring 402 to rotate reversely to the direction of arrow D against the urging force of the coiled spring 406. The first light blocking device is thus brought back to its initial position as shown in FIG. 50.

The operation timing of the first and second light blocking devices is set as follows. In the process of returning each of the light blocking devices back to the initial position, the first light blocking device comes from the fully open state to the closed state through the pinhole state earlier than the arrival of the second light blocking device at the pinhole state from the full closed state.

Figure 68:
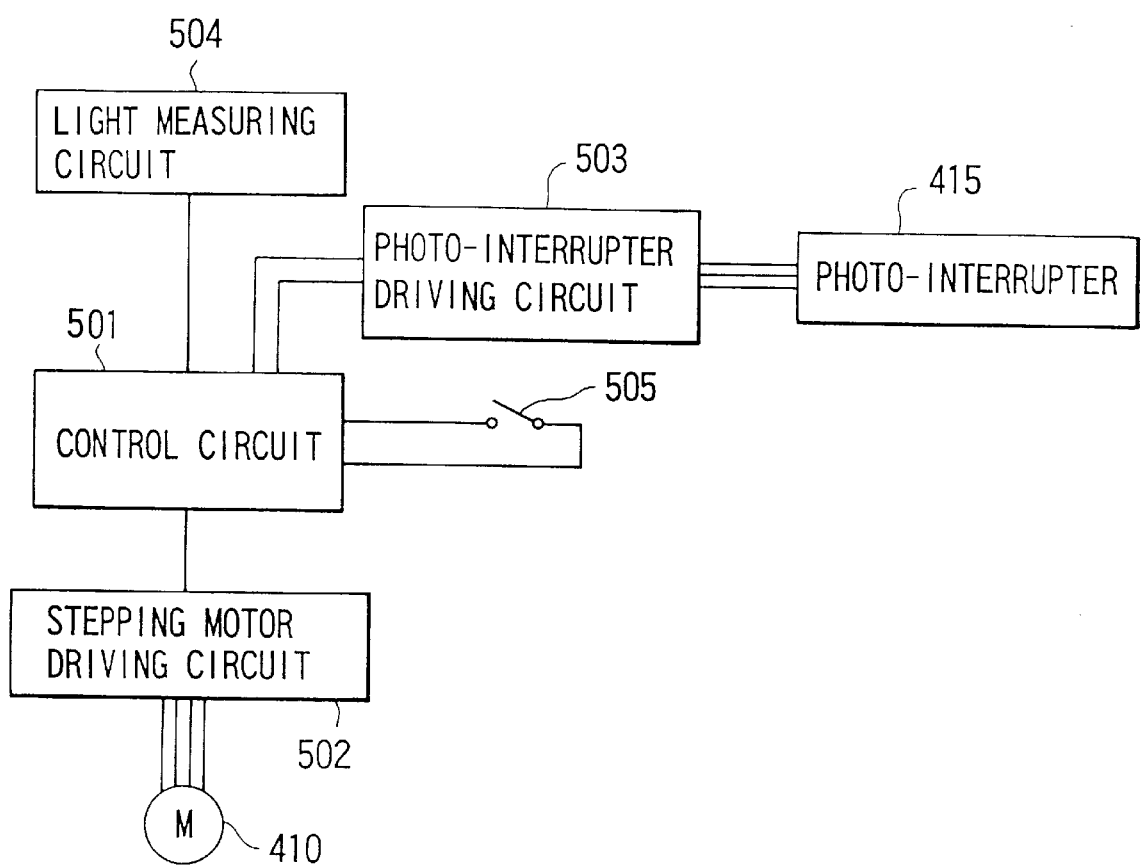
FIG. 68 is a block diagram showing an electric circuit arrangement of the fifth embodiment.

FIG. 68 shows in a block diagram the electric circuit arrangement of the fifth embodiment. Referring to FIG. 68, a control circuit 501 which is composed of a microcomputer, etc., is arranged to control the sequence of actions of the whole device. A stepping motor driving circuit 502 is arranged to drive the stepping motor 410. A photo-interrupter driving circuit 503 is arranged to drive and control the photo-interrupter 415. A light measuring circuit 504 is arranged in a known manner to measure the luminance of the object to be photographed. A reference numeral 505 denotes a shutter release switch.

A storage circuit is arranged within the control circuit 501 to store a time table. A predetermined value of exposure time is selected from the time table according to signals outputted from the light measuring circuit 504 and an aperture setting means 506.

Figure 69:
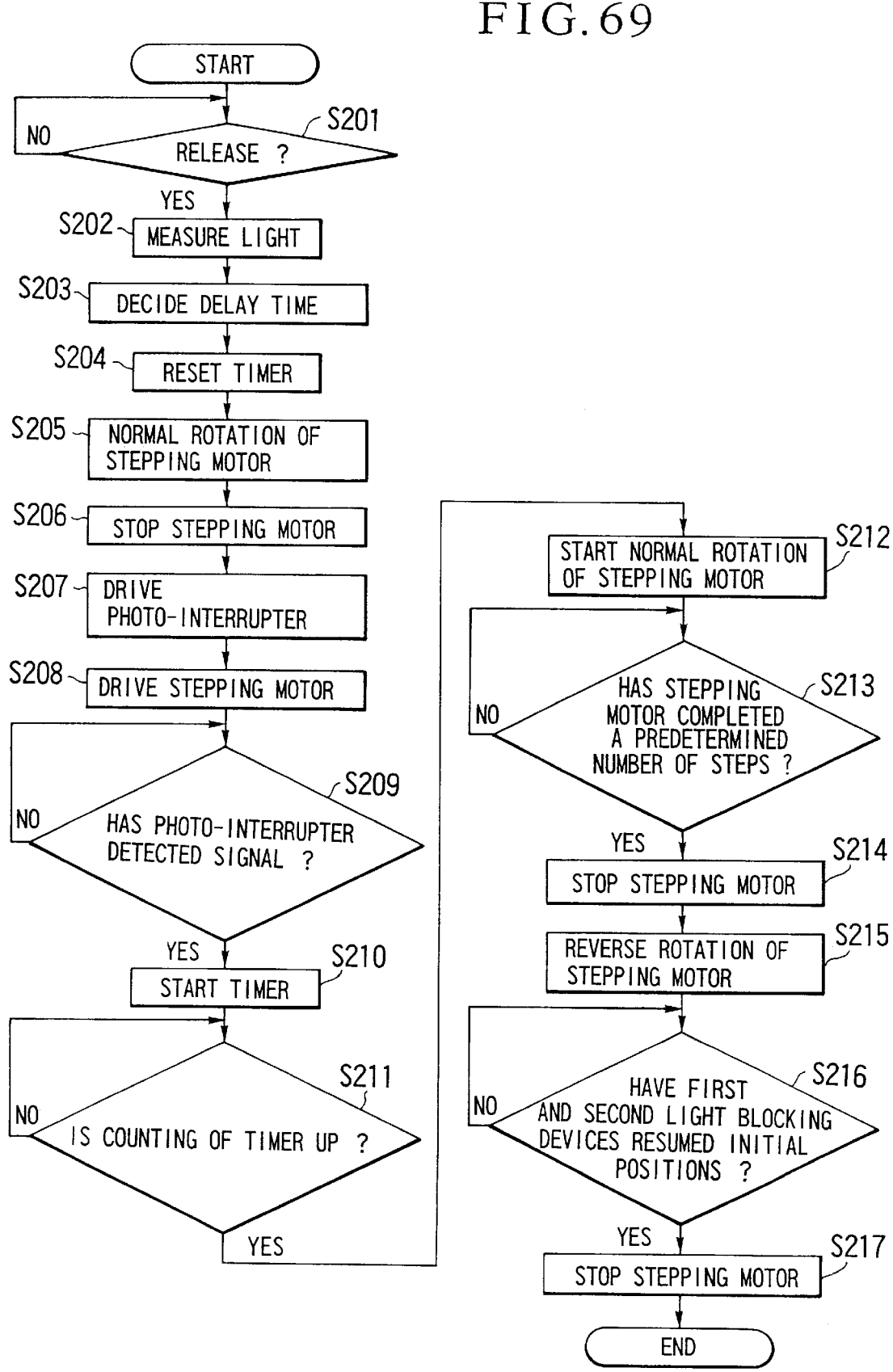
FIG. 69 is a flow chart showing an operation of a control circuit of the fifth embodiment.

FIG. 69 shows in a flow chart an operation of the control circuit 501. The operation of the control circuit 501 is described with reference to the flow chart of FIG. 69 as follows.

At a step S201, a check is made to find if the release switch 505 is turned on by pushing a release button which is not shown. If so, the flow of operation comes to a step S202. If not, the step S201 is repeated.

At the step S202, the light measuring circuit 504 is activated to measure the luminance of the object.

At a step S203, a value of delay time T corresponding to the luminance of the object measured at the step S202 is selected from the time table stored in the storage circuit.

At a step S204, a timer circuit 508 is reset.

At a step S205, the stepping motor driving circuit 502 is caused to drive the stepping motor 410 in such a way as to bring the first light blocking device from the state of FIG. 50 into the state of FIG. 51 according to predetermined driving frequency data.

At a step S206, the stepping motor driving circuit 502 is caused to stop the stepping motor 410 after the motor 410 has been driven by a number of steps required in bringing the first light blocking device from the state of FIG. 50 into the state of FIG. 51.

At a step S207, the photo-interrupter driving circuit 503 is caused to actuate the photo-interrupter 415.

Figure 52:
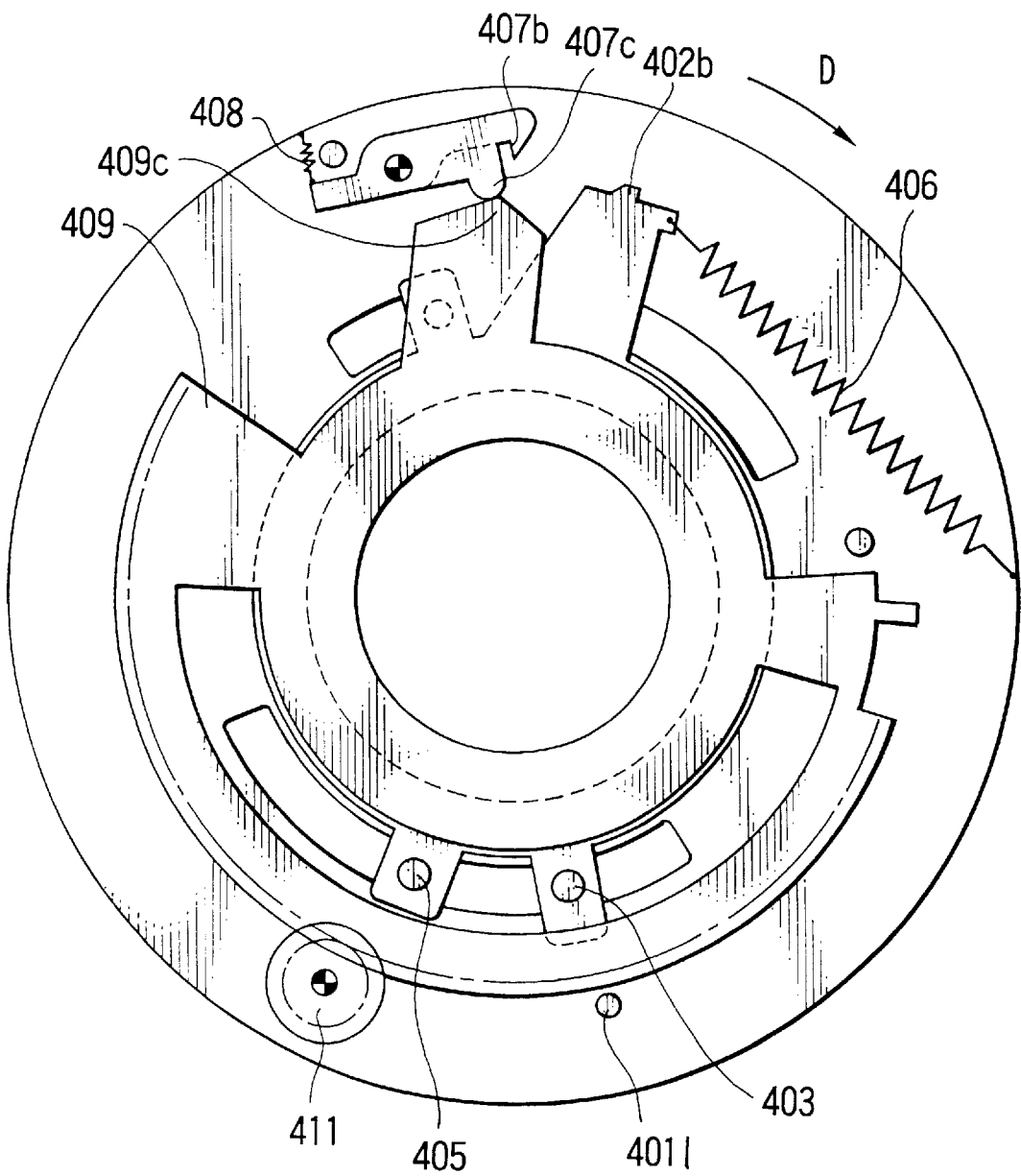
FIG. 52 is a plan view showing the first light blocking device of the fifth embodiment.

At a step S208, again the stepping motor driving circuit 502 is caused to drive the stepping motor 410 to bring the charge ring 409 to its position shown in FIG. 52. After that, the stepping motor 410 is brought to a stop. At this time, the first driving ring 402 is released from a state of being locked by the opening start lever 407. The first driving ring 402 is thus allowed to begin to be rotated by the urging force of the coiled spring 406.

At a step S209, a check is made to find if the arm part 414c of the second shutter blade 414 has been detected by the photo-interrupter 415. If so, the flow comes to a step S210 on the assumption that the first light blocking device has entered a region of stable operating speed. If not, the flow repeats the step S209.

At the step S210, the timer circuit 508 is caused to start counting time elapsing from a point of time at which the first driving ring 402 has rotated as much as 2.γ to enter the stable operating speed region.

At a step S211, a check is made to find if the count by the timer circuit 508 started at the step S210 has reached a count number (time) decided at the step S203. If so, the flow comes to a step S212. If not, the step S211 is repeated.

At the step S212, the stepping motor driving circuit 502 is caused to drive the stepping motor 410 according to predetermined driving frequency data to cause the second driving ring 426 to rotate in the direction of arrow F as shown in FIG. 64.

At a step S213, a check is made through the stepping motor driving circuit 502 to find if the stepping motor 410 has been driven a predetermined number of steps, i.e., until the second driving ring 426 comes to its position as shown in FIG. 67. If so, the flow comes to a step S214. If not, the step S213 is repeated.

At the step S214, the stepping motor driving circuit 502 is caused to stop driving the stepping motor 410.

At a step S215, to bring the first light blocking device back to its initial position as shown in FIGS. 49 and 50 and the second light blocking device back to its initial position as shown in FIG. 63, the stepping motor driving circuit 502 is caused to begin driving the stepping motor 410 at a predetermined driving frequency and reversely to the rotating direction of the steps S205 and S208.

At a step S216, a check is made through the stepping motor driving circuit 502 to find if the first and second light blocking devices have been brought back to their initial positions as shown in FIG. 49 and FIG. 63 by driving the stepping motor 410 to the extent of the predetermined number of steps. If so, the flow comes to a step S217. If not, the step S216 is repeated.

At the step S217, the stepping motor driving circuit 502 is caused to stop the stepping motor 410.

Figure 70:
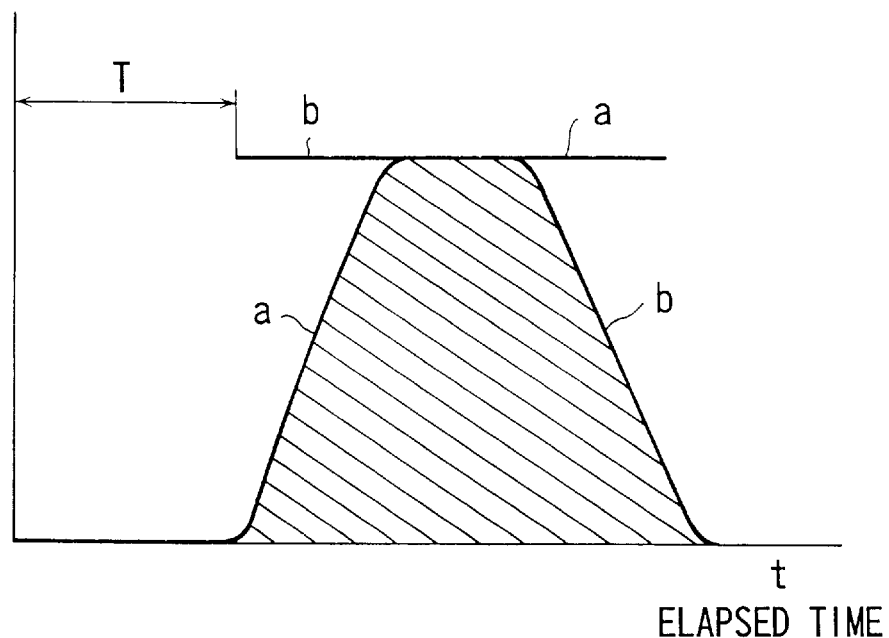
FIG. 70 is a graph showing a state of exposure.

FIG. 70 shows in a graph the area of aperture obtained by driving the shutter device to make an exposure according to the sequence of steps described.

In the graph of FIG. 70, the axis of abscissa shows time having elapsed from a point of time at which the arm part 414c of the second shutter blade 414 is detected by the photo-interrupter 415, showing this point of time as "0" and also showing the delay time as "T". In this graph, the area of the lens aperture opened by the first light blocking device is represented by a curve "a". The area of the lens aperture opened by the second light blocking device is represented by another curve "b". A hatched part represents a region of an actual exposure made by the shutter device as a whole. The delay time T is the difference of the start time of the second light blocking device from the time of detection of the first light blocking device by the photo-interrupter 415. The position of the curve "b" relative to the curve "a" can be shifted to the right or left as viewed on these drawings to vary the amount of exposure by varying the delay time T.

In the case of the fifth embodiment, the first light blocking device is arranged to be started by pushing up the opening start lever 407 with the cam face part 409c of the charge ring 409 against the urging force of the spring 408 to disengage the first driving ring 402 from the opening start lever 407.

This arrangement may be changed to disengage the first driving ring 402 from the opening start lever 407 by means of an actuator such as a plunger provided specially for this purpose. Such modification is advantageous particularly in a case where a load on the action of disengaging the first driving ring 402 from the opening start lever 407 is too large for the driving force of the stepping motor.

This invention is applicable also to a camera of the kind using an image recording medium other than a film or to a camera of the kind using an image recording medium which is arranged to permit writing photographic information by some means other than a magnetic means.

This invention may be carried out by combining as necessary the embodiments or their technological elements described in the foregoing.

Further, this invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. A shutter device comprising:
   a) a first light blocking member arranged to travel from a closed position to a fully open position for making exposure;
   b) a first motor arranged to drive said first light blocking member;
   c) a second light blocking member arranged to travel from a starting position to a closed position for making exposure;
   d) a rotary member arranged to engage said second light blocking member and to rotate to cause said second light blocking member;
   e) a second motor arranged to drive said second light blocking member;
   f) a transmission member to which a driving force of said second motor is constantly transmitted, said transmission member having a first region in which said transmission member transmits the driving force of said second motor to said rotary member and a second region in which said transmission member does not transmit the driving force of said second motor to said rotary member;
   g) control means for controlling driving actions of said first and second motors; and
   h) varying means for varying the starting position of said second light blocking member, wherein said varying means varies a change-over position between the first region and the second region of said transmission member according to a set condition.

2. A shutter device according to claim 1, wherein said varying means varies the change-over position between the first region and the second region by varying the position of said transmission member.

3. A shutter device according to claim 2, wherein said transmission member has a claw portion which engages with a plurality of notches formed on a base member of said second light blocking member and the position of said transmission member varies depending on which of the plurality of notches is engaged with the claw portion.

4. A shutter device according to claim 2, wherein said varying means varies the position of said transmission member by driving said second motor in a direction reverse to the running direction of said second light blocking member.

5. A shutter device according to claim 2, wherein said varying means has a manual operation member and varies the position of the transmission member by operation of said manual operation member.

6. A shutter device according to claim 2, wherein said varying means has a third motor and varies the position of the transmission member by driving said third motor.

7. A camera having a shutter device comprising:
   a) a first light blocking member arranged to travel from a closed state to a fully open state for making exposure;
   b) a first motor arranged to drive said first light blocking member;
   c) a second light blocking member arranged to travel from a starting position to a closed state for making exposure;
   d) a rotary member arranged to engage said second light blocking member and to rotate to cause said second light blocking member;
   e) a second motor arranged to drive said second light blocking member;
   f) a transmission member to which a driving force of said second motor is constantly transmitted, said transmission member having a first region in which said transmission member transmits the driving force of said second motor to said rotary member and a second region in which said transmission member does not transmit the driving force of said second motor to said rotary member;
   g) control means for controlling driving actions of said first and second motors;
   h) photographing condition setting means for setting a photographing condition; and
   i) varying means for varying the starting position of said second light blocking member, wherein said varying means varies a change-over position between the first region and the second region of said transmission member according to the photographing condition set by said photographing condition setting means.

8. A camera according to claim 7, wherein said varying means varies the change-over position between the first region and the second region by varying the position of said transmission member.

9. A camera according to claim 8, wherein said transmission member has a claw portion which engages with a plurality of notches formed on a base member of said second light blocking member and the position of said transmission member varies depending on which of the plurality of notches is engaged with the claw portion.

10. A camera according to claim 8, wherein said varying means varies the position of said transmission member by driving said second motor in a direction reverse to the running direction of said second light blocking member.

11. A camera according to claim 8, wherein said varying means has a manual operation member, and varies the position of the transmission member by operation of said manual operation member.

12. A camera according to claim 8, wherein said varying means has a third motor and varies the position of the transmission member by driving said third motor.

* * * * *

UNITED STATES PATENT AND TRADEMARK OFFICE
CERTIFICATE OF CORRECTION

PATENT NO. : 5,970,268
DATED : October 19, 1999
INVENTOR(S) : Chikara Aoshima

It is certified that error appears in the above-identified patent and that said Letters Patent are hereby corrected as shown below:

Col. 2, line 1, delete "object" and insert -- objects --.
Col. 12, line 61, delete "Indexing" and insert -- indexing --.

Signed and Sealed this

Seventeenth Day of April, 2001

Attest:

NICHOLAS P. GODICI

Attesting Officer     Acting Director of the United States Patent and Trademark Office